United States Patent
Tryon, III et al.

(10) Patent No.: US 8,285,522 B1
(45) Date of Patent: Oct. 9, 2012

(54) MATERIALS-BASED FAILURE ANALYSIS IN DESIGN OF ELECTRONIC DEVICES

(75) Inventors: Robert G. Tryon, III, Brentwood, TN (US); Animesh Dey, Brentwood, TN (US); Loren A. Nasser, Brentwood, TN (US); Ganapathi Krishnan, Brentwood, TN (US)

(73) Assignee: Vextec Corporation, Brentwood, TN (US)

( * ) Notice: Subject to any disclaimer, the term of this patent is extended or adjusted under 35 U.S.C. 154(b) by 1132 days.

(21) Appl. No.: 11/698,262

(22) Filed: Jan. 24, 2007

Related U.S. Application Data

(60) Provisional application No. 60/761,958, filed on Jan. 24, 2006, provisional application No. 60/778,196, filed on Mar. 1, 2006.

(51) Int. Cl.
*G06F 7/60* (2006.01)
*G06G 7/62* (2006.01)
*G01B 3/44* (2006.01)
*G01N 19/00* (2006.01)

(52) U.S. Cl. .................... 703/2; 703/13; 702/34; 73/804
(58) Field of Classification Search ................ 703/2, 13; 702/34; 73/804
See application file for complete search history.

(56) References Cited

U.S. PATENT DOCUMENTS

| | | | |
|---|---|---|---|
| 6,246,011 B1 * | 6/2001 | Abraham et al. | 174/260 |
| 6,301,970 B1 * | 10/2001 | Biggs et al. | 73/804 |
| 6,874,370 B1 * | 4/2005 | Vachon | 73/808 |
| 7,006,947 B2 | 2/2006 | Tryon, III | |
| 7,016,825 B1 | 3/2006 | Tryon, III | |
| 7,480,573 B2 * | 1/2009 | Toyosada | 702/34 |
| 7,480,601 B2 | 1/2009 | Tryon, III | |
| 7,505,885 B2 * | 3/2009 | Deobald et al. | 703/7 |
| 2007/0185694 A1 * | 8/2007 | Rousselier et al. | 703/2 |

OTHER PUBLICATIONS

Patrick Onck, Erik van der Giessen, Growth of an initially sharp crack by grain boundary cavitation, Journal of the Mechanics and Physics of Solids, vol. 47, Issue 1, Dec. 4, 1998, pp. 99-139.*

Masahiro Toyosada, Koji Gotoh, Toshio Niwa, Fatigue crack propagation for a through thickness crack: a crack propagation law considering cyclic plasticity near the crack tip, International Journal of Fatigue, vol. 26, Issue 9, Sep. 2004, pp. 983-992.*

Masahiro Toyosada, Koji Gotoh, Toshio Niwa, Fatigue life assessment for welded structures without initial defects: an algorithm for predicting fatigue crack growth from a sound site, International Journal of Fatigue, vol. 26, Issue 9, Sep. 2004, pp. 993-1002.*

Amagai, et al., "Mechanical Characterization of Sn—Ag Based Lead Free Solders", Microelectronics Reliability, vol. 42, 2002, pp. 951-966.

Dey, et al., "Automotive System Reliability Simulation Software", Huntsville Simulation Conference, Sep. 2000.

(Continued)

*Primary Examiner* — Kamini S Shah
*Assistant Examiner* — Juan Ochoa
(74) *Attorney, Agent, or Firm* — VLP Law Group LLP; Richard G. A. Bone

(57) ABSTRACT

The technology includes methods, a system, and a computer readable medium for predicting the failure of an electronic device during design of the device, by receiving data associated with the device, the data including data indicative of a device response to a specific load on the system while the device is in operation, and predicting potential failure of the device using a probabilistic model and the data, wherein the probabilistic model utilizes at least one of fast probability methods and simulation techniques.

21 Claims, 37 Drawing Sheets

OTHER PUBLICATIONS

Iyer, et al., "Thermal Fatigue Characterization of Commonly-Used 63Sn37Pb Solder Joints in Electronic Assemblies", TMS (The Minerals, Metals & Materials Society) Annual Meeting & Exhibition held in Orlando, Florida, Published as "A Collection of Papers from the 2007 TMS Annual Meeting", Electronic, Magnetic, and Photonic Materials Division, Feb. 25-Mar. 1, 2007 (Eds. Long Qing Chen and Sung Kang).

Zahn, "Solder Joint Fatigue Life Model Methodology for 63Sn37Pb and 95.5Sn4Ag0.5Cu materials", Electronic Components and Technology Conference, 2003, pp. 83-94.

Lau, et al., "Solder Joint Reliability of BGA, CSP, Flip Chip and Fine Pitch SMT Assemblies", McGraw Hill, NY, 1997, Chapters 2 and 3.

Lefranc, et al., "Properties of Solders and Their Fatigue in Power Modules", Microelectronics Reliability, vol. 42, 2002, pp. 1641-1646.

Liang, et al., "An Integrated Fatigue Life Prediction Methodology for Optimum Design and Reliability Assessment of Solder Inter-Connectors", Advances in Electronic Packaging, vol. 2, 1997, pp. 1583-1592.

Line, et al., "Electronic Prognostics Through Advanced Modeling Techniques", Aerospace Conference, IEEE, Big Sky, MT, Mar. 3-10, 2007.

Liu, et al., "Thermomechanical Fatigue of Sn-37 wt.% Pb Model Solder Joints", Materials Science and Engineering, vol. A362, 2003, pp. 309-321.

Morris, et al., "The Influence of Microstructure on the Mechanics of Eutectic Solders", Advances in Electronic Packaging, vol. 2, 1997, pp. 1529-1534.

Nasser, et al., "Electronic Material Microstructural, Variability-Based, Total Life Fatigue Prediction Approach", International Conference on Intelligent Processing and Manufacturing of Materials, Monterey, CA, USA, Jul. 19-23, 2005.

Nasser, et al., "Material Simulation-Based Electronic Device Prognosis", IEEE Aerospace Conference, Mar. 5-12, 2005, pp. 1-6.

Pang, et al., "Low Cycle Fatigue Models for Lead-Free Solders", Thin Solid Films, vol. 462, 2004, pp. 408-412.

Schubert, et al., "Fatigue Life Models for Sn—Ag—Cu and Sn—Pb Solder Joints Evaluated by Experiments and Simulations", Electronic Components and Technology Conference, 2003, pp. 603-610.

Shi, et al., "A Modified Energy Based Low Cycle Fatigue Model for Eutectic Solder Alloy", Scripta Materialia, vol. 41, 1999, pp. 289-296.

Shi, et al., "Low Cycle Fatigue Analysis of Temperature and Frequency Effects in Eutectic Solder Alloy", International Journal of Fatigue, vol. 22, 2000, pp. 217-228.

Shohji, et al., "Tensile Properties of Sn—Ag Based Lead-Free Solders and Strain Rate Sensitivity", Materials Science and Engineering, vol. A3666, 2004, pp. 50-55.

Siewert, et al., "Properties of Lead-Free Solders, Release 4.0", National Institute of Standards and Technology and Colorado School of Mines, 2002.

Stinson-Bagby, "Microstructural Evolution in Thermally Cycled Large Area Lead and Lead-Free Solder Joints", Master's thesis, Virginia Polytechnic Institute and State University, 2002.

Tang, et al., "Experimental Characterization of Material Degradation of Solder Joint Under Fatigue Loading", Inter Society Conference on Thermal Phenomena, 2002, pp. 896-902.

Tryon, et al., "A Reliability-Based Model to Predict Scatter in Fatigue Crack Nucleation Life", Fatigue & Fracture of Engineering Materials & Structures, 1998, vol. 21, pp. 257-267.

Tryon, et al., "Probabilistic Mesomechanical Fatigue Crack Nucleation Model", J. Eng. Mat. and Tech., 119, Jan. 1997, pp. 65-69.

Tryon, "Probabilistic Mesomechanical Fatigue Model", NASA Technical Report NASA/CR-97-202342, Apr. 1997, pp. 1-29.

Tryon, et al., Reliability-based computational model for material development and structural design, Int. J. Mat. and Prod. Tech., (2001), vol. 16, p. 333-357.

Zhao, et al., "Fatigue Crack Growth Behavior of Sn—Pb and Sn-Based Lead-Free Solders", Engineering Fracture Mechanics, vol. 70, 2003, pp. 2187-2197.

Knecht, S., "Integrated Matrix Creep: Application to Lifetime Prediction of Eutectic Tin-Lead Solder Joints", in Electronic Packaging Materials V Symposium, Mater. Res. Soc., Boston, MA, pp. 411-423, 1991.

Knecht, et al., "Integrated Matrix Creep: Application to Accelerated Testing and Lifetime Prediction", in Solder Joint Reliability—Theory and Applications, Ed. J. H. Lau, Van Nostrand Reinhold, New York, 1991.

* cited by examiner

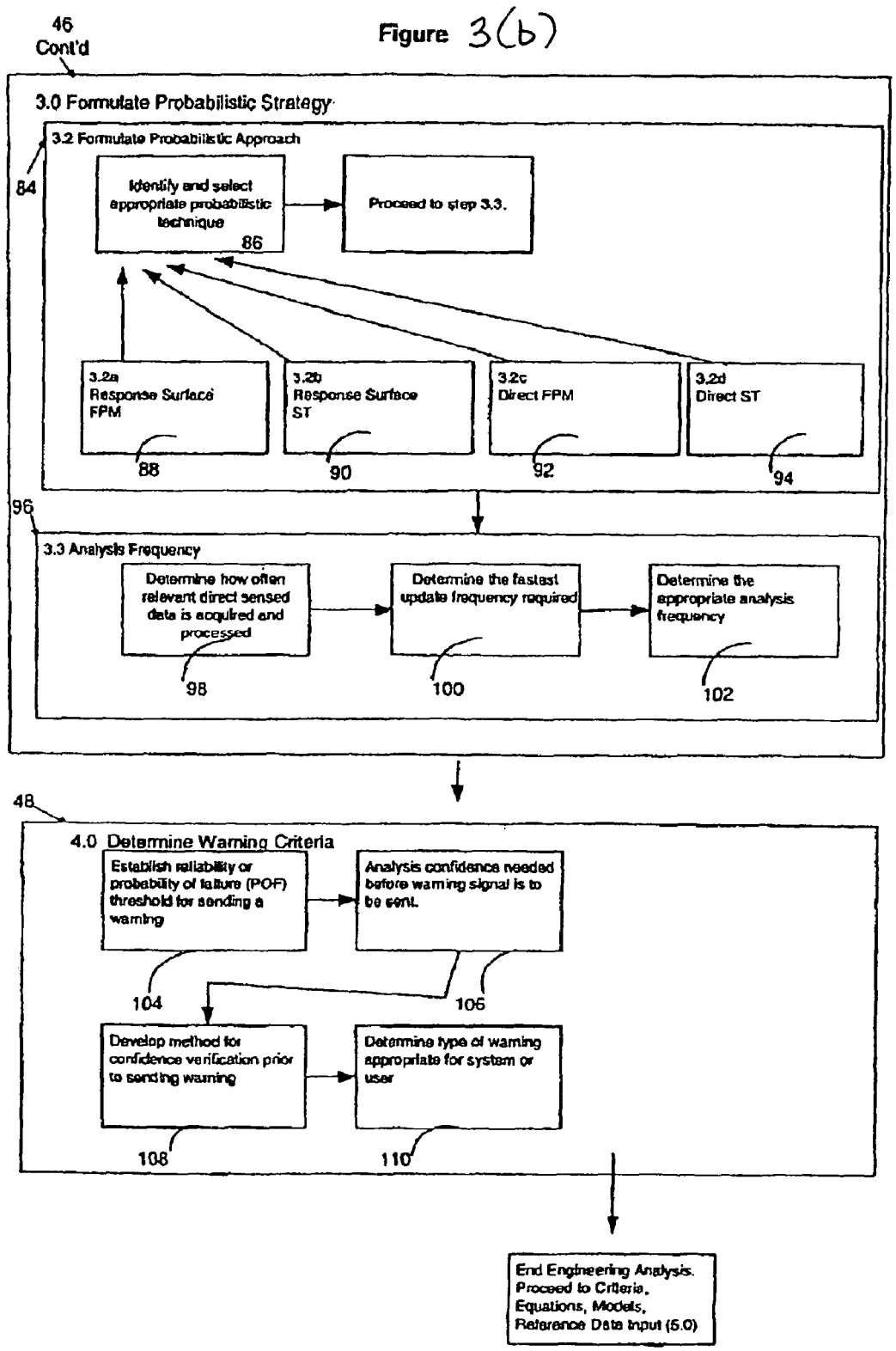

Representative
Ill-Shaped Facet

MATERIALS-BASED FAILURE ANALYSIS IN DESIGN OF ELECTRONIC DEVICES

CROSS-REFERENCE TO RELATED APPLICATIONS

This application claims the benefit of priority of provisional application Ser. Nos. 60/761,958, filed Jan. 24, 2006, and 60/778,196, filed Mar. 1, 2006, both of which are incorporated herein by reference in their entirety.

ACKNOWLEDGMENT

The technology described and claimed herein was made with Government support under Contract No. N68335-05-C-0127, awarded by the Naval Air Warfare Center. The U.S. Government may have certain rights in the technology.

TECHNICAL FIELD

The technology described herein relates to a method, apparatus, and programmed computer readable medium for designing an electronic system, module, or component based on models for predicting failure thereof. More specifically, it relates to a method, apparatus, and programmed computer readable medium for designing an electronic system, module, or component using a microstructure-based material fatigue model developed using probabilistic methods.

BACKGROUND

Imagine the fantasy of perfect reliability. Applied to a single instance of a product, it would mean that the product always worked exactly as intended—however it was used, whatever conditions it was exposed to. Perfect reliability is hard enough to achieve in a single product, but very few products are built as single instances. Even without considering normal manufacturing variance, inherent randomness of the grain structure within a product's materials dictates that no two copies of a product could ever be built exactly alike. Just that level of variation at the grain structure level can give rise to differences in failure outcomes. Real world manufacturing processes then add further variance to different instances of a given product. Once the products are put in service, the particular life-time use of any copy will be unique (some copies may be overly stressed, others treated gently), and will take place under differing external conditions (heat, cold, shock loads, dust, etc.), all of which add further variation. Perfect reliability would mean that no copies ever failed—that in spite of manufacturing variances, differing uses, and exposure to differing conditions, nothing ever went wrong.

In normal practice, then, across all copies, all uses, and all exposures, some number of product failures will occur. Coming to a quantitative understanding of these failures—how many are likely to occur, when they are likely to occur, under what conditions they will occur, why they will occur, how to reduce their occurrence, therefore has significant benefits.

Most products are composites of many components. The reliability of the product is a function of the reliability of all of the parts, including connections between the parts. Disregarding operator error—e.g., settings on the production line were grossly mis-set—products fail because of a material failure in a component. For example, electronic devices can fail when an interconnect fails. Materials fail because repetitive stress applied over time causes internal micro-structures (e.g., grain domains) to move or distort sufficiently to nucleate a discontinuity which leads to the propagation of a small crack, leading to a larger one, and finally to outright material failure.

Electronic devices, such as power supplies, are particularly reliant on the integrity of interconnects or solder bonds. The reliability of interconnects is a concern because it is widely expressed in the open literature that fracture failures in solder joints account for up to 70% of failures in electronic components. Interconnect or solder degradation and failure is principally due to thermomechanical fatigue mechanisms.

Electronic devices such as power supplies are complex multilayered devices consisting of different materials with inherent variability. Power supply systems are—compared to other electronic systems—highly susceptible to failure due to the high voltage and current conditions in which they routinely operate. Competitive pressures are demanding that electronics be operated under increasingly harsh environments and operating conditions. Also, the trend to provide more processing power from smaller and smaller integrated circuits is accelerating. However, even electronic devices fail eventually, regardless of how well they are engineered. Unlike mechanical systems, these electronic systems do not actively display conventional fault signals prior to failure. As a device is operated, thermal and/or mechanical loads are induced in it. These loads are translated from the device level to the localized interconnect level. Thermal gradient cycling occurs during system operation and eventually results in thermo-mechanical fatigue induced failure. Failure can frequently be attributed to structural, material, or manufacturing defects. For example, an electronic circuit can fail from the loss of a solder joint. A failure at the module or component level often leads to failure of the whole system. Such failures can result in immediate electronic system shutdown with no advanced fault or warning signals, thus preventing the use of conventional fault-to-failure detection approaches as a means of predicting maintenance need. Such failures also present safety or maintenance concerns and often result in economic setbacks such as loss of market share when the product's failure rate becomes sufficiently notorious.

The consequences of failure of a product to the immediate user range from minor inconvenience, to major annoyance, or to catastrophe. Repercussions from such failures ultimately transform into consequences for the manufacturers. It is such consequences that motivate product manufacturers to develop rational strategies to minimize occurrence of failure. The strategies vary depending on specific motivating circumstances, but all involve economic considerations and trade-offs. Even if a product has a significant potential to produce catastrophic results, economic trade-offs cannot be ignored (for one can always spend more and take more time testing, to achieve still higher levels of safety). Less dramatically, when building reliable products is motivated merely by achieving market success, economics is an inherent and more natural part of the calculation.

To approach reliability at a strategic level, an organization must properly integrate reliability factors into the details of its product design processes, deciding throughout the process how much reliability to purchase—that is, how to make rational decisions at all steps along the way about the economic trade-offs associated with the benefits versus the costs of achieving ever greater reliability. Manufacturers that understand reliability properly, and are able to execute according to that understanding, will in the long run significantly outperform manufacturers that do not. This represents a paradigm shift from old methods in which a reliability specialist designed an analysis framework, tested a product or component in that framework, and repaired or adjusted the product or component accordingly. In approaches advocated herein, so-called reliability-based design, a designer uses a knowledge of failure to develop an understanding of component life, thereby permitting control of various factors.

However, it is simply not practical to directly sense the degradation of electronic components. Their damage states are usually structural and, due to their size, structural response signatures are not monitored on electronic components. None of the electronics industries traditionally used fatigue models to account for the large scatter in the solder weld properties. For example, it would be both difficult and expensive to directly sense the cracking of a single emitter wire bond on a circuit board comprised of thousands of emitter wires. Yet, the failure of a single emitter wire can cause the failure of the entire device.

If there were an effective way to predict the impending failure of an electronic system, module, or component, operators could repair or retire a system before an actual failure, thus avoiding the negative consequences of failure. Thus, accurate prediction of impending failure could have great economic impact on industries whose products rely on electronics such as aerospace, automotive, communications, medical device, domestic appliance, and related sectors.

Engineers have tried to design electronics for high reliability, but most often the reliability information comes very late in the design process. Normally, a statistically significant quantity of reliability data is not obtained until after product launch, and warranty claims from use by consumers have been fielded. This lack of data inspired engineers in the past to make their designs more robust by using safety factors that ensured the designs meet reliability goals.

Similar components frequently present great lifespan variations, however. One electronic element might last many years, but another element produced by the same manufacturer could fail in a few months. Traditional methods of component design attempt to moot the effects of great uncertainty or scatter in lifespan by applying large safety factors to ensure low probabilities of failure. Safety factors, however, are subjective in nature and are usually based on historical use. Since modern manufacturers are incorporating new technology and manufacturing methods faster than ever before, exactly what safety factor is appropriate in today's complex, state-of-the-art, electronics is seldom, if ever, known with certainty. This complicates the engineering design process. Designed-in safety factors tend to add material or structural components, or add complexity to the manufacturing process. Safety factors are counterproductive where industry is attempting to cut costs or reduce weight. To ensure that no component fails during operation (e.g., aircraft parts), components are often retired well before exhausting their useful lifetime. In addition, the true operating life of the component could be much greater than its predicted life. Therefore, given that true operational performance is so difficult to predict accurately, it is common practice within the electronics industry to achieve high reliability through redundancy. Although redundancy allows an electronic system to continue to operate after one or more components have failed, this practice is costly and presents a barrier to electronics miniaturization. Designing cost effective and highly reliable electronics through maximizing component life therefore requires the ability to reduce the safety factors as much as possible for a given design.

Previously the reliability of electronic devices has also been assessed using empirically-based models. Design of experiments is a commonly used tool in which the experimental conditions are systematically varied and a mathematical relationship is "fit" to the data that represents the influence of the conditions to the time or cycles to failure. However, one problem is the fact that there is so much variation in the time or cycles to failure that device life can only be conveyed in the form of a statistical average, such as mean time to failure (MTTF) or the mean time between failure (MTBF). Although these statistical averages provide a general sense about average overall failure, they are a hold over from a time when computer processing power was expensive. They only provide information on a single point number and offer no insight about real world probabilistic variation, true failure mechanisms or the impact those mechanisms have on how a specific design will react to actual field conditions. Accordingly, although such metrics are appropriate in the context of manufactured fleet lot reliability they lack the fidelity for accurate representation of individual device reliability in the field.

The mathematics behind simulation processes, such as a Monte Carlo method, have been widely used within reliability analysis circles. Previous barriers to wide-spread use of such simulations include the fact that a typical designer doesn't have access to reliability data needed to accomplish a system roll-up process. For example, warranty data with relatively good accuracy is readily available to corporate reliability groups, and these relatively few number of engineers are the ones who have been able to perform high quality "advanced-look" reliability assessments for concept designs.

In attempting to reduce reliance on safety factors, designers have developed models for the more prevalent damage mechanisms that lead to failures. Failures can be attributed to many different kinds of damage mechanisms, including electro-migration, buckling, and corrosion. Models for these mechanisms can be used during the design process, usually through deterministic analysis, to identify feasible design concept alternatives. Nevertheless, poor, or less than desired, reliability is often attributed to variability, and deterministic analysis cannot account for variability.

Variability affects electronic reliability through any number of factors including loading scenarios, environmental condition thanges, usage patterns, and maintenance habits. Even the response of a system to a steady input, such as a constant voltage supply, can exhibit variability due to parameters such as a varying ambient temperature.

Over the years, probabilistic techniques have been developed for predicting variability and have been coupled with damage models of failure mechanisms to provide probabilistic damage models that predict the reliability of a population. But, given variability, a prediction of the reliability of a population says little about the future life of an individual member of the population. Safety factors are likewise unsatisfactory methods for predicting the life of an individual since they are based on historical information obtained from a population. Safety factors are also an unsatisfactory method for quickly and efficiently designing against failure since they rely on historical information obtained from test and component data which may not be available in the design phase.

Historically, testing has been the primary means for evaluating the effects of variability. Unfortunately, testing is slow, expensive and burdensome, and evaluation of every possible source of variability is impractical.

The cost of physical tests are rising whereas the cost of computer cycles are plummeting, thereby increasing the practicality of replacing the old "test it" paradigm with a "compute it" paradigm. Testing cannot be completely eliminated. Physical modeling paradigms are not yet sufficiently robust to allow that. However, as part of a new approach to reliability, testing can be focused on providing the critical inputs to the modeling process, allowing computational techniques to then take over and provide a vivid and detailed picture of failure mechanisms—far beyond what testing alone could ever provide. Computational reliability modeling will significantly reduce engineering costs while simultaneously providing a more detailed insight into the reliability issues facing a given product design. The goal of CRM is to allow the design engineer to achieve desired levels of product reliability assurance across the widest possible range of operating conditions, including edge states that bedevil the most robust testing programs.

Failure analysis has revealed that actual component loadings are often well below the steady loads that can cause failure. What distinguishes these failures is the fact that the loads have been applied repeatedly. This is classic fatigue. It is estimated that perhaps 90% of all machine failures are caused by fatigue. Fatigue, or more specifically fatigue crack initiation and growth, is therefore a damage mechanism that degrades the reliability and safe life of components subjected to repeated loads. Such loads could be from thermal, vibratory, shock, and electromagnetic loadings. Although less obvious, this same mode of failure applies to static structures as well. Static structural components are subject to vibrations and movements created from thermal expansion and contraction. Though the movements may be slight, large cyclic forces can result. Designing for fatigue has been difficult hitherto because fatigue typically manifests itself with greatly varying effects on similar components.

Fatigue can occur in any device with either static or moving components, even where the movement is imperceptible, such as is the case with interconnects or solder joints, where there can be very small displacements but very large strains (displacements per unit length). Component failure is frequently insidious, with no prior indication that damage had occurred. Sometimes fatigue can cause intermittent failure. For example, an initiated fatigue crack in solder can cause the device in which the solder is found to operate sporadically due to metallic contact bridging.

Electronic systems are static structures that are subject to these same types of phenomena. Solder joints are particularly vulnerable to fatigue failure. As systems are powered up and down, these interconnect elements are subject to thermal gradient cycling, which, working in combination with vibration, impact, and shock loadings, creates dynamic conditions conducive to fatigue. The typical electronics printed circuit board (PCB) manufacturing processes, in which solder is melted and then cooled, creates joints with complex internal grain structures. These grain structures are under stress from the cooling process, and undergo continuous movement in response to these stresses. This movement, which is on-going even as the system is sitting under non-working conditions in a warehouse, is in itself sufficient to contribute to fatigue vulnerability.

In the case of fatigue failure, scatter in component life is quantified by a coefficient of variation (COV) which is usually determined based on a large number of fatigue life tests on many material specimens, or by full-scale testing of prototype electronic systems. Even under well-controlled laboratory tests of annealed smooth specimens at room temperature, the COV varies from less than 10% to over 500% for different interconnect alloys. Thus, the considerable scatter in the fatigue reliability of components in operation may be substantially attributed to considerable scatter of component material fatigue behavior.

Life scatter of components made from a given material, on the other hand, is due to the fact that, generally, materials have inhomogeneous microstructures. To the naked eye, it may appear that a material is composed of continuous homogeneous material. However, microscopic examination reveals that metals, for example, are comprised of discontinuous inhomogeneous material having individual crystalline grains, pores, and defects. Cracks nucleate and grow on the order of grain size according to the properties of the individual grains, with growth rates as varied as grain properties. As these cracks grow, the rate and behavior of the crack approaches the bulk or average properties of the material. Therefore, for large cracks, traditional crack growth methods are appropriate. Traditional methods, however, cannot determine the probability of crack initiation or describe crack growth of nearly grain-sized cracks. In many applications, failure can occur before the fatigue damage reaches the long crack stage because although the damage is very small, the strain energy associated with the damage is very high.

As a result, there exists a need for a method and apparatus for accurately predicting failure that accounts for the microstructural properties of materials and sequential variation in the loading, and relates them to fatigue scatter. In particular, there exists a need for a method and apparatus for accurately predicting electronic component, module, and/or system failure that accounts for variability without the need for extensive test data on the electronic component and/or system. This can be accomplished by accurately assessing a component's life by determining the effects of fatigue on it.

In short, fatigue must be considered a primary mechanism behind electronics failure, and applying the types of modeling techniques advocated in this application can lead to major improvements in the understanding of electronic system reliability.

U.S. Pat. Nos. 7,006,947, and 7,016,825, both of which are incorporated by reference in their entirety, have shown that grain by grain simulation of the materials from which individual components are made has proven successful for fatigue life prediction on large structural components, as well as provide prognoses of failure when using measured data. However similar approaches to predict reliability of small-scale components such as interconnects has not been thought possible or practical.

The discussion of the background to the invention herein is included to explain the context of the invention. This is not to be taken as an admission that any of the material referred to was published, known, or part of the common general knowledge as at the priority date of any of the claims.

Throughout the description and claims of the specification the word "comprise" and variations thereof, such as "comprising" and "comprises", is not intended to exclude other additives, components, integers or steps.

SUMMARY

Products are composites of many component elements, all of which are individually subject to various stresses during their lifetimes. The reliability of the overall product is a function of the reliability of all of the parts, including interconnections between the parts. It is a premise of the technology described herein that if reliability of components and interconnects is sufficiently understood, it becomes possible to mathematically model the contributions to overall system reliability from each of the lower level elements. This is done by well understood and accepted simulation techniques. Furthermore, it is also possible to work in reverse, and apportion a top down 'reliability budget' on a system's component parts based on a needed overall system level reliability. This top down technique can be expanded to allow engineers to robustly explore various options by analytically gauging the trade-off of reliability improvements in specific components against the costs of making those improvements.

With inputs from all of the parameters discussed herein, plus parameters inherent to the material itself, this process is physically deterministic at some fundamental microstructural level. One of the inputs to the calculation, however, is the particular alignment of any grain with respect to any other. In real materials these alignments are random, and this randomness must be explicitly brought into the calculations of failure. So, while all grains will respond to the applied stress in a manner governed by a common physics, the random geometries of the grain structure determines that a specific failure outcome at the macro level will be probabilistic, not deterministic. It is this randomness of grain properties that gives rise to the failure mechanisms observed in real physical systems—macroscopically identical parts subjected to the same stress profile will fail differently, with a probability distribution governed by the specifics of the grain structure and part geometry. It is possible to mathematically model these material level failure mechanisms by combining the physics of grain structure response to stress with a Monte Carlo simulation of the randomness of grain size and orientation. The outcome from these models matches to a high degree of accuracy with experimental data gathered from actual testing, and can be fed into the higher level system roll-up models discussed herein.

This invention provides a method for predicting the failure of an electronic system containing many electronic components. An embodiment of the method comprises obtaining a Finite Element Model (FEM) of the component; analyzing the FEM to obtain stresses at its nodes; identifying a subset of the nodes as significant nodes based on the stresses; determining a Representative Volume Element (RVE) for the significant nodes; developing an RVE microstructure-based failure model for the RVE's; simulating a component life using RVE microstructure-based failure models to produce a result related to the component life; performing the simulation a plurality of times to produce results related to the component life; preparing statistics using the results; and comparing the statistics to a probability of failure (POF) criterion to determine whether the performing predicted failure for the component. Failure of an electronic system is the combination of individual component failure predictions taking into account interrelationships and failure interactions.

The invention also provides an apparatus for predicting the failure of an electronic systems. An embodiment of the apparatus comprises a central processing unit (CPU); an output device for displaying simulated prediction results; an input device for receiving data; and a memory comprising: instructions for receiving input comprising a component's material characteristics; instructions for using RVE microstructure-based failure models and the input and predicting failure of the component, the prediction comprising: simulating a component using at least one RVE microstructure-based failure model, the simulation producing a result related to component life; performing the simulating a plurality of times to produce results related to component life; preparing statistics using the results; and comparing the statistics to a probability of failure (POF) criterion to determine whether the performance predicted failure for the component; and instructions for displaying a result from the prediction.

A method and apparatus for predicting electronic system failure, or electronic system reliability, using a computer implemented model of the system. In an embodiment of the invention, that model relies upon probabilistic analysis. Probabilistic analysis can incorporate any number of known failure mechanisms for an individual component, or module, of a system, into one model, and from that model can determine the critical variables upon which to base predictions of system failure. Failure can result from a number of mechanisms or combination of mechanisms. A probabilistic model of the system can nest failure mechanisms within failure mechanisms or tie failure mechanisms to other failure mechanisms, as determined to be appropriate from analysis of the inter-relationships between both the individual failure mechanisms and individual components. This results in a model that accounts for various failure mechanisms, including fatigue, electro-migration, loading, age, temperature, dwell, and other variables as determined necessary to describe the system. As a result of probabilistic analysis, the variables that describe the system can also be ranked according to the effect they have on the system.

Probabilistic analysis of an electronic system can predict system and/or module and/or component failure, or reliability, based on acquired data in conjunction with data obtained from the scientific and technical literature and data inferred from the acquired data. This prediction of failure or reliability is then communicated to those using or monitoring the system. Furthermore, the analyzed system can be stationary or mobile with the method or apparatus of analysis and communication of the failure prediction being performed either on the system or remotely from the system. In addition, the apparatus may interface with other computer systems, with these other computer systems supplying the required data, or deciding whether and/or how to communicate a prediction.

An advantage of one embodiment is that it divides system variables into three types: directly sensed—those that change during operation or product use; referred—those that do not (significantly) change during operation or product use; and inferred—those that change during operation or use but are not directly sensed. This approach divides the probabilistic approach into two broad categories, pre-process off-board analysis and near real time on-board or off-board analysis, allowing for prediction of a probability of failure based on both immediate and historic use.

In one embodiment, a computer implements a method for predicting failure in an electronic system. This method comprises: obtaining data associated with an electronic system; creating a prediction of a failure of the electronic system using a model of the system and the data; and communicating the prediction to a user or operator.

A second embodiment is an apparatus for predicting failure of an electronic system. This apparatus comprises: sensors for acquiring data from the electronic system and a computer, the computer having a processor and memory. Within the memory are instructions for measuring the data from the sensors; instructions for creating a prediction of a failure of the electronic system using a model and the data; and instructions for communicating the prediction to a user. The apparatus also comprises communication means for communicating the prediction.

A third embodiment of the invention is a computer program product for predicting failure of an electronic system for use in conjunction with a computer system. The computer program product comprises a computer readable storage medium and a computer program mechanism embedded therein. The computer program mechanism comprises: instructions for receiving data; instructions for storing the data; instructions for creating a prediction of failure of the system using a model and the data; and instructions for communicating this prediction. Furthermore, embodiments of these apparatuses and this method use a system model developed with probabilistic methods.

BRIEF DESCRIPTION OF THE DRAWINGS

The foregoing and other aspects and advantages of the present invention will be better understood from the following detailed description of preferred embodiments of the invention with reference to the drawings, in which:

FIGS. 3(a)-(d) illustrate a preferred embodiment of the off-board engineering portion of an embodiment of a method of the present invention;

Similar reference numerals refer to corresponding elements throughout the several drawings.

DETAILED DESCRIPTION

Theory of Fatigue

Fatigue life prediction methods applied to electronic components consider three stages: crack initiation, long crack propagation, and final fracture. Long crack propagation and final fracture are stages of damage accumulation that are well characterized using computational models such as linear elastic or elastic-plastic fracture mechanics.

Figure 1:
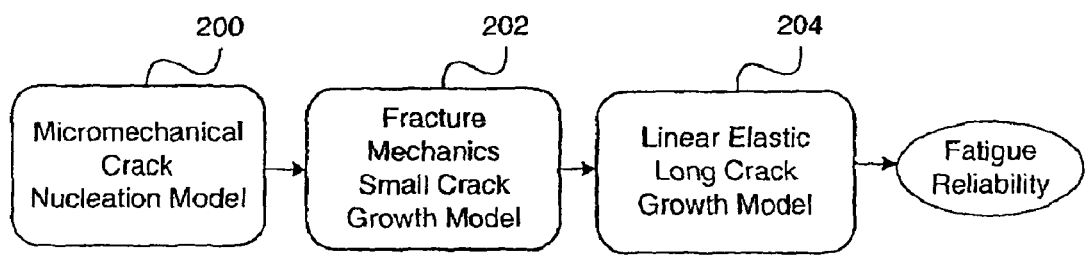
FIG. 1 illustrates three levels of fatigue damage in a high strength component.

FIG. 1 depicts three levels of fatigue damage that may occur in a typical high strength component. First, a crack nucleates 200 on a small scale on the order of the grain size. Then the crack grows as a microscopically small crack 202 in which the crack lies in relatively few grains. The material properties, averaged along the front of the crack, approach bulk or average material properties as the crack grows and the number of grains intercepted by the crack front increase. When the material properties intercept enough grains, traditional crack growth techniques such as linear elastic fracture mechanics 204 may be applied. But the majority of crack life is spent in the nucleation and small crack growth regime for electronic components. Thus, understanding the early crack behavior is most important.

The early stage of damage accumulation is crack initiation, characterized by small cracks with depths less than several grain diameters. These have been observed to deviate significantly from predicted long crack fracture mechanics, a fact attributed to the heterogeneous nature of the material in which small cracks evolve. The crack initiation phase accounts for the majority of scatter in fatigue life for many alloys. The crack initiation stage contains two phases: crack nucleation and small crack growth.

Crack nucleation is a locally complex crack formation on the microstructural scale. One example exhibited by materials having a propensity for planar slip is the smooth fracture at angles inclined to the loading direction. Crack growth is the similarly complex process occurring after crack nucleation.

Current crack initiation models such as Coffin-Manson are based on empirical testing, causing crack initiation models to be simple parametric functions of applied stress variables. As such, these macrostructural models assume a homogeneous, continuous material. Using statistical concepts, empirical fatigue life models such as Coffin-Manson where the independent variable, usually applied global stress or strain, is considered deterministic, and the dependent variable, usually life, is considered random. Typically a database of input data for the model is constructed, based on running different tests at different loads, etc. But these models do not account for the mechanisms of the microstructural parameters that regulate fatigue damage. Since these models do not include this major source of scatter (i.e., microstructural crack initiation, which includes both crack nucleation and small crack growth), they are necessarily unsatisfactory because they cannot represent the heterogeneous material in which the damage processes occur.

Because traditional crack initiation models are empirical, they cannot represent conditions not included in the database that is established to fit the Coffin-Manson model test program, such as sequential variation. Sequential variation is due to the component's use in many different scenarios. For example, an automobile is driven differently during each trip, and an unlimited number of sequential variations would have to be considered to represent the true operating characteristics of electronics systems within an automobile. While current long crack growth propagation models can account for sequential variation in the component usage, it is impractical from a time and cost standpoint to include sequential variations in the applied stress under most test programs. To ensure reliability, therefore, crack initiation tests are generally conducted at a maximum, i.e., "worst case", stress. Thus components are generally systematically over-designed assuming unlikely worst-case material properties to compensate for the lack of true understanding of fatigue behavior of the materials. Additionally, these traditional models are unsatisfactory for predicting individual component failure because the vast majority of components by definition do not possess these unlikely worst-case material properties. Predictions made using such models are based upon the worst-case material properties and are thus inaccurate.

Overview

A product, such as a television, a radar system, an automobile, or a piece of military hardware, comprises many parts. It can be analyzed hierarchically, so that the overall product—referred to as a system—has a number of components, each of which in turn has a number of elements. The methods described herein model failure of products that include at least one electronic component. By electronic component is meant a piece of electronic circuitry such as a resistor, capacitor, or interconnect. A product may have many thousands or millions of electronic components, therefore. The methods described herein model electronic components at the material level and are thus able to incorporate a physics-based description of fatigue.

Figure 2:
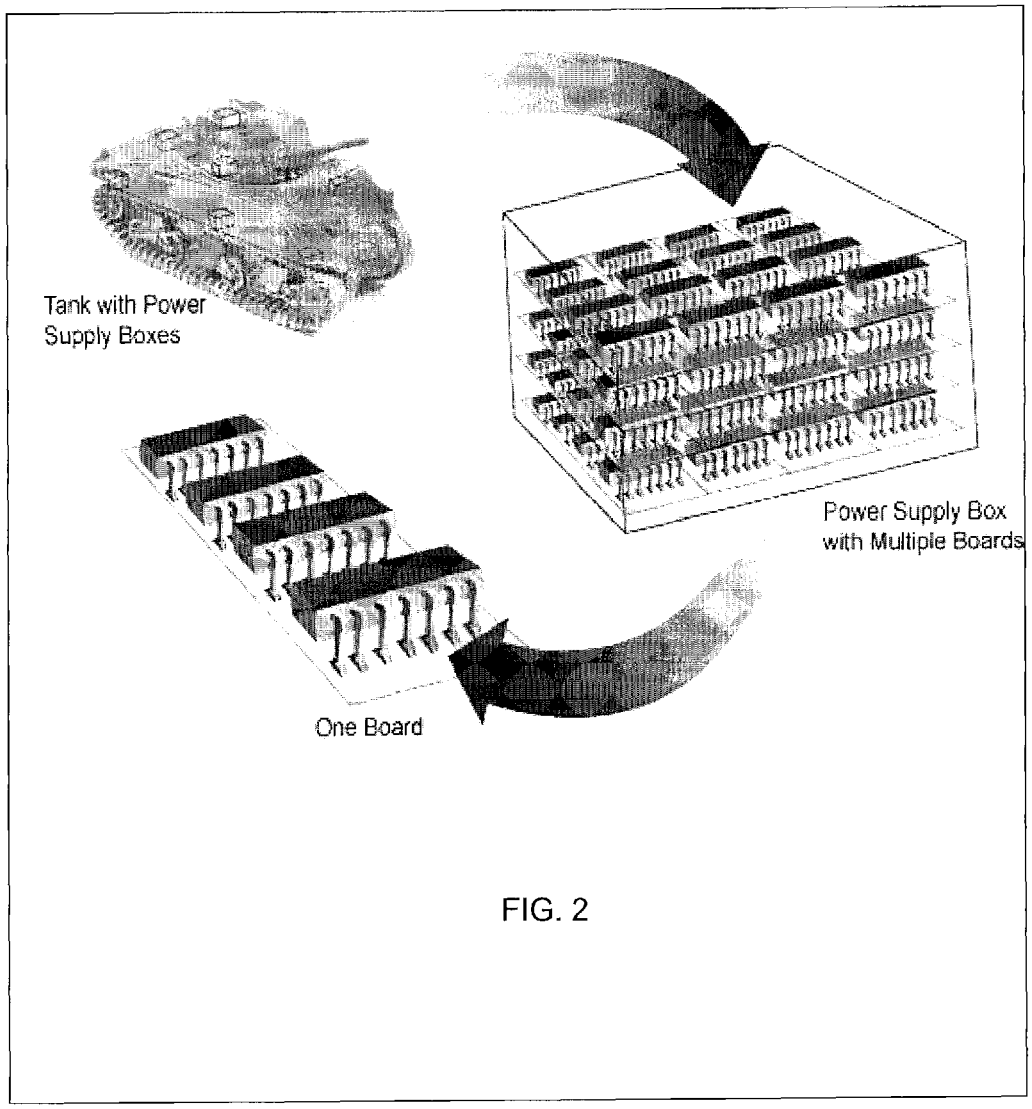
FIG. 2: Heirarchy of a system.

Product hierarchy is shown schematically in FIG. 2 for a military vehicle. The vehicle (the 'system' level) comprises a number of power supply boxes, one of which is shown. A power supply box itself comprises a number of boards, one of which is shown. Each board comprises a number of electronic circuits ('chips') as shown. Each chip may itself comprise a number of electronic components, such as interconnects, resistors, gates, etc.

Reliability of a product is related to the probability that the product will perform its intended function in a satisfactory manner for a specified period of time under realistic conditions. Traditionally, reliability of electronic systems has been estimated based on engineering judgment about the applicability of past test results. The traditional measures of electronics systems reliability have been based on mean-time-to-failure (MTTF) and mean-time-between-failure (MTBF). These measures of reliability were historically developed based on the assumption that product failure rate is constant, i.e., the product is as equally likely to fail on the first day as it is ten years after being put into service. With today's computational design tools and techniques combined with better manufacturing controls, early failure is rare and long term wear-out, such as fatigue, are the predominant concerns. Given the latter, MTTF or MTBF are no longer good measures of reliability.

The reliability of the digital circuit board is a function of the reliability of all of the parts, including interconnections. If component and interconnection reliability is sufficiently understood, it becomes possible to mathematically model the contributions to overall system reliability. This is accomplished using well understood and accepted simulation techniques. Furthermore, it is possible to apportion a top down 'reliability budget' on system component parts based on a needed overall system level reliability. This top down technique allows engineers to confidently explore hypotheticals by analytically gauging the trade-off of reliability improvements in specific components against the costs of making those improvements. Ignoring effects of operator error, products fail because of a material failure in a component or interconnect. As an example, materials fail because repetitive stress applied over time causes internal micro-structures (e.g., grain domains) to move or distort sufficiently to nucleate a discontinuity which leads to the propagation of a small crack, leading to a larger one, and finally to outright material separation and failure. With inputs from all load and geometric conditions, plus parameters inherent to the material itself, this process is physically deterministic at some fundamental microstructural level. At the lowest scale, the technology described herein considers the randomness of grain properties that gives rise to the failure mechanisms observed in real physical systems—macroscopically identical parts subjected to the same stress profile will fail differently, with a probability distribution governed by the specifics of the grain structure and part geometry. In order to predict overall board reliability, the technology rolls up material failure to the overall system level.

Electronics reliability analysis is really the process of analyzing for variability. Real world variability occurs due to the different ways the same product design is used, the environmental influences imposed on the product, processing variations allowed through the tolerance controls and inspection intervals implemented, and the raw material variations that were accepted prior to processing.

The nature of the packaged components and variability within the assembly process creates large variations in the solder welds for even the strictest manufacturing tolerances. The very small size of the welds causes variation of the weld footprint from weld to weld. In addition, the microstructural development of the weld is greatly controlled by rate of cooling from the melt stage. Purely empirically derived models do not account for this real world variability.

Variability can be analyzed at every level of product hierarchy. This is from the lowest level where physics of failure describes the process for fatigue crack initiation and development within the material microstructure, to the complex electronic interconnect, the electronic control unit (ECU), and finally to the overall vehicle system of ECU's. The oversimplification that every element within the system of ECUs has a constant failure rate is not assumed. In fact, no assumptions are made about failure rates. Physics of failure models are used to predict failure rates based on measured statistical variations. Statistical measurements of manufacturing process control determine the statistical variations in the geometric dimensions and product material properties. Warranty records, customer surveys and built-in diagnostics are used to determine the statistical variation in how the product is used. These statistical distributions are combined with the physics of failure within a virtual representation of the electronics product to simulate the product's real world performance. Thus, reliability can be estimated while a product is still on the drawing board.

Within the described technology, failure can be represented as it actually happens rather than as an approximation based upon averages; therefore engineers gain a far truer picture of the actual spreads in reliability performance to be expected for their designs in real life operation. Beyond this, the technology allows engineers to know the impact of each individual design decision on reliability, and an explicit understanding of the impact of individual component reliability performance on system level reliability, and, conversely, the apportionment of a reliability budget at the component level to achieve desired system level reliability goals. Finally, the technology permits the computation of the impact of endogenous factors such as shock, thermal, and vibration, on reliability, and even allows computing the potential impact of edge states that fall outside of the realm of the most robust testing programs.

System-level reliability "roll-up" methodology uses existing failure data, test data or reliability estimates for the various elements that make up the system. The simulation virtually "drives" or tests the specified number of systems.

These deficiencies of simple MTBF and MTFF models are compounded when used to represent a component level roll up into a total system reliability analysis. Each component in such a system has its own probabilistic distribution of failure. The only way to obtain meaningful information about system failure by summing component level failure is to take specific account of all of these distributions via a process such as Monte Carlo simulation System reliability using modeling of components has been described elsewhere (see, Ang and W. Tang, *Probability Concepts in Engineering Planning and Design*, Vol. II, John Wiley & Sons, (1975)), but where such methods use an MTBF or MTTF, which assume some average failure rate, not a probabilistic distribution, they cannot achieve the accuracy sought here.

It is possible to use software that implements the approaches described herein to quickly identify reliability driving parameters within the system. However, this analysis process becomes many times more capable if, through additional data mining, costs can be integrated within the simulation. A cost can be associated with reliability through repair/replacement metrics. Most large automakers have this type of maintenance cost data—even categorized by geographic labor costs and expected supplier variability. The designer will have the ability to identify system cost drivers as well as reliability drivers. These two analyses often yield different results for a single system roll-up. Given this, management has a newfound ability to decide whether the system should be designed for reliability, cost, or an optimized balance of the two. Never before has this kind of immediate engineered reliability and reliability cost projection information been available for management decision making. Models based on historic cost statistics, used predominantly throughout at least the auto industry, do not accurately reflect future engineered designs. This capability will change the manner in which contracts are prepared, warranty strategies are formed, and sales/marketing strategies are implemented.

The technology described herein includes a computer-implemented method for predicting failure in an electronic device during design of the device, the method comprising: receiving data associated with the device, the data including data indicative of a device response to a specific load on the system while the device is in operation; and calculating a prediction indicative of a potential failure of the device using a pre-selected probabilistic model and the data, the probabilistic model selected to calculate the prediction based on at least the specific load, wherein the probabilistic model utilizes at least one of fast probability methods, such as first order reliability methods (FORM), second order reliability methods (SORM), advanced mean value (AMV) methods and mean value (MV) methods, and simulation techniques such as Monte Carlo (MC) methods, importance sampling methods, Latin hypercube methods and stratified sampling methods.

The probabilistic model is derived by a method comprising: obtaining a Finite Element Model (FEM) of a component; analyzing the FEM to obtain stresses at nodes of the FEM; determining a Representative Volume Element (RVE) for at least one of the nodes; building a microstructure-based failure model for at least one RVE and including the microstructure-based failure model in the RVE; simulating a component life using at least one RVE microstructure-based failure model, the simulating producing a result related to the component life; performing the simulating a plurality of times to produce results related to component life; and using the results to provide a prediction of failure for the component.

Material simulation is rolled up to the overall board or system level to predict overall electronics reliability. Electronic design automation. (EDA) software is used throughout the industry for electronic layout and functioning, thermal, and even stress analysis. Methods described herein may be integrated seamlessly with commercially available EDA environment(s). As a designer uses EDA software drag-and-drop functions to build a prototype system, representative reliability statistics for the individual system elements can follow-on with already built in electronic attributes. Recently developed data mining techniques and software can be used to access warranty, test, or "stored" engineering knowledge, so that a designer can readily perform reliability assessments. Although it is acknowledged that initially the data available to be mined might be minimal or sketchy, over time—as the capability for these data become apparent—the data available for mining will become more accurate and complete.

System

An embodiment of the present invention uses historical data combined with probabilistic engineering analysis models to provide a more accurate method for predicting the probability of failure of an electronic component, module, or a system. This embodiment uses probabilistic analysis models to address, on a system by system basis, the effects of the random nature associated with use, loading, material makeup, environmental conditions, and manufacturing differences. This embodiment assumes that the underlying physics of the system behavior is deterministic and that the random nature of the system response is attributed to the scatter (variability) in the input to the system and the parameters defining the failure physics.

The underlying physics of the electronic system behavior is captured by developing a system response model. This model, which represents the nominal response of the system, uses random variables as input parameters to represent the random system behavior. The system response model may be based on the explicit mathematical formulas of electricity and magnetism of materials, thermodynamics, etc. Computational methods such as TCAD (Technology Computer Aided Design), finite element analysis and computational heat transfer analysis are sometimes used to assess the response of the system. Closely coupled with the system response models are failure models. The failure models, which address both initial and progressive damage, may be either in the form of maximum load interactive criteria, or more specific models, which have been developed by the system's original equipment manufacturers (OEM's), such as electro-migration models.

Probabilistic analysis then determines the variation in the electronic system response as well as variation in the module and component system response. This probabilistic analysis also quantitatively assesses the importance of each of the random variables on the variation in the system response. This allows for development of a rational design framework for deciding which variables need to be controlled and how to increase the reliability of the system. The embodiment of the invention incorporating probabilistic analysis, therefore, provides for more accurate predictions of failure. Thus, this embodiment also provides a basis for more rational design decisions, while reducing expense and time to market.

Figure 3A:
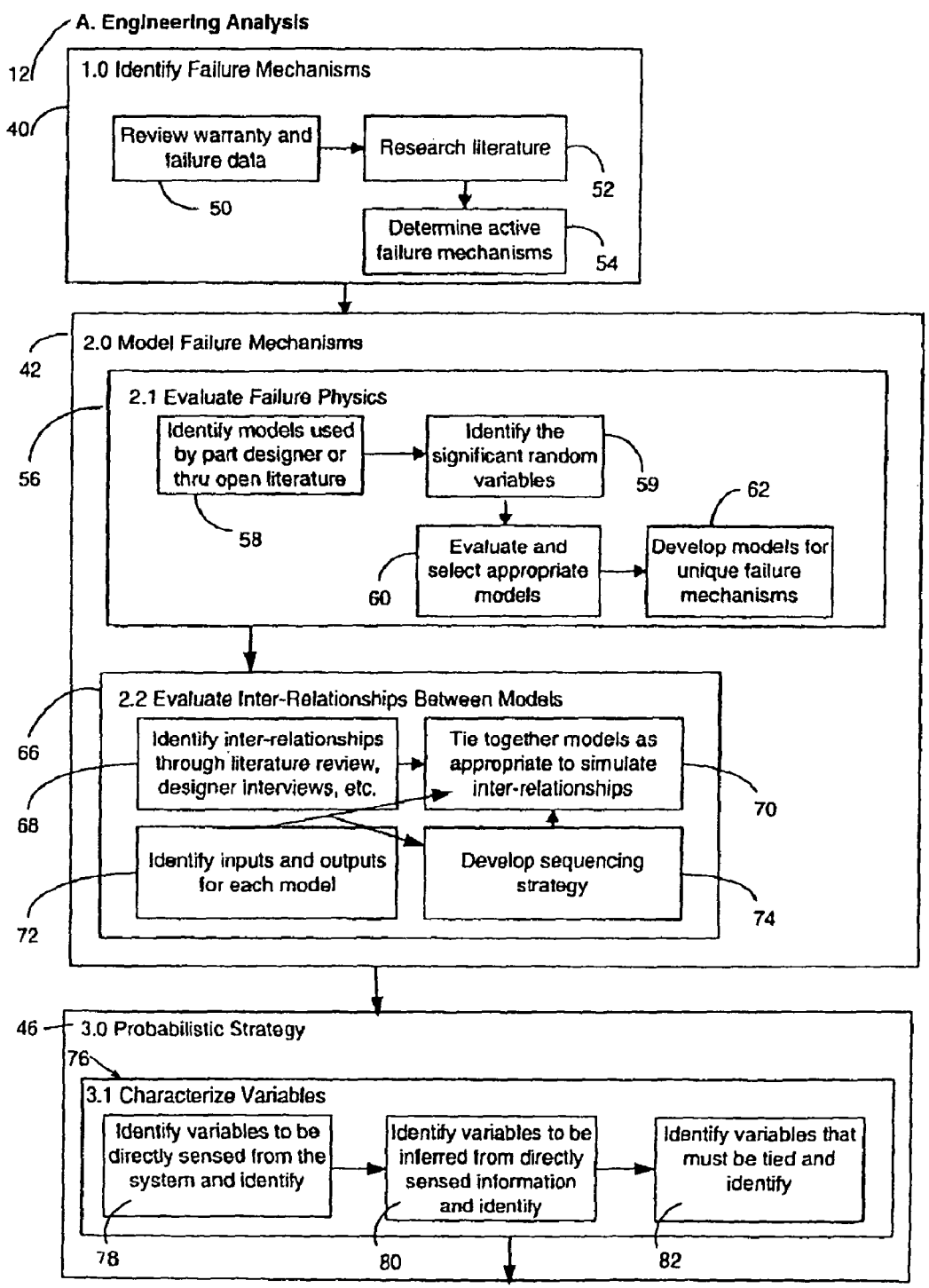
Figure 3C:
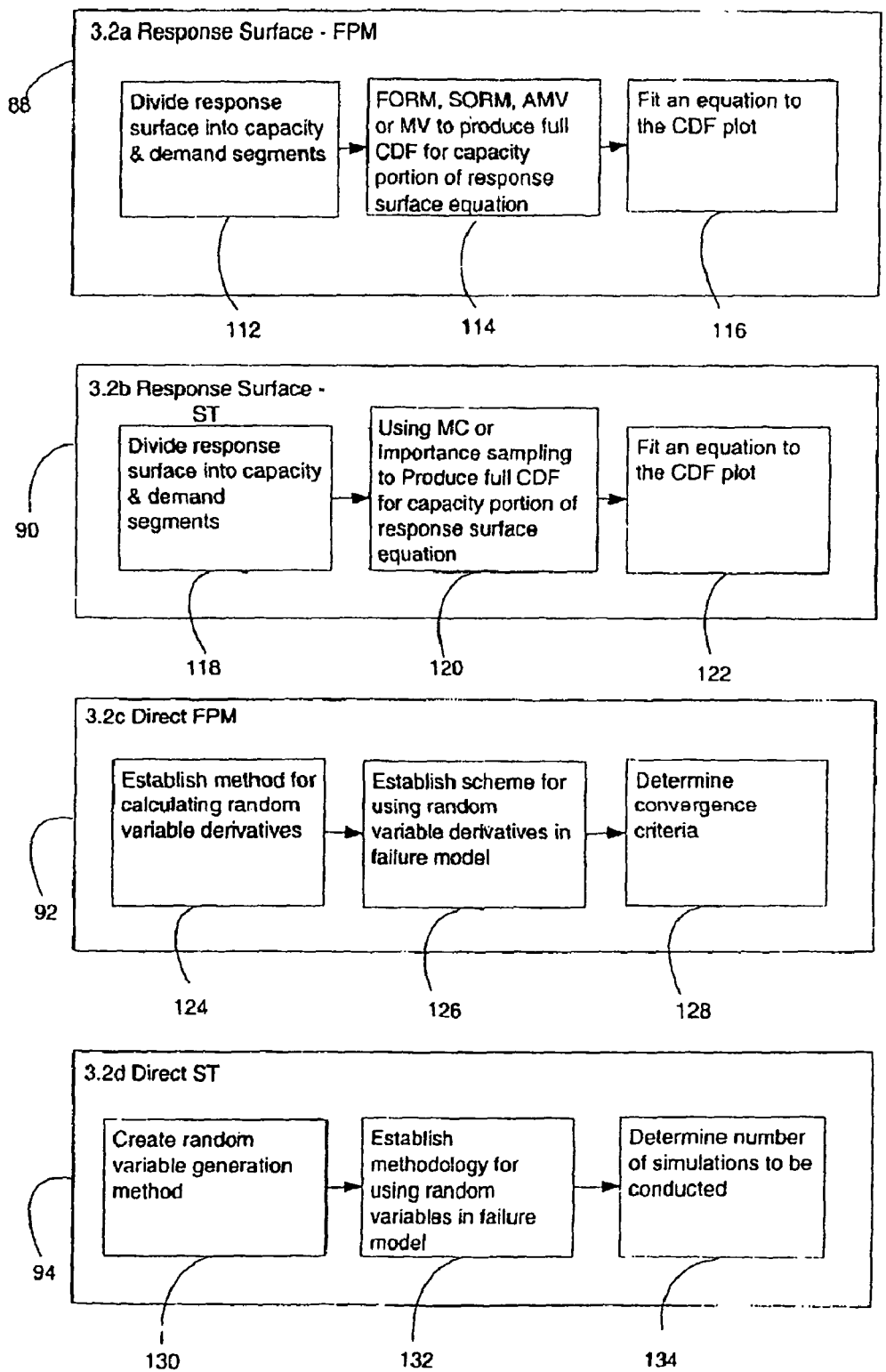
Figure 3D:
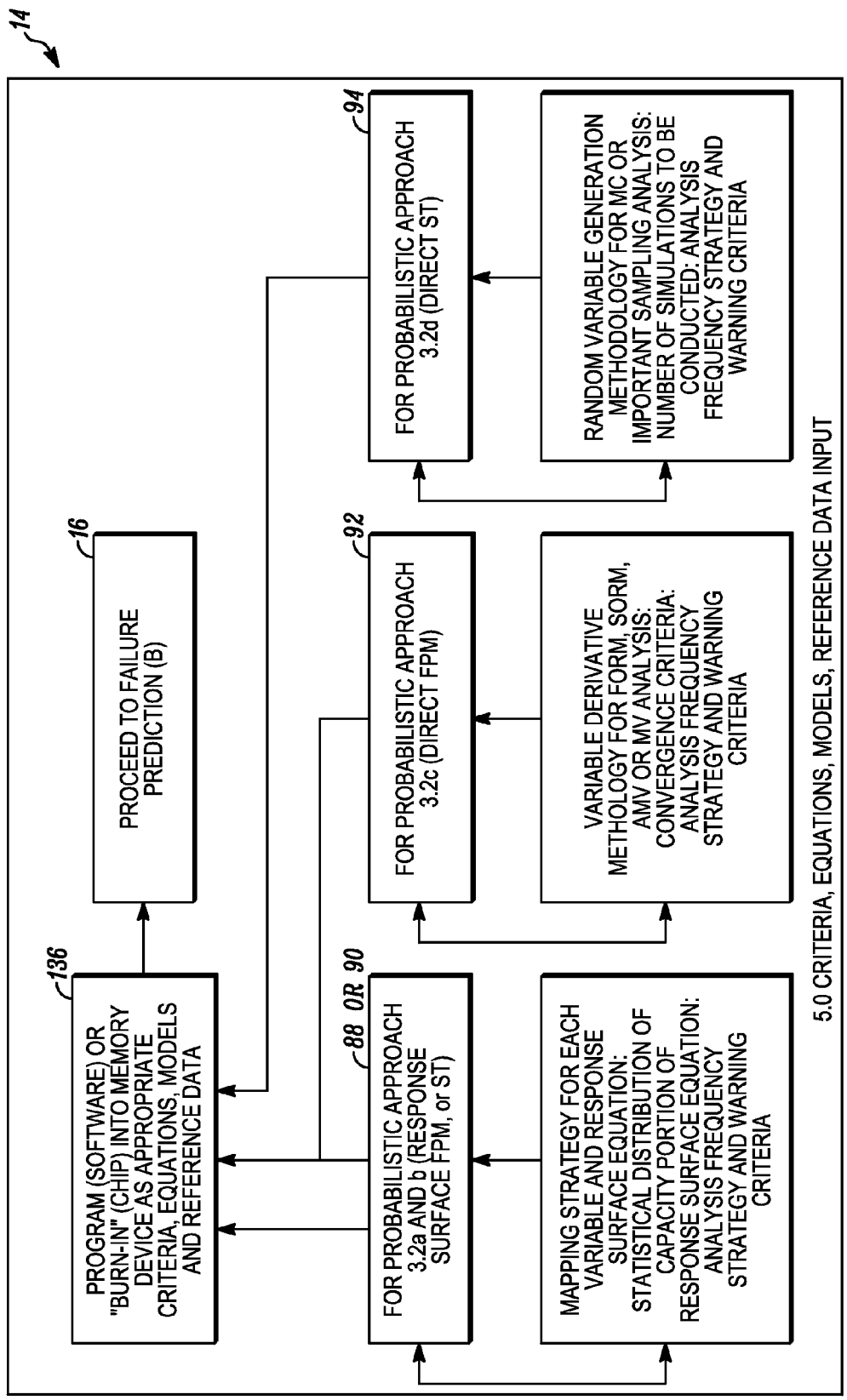

FIGS. 3(*a*)-3(*d*) are flow charts depicting the operation of engineering analysis process step 12 (FIG. 3(*a*)) that results in creation of criteria, equations, models, and reference data 14 (FIG. 3(*d*)). In FIG. 3(*a*) engineering analysis step 12 begins by identifying failure mechanisms at step 40 through review of warranty and failure data (step 50) and research of literature (step 52) to determine which of the identified failure mechanisms are actual active failure mechanisms (step 54). This effort could incorporate discussions with electronic system design staff. Determination of active failure mechanisms can include a variety of evaluations, discussions and interpretations of both component, module, and system response.

Failure mechanisms describe how and why the component fails. For example, mechanisms for delamination in a multi-layered FR-4 circuit board could include shear forces between the layers, adhesive decomposition, or manufacturing defects. Failure mechanisms are then modeled at step 42 by evaluating failure physics (step 56) while also evaluating the inter-relationships between models (step 66). Evaluating failure physics (step 56) requires identifying models from the designer or open literature (step 58), identifying the significant random variables (step 59), evaluating and selecting the appropriate models (step 60), and developing models for unique failure mechanisms (step 62) if no existing models are appropriate. Identifying the significant random variables (step 59) requires determining whether variation in a particular variable changes the outcome of the system. If so, then that variable is significant to some extent.

Inter-relationships between the selected models (step 66) are evaluated by literature review and designer interview (step 68) with the appropriate models tied together to simulate inter-relationships (step 70). Tying the models together as is appropriate to simulate inter-relationships (step 70) necessarily requires identifying inputs and outputs for each model (step 72) and developing a sequencing strategy (step 74). Identifying inputs and outputs for each model also facilitates developing a sequencing strategy (step 74).

FIGS. 3(*a*)-3(*c*) show how to formulate probabilistic strategy at step 46. Formulating probabilistic strategy is a method for predicting the probability of failure that considers the variability of the input and system parameters. Still referring to FIG. 3(*a*), the first step is to characterize variables (step 76). Variables are classified as those that can be directly sensed 78 or that can be inferred 80 from directly sensed information. All of the variables used in the model for design purposes are referenced i.e. historical data. Otherwise, variable values must come from reference (historical) information 82. A part of characterizing variables (step 76) is also to identify the randomness of each variable, i.e., determine the statistical variation of each variable.

Now referring to FIG. 3(*b*), formulation of probabilistic approach at step 84 requires identifying and selecting an appropriate probabilistic technique 86. Two primary probabilistic approaches may be appropriate for prediction analysis: fast probability methods (FPM), or simulation techniques (ST). FPM's include response surface FPM 88 and direct FPM 92 techniques. A response surface approximates the failure physics of the system with a single mathematical relationship. A direct method can have disjoint mathematical relationships and is more simplistic. ST include response surface ST 90 and direct ST 94 as well (FPM and ST techniques are discussed further with reference to FIG. 3(*c*) below, and see Ang and W. Tang, *Probability Concepts in Engineering Planning and Design*, Vols. I and II, John Wiley & Sons, (1975)). Several factors must be considered during selection of probabilistic strategy (step 46) including: CPU 18 computational capacity or limitations; whether it is possible to formulate a response surface equation; the mathematical form of the selected failure models (steps 60, 62) (FIG. 3(*a*)); the needed prediction accuracy; the characteristics of the monitored system; and the desired update speed or efficiency, among others. All factors are weighed in the balance by one of ordinary skill in the art, recognizing that engineering analysis must determine which probabilistic technique is most appropriate for prediction analysis for the particular type of system.

The system itself may dictate the approach. Of the primary probabilistic techniques available for prediction analysis 30, direct FPM 92 and ST 94 methods will always provide a solution to the system that facilitates prediction analysis 30. Response surface FPM 88 and ST 90, however, do not always provide a workable solution. For example, a response surface cannot be formed when considering variables that vary with time and present discontinuities. Direct methods are then necessary. Potentially, such a situation could be handled using multiple nested response surface equations, but a single response surface equation will not suffice. Where a response surface may be used, however, its use can increase the efficiency of the prediction calculations.

Referring to FIG. 3(*c*), FPM optional approaches include first order reliability methods (FORM), second order reliability methods (SORM), advanced mean value (AMV) methods and mean value (MV) methods. ST optional approaches include Monte Carlo (MC) methods and importance sampling methods.

Response surface techniques, whether response surface FPM 88 or ST 90 are divided into capacity and demand segments (steps 112, 118) respectively. For response surface FPM 88, one of the approaches of FORM, SORM, AMV methods, or MV methods is used to produce a full cumulative distribution function (CDF) for the capacity portion of the response surface equation (step 114). A CDF is a plot describing the spread or scatter in the results obtained from only the capacity portion. For response surface ST 90, either MC or importance sampling methods are used to produce a full CDF for the capacity portion of the response surface equation 120. An equation is then fit to the CDF plots (steps 116, 122).

Direct techniques FPM 92 or ST 94 also have both capacity and demand designations, but no response surface is involved. Direct methods are therefore most often appropriate when a response surface cannot be created. The first step in direct FPM is to establish a method for generating random variables and calculating the corresponding random variable derivatives (step 124). The next step is to establish a scheme for using the random variable derivatives in a failure model (step 126). The failure model is the one developed in model failure physics (step 42) (FIG. 3(*a*)). The scheme established in step 126 serves to produce many random variable derivatives for input into the failure model from step 42 (FIG. 3(*a*)). Then one must determine the convergence criteria (step 128) to know when to cease inputting the random variable derivatives into the failure model.

Similarly, direct ST 94 uses the failure model from model failure physics (step 42). As with direct FPM, direct ST 94 must also create a random variable generation method (step 130). But direct ST 94 does not calculate derivatives of these random variables. The next step using direct ST 94 is to establish a method for using the random variables themselves in the failure model (step 132). And the last step is to determine the number of simulations to be conducted (step 134), which sometimes requires trial and error to determine the number of simulations necessary to give a failure prediction with the desired precision.

Component Simulation

Figure 4:
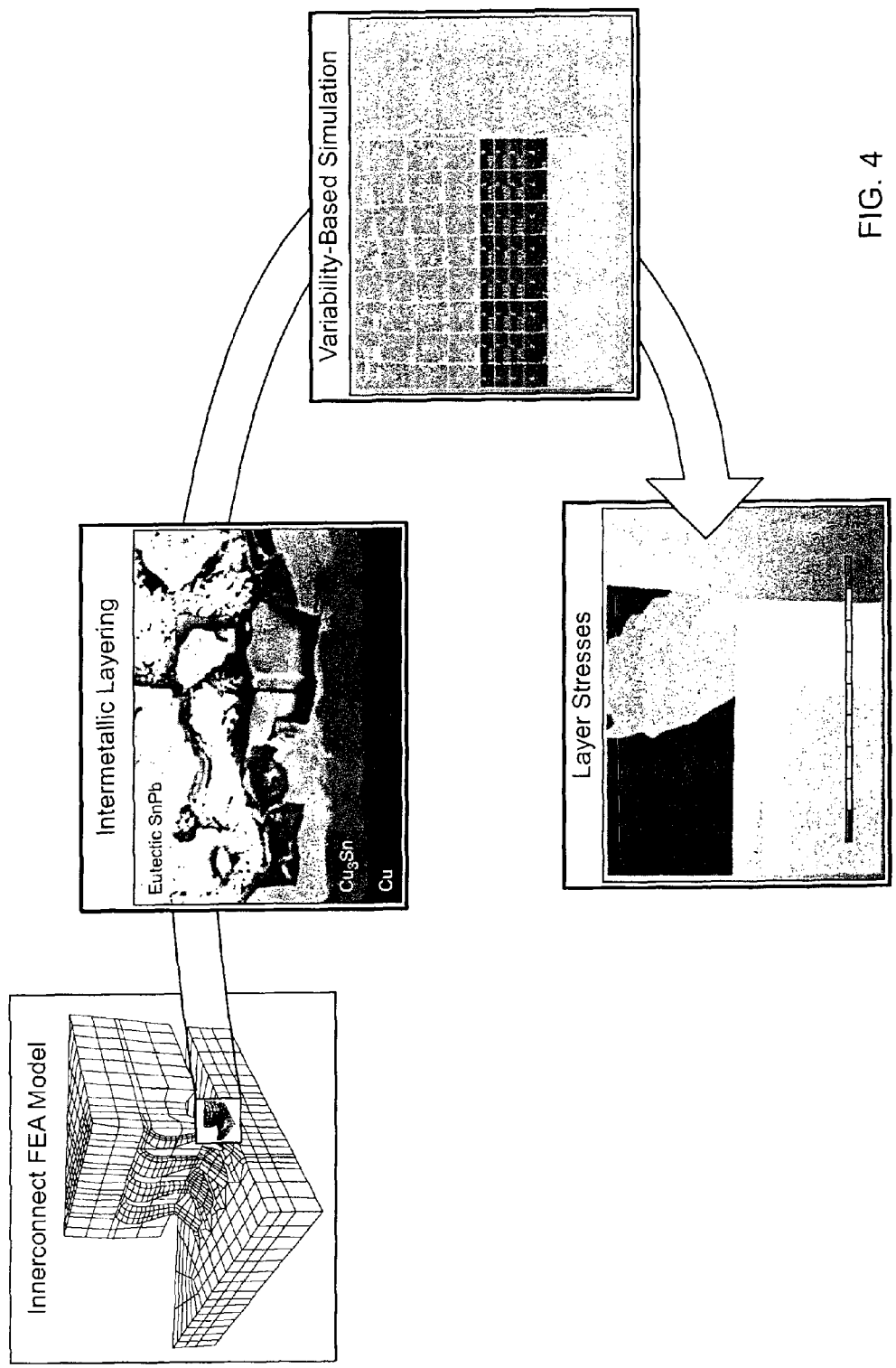
FIG. 4: Global stress translated to local microstructure through simulation of intermetallic layers in solder.

An overview of analysis used in simulating real material behavior at the component level is shown in FIG. 4. The topmost inset figure shows a FEA model of one fourth of the component device soldered to a circuit board. The device has 14 "j" shaped connectors. Because this is a quarter symmetry model, three and one half of the connectors are shown. The j connectors are copper. The "solder pad" on the circuit board on which the "j" connector sits is also copper. A "global" structural analysis is performed on this model to predict the stresses throughout the component and board. The other three quarters of the component are assumed to have identical stresses. The rightmost inset figure shows a close-up of the solder joint microstructure. The figure shows that the solder joint is not a homogeneous monolith but composed of polycrystalline tin-lead. Interface layers are created through chemical reactions between the tin-lead and the copper at both the "j" connector and the board. The interface layers are composed of the intermetallic compounds; $Cu_6Sn_5$ and $Cu_3Sn$. The bottom most inset figure shows a "local" PEA model of the interconnect microstructure at the interface between the solder and the board. The stresses from the global model are the boundary conditions for the local model. The local model takes into account intermetallic layering to predict the stresses at the interfaces as shown in the left most inset figure.

The technology described herein uses a virtual prototyping technique that relies on computer simulation of real material behavior to predict when an electronic component will fail due to fatigue. The fatigue life of a component is recognized to be a characteristic property of the material from which the component is composed. A component is made up of an ensemble of discrete microscopic structural elements of a material such as grains, colonies, and nodules. Many different materials, e.g., metals, intermetallics, ceramics, and some plastics, are composed of such discrete microscopic structural elements. The method of the instant technology is aimed at predicting the variation in fatigue life based on the statistical variation of the microscopic structure of the material. Material parameters at metallic grain level are used along with fundamental physics-based models to predict the damage as it accumulates from the nucleation of cracks, through small crack growth and long crack growth, to final failure.

Figure 5:
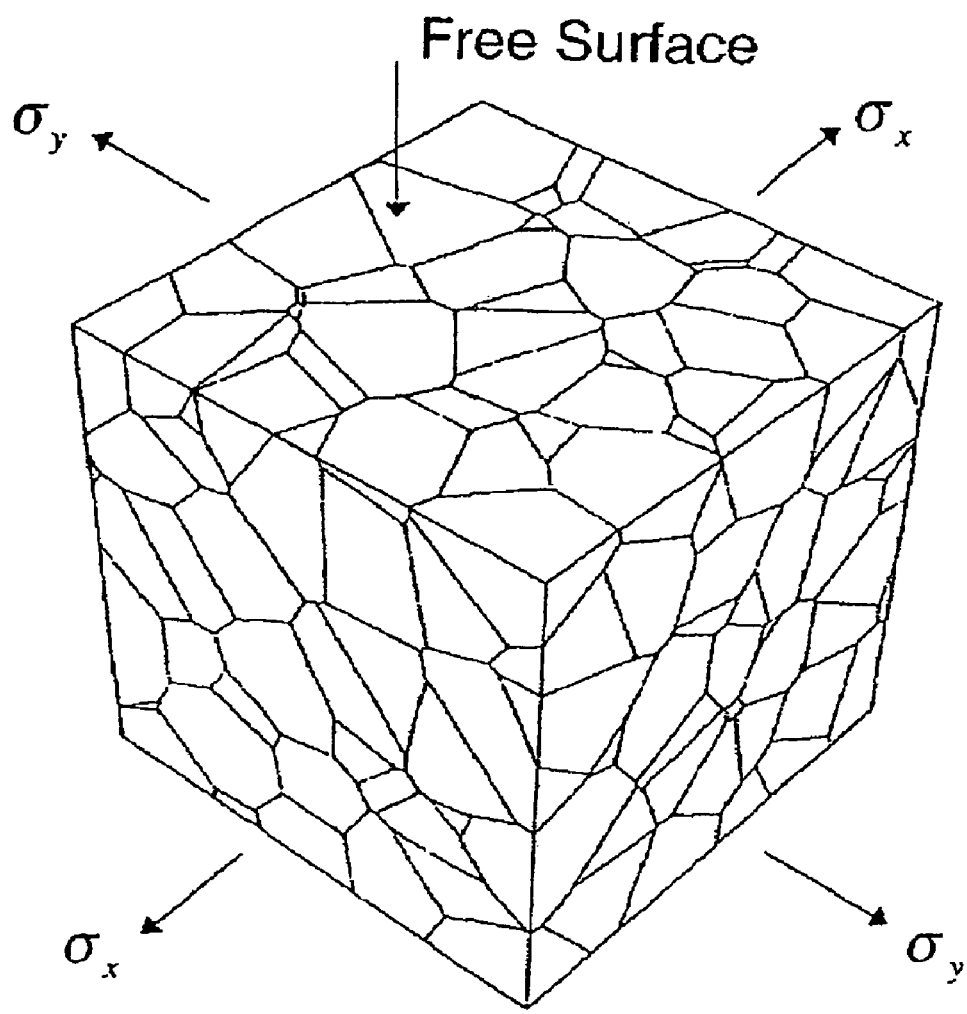
FIG. 5 is a microscopic view of a metallic structure showing grains of various 25 shapes and sizes.

The computer simulates many identical components but uses a different sample of material microstructure for each simulation. The microscopic structure of each simulated material model or "realization" for each component is properly sampled from the known or specified range of material microstructures. Each of the elements is then virtually tested using computer simulation to simulate real-world conditions of usage. The virtual testing allows data to be produced quickly on thousands or even millions of components. This virtual testing addresses variation in the microscopic substructure, illustrated schematically in FIG. 5, by modeling the grain size, grain orientation, micro-applied stress and micro-yield strength as random. These parameters are then used in modeling crack nucleation and small crack growth. All of the variation in the long crack growth is simulated by the variability in crack growth rate coefficient.

In an embodiment, the principal inputs to the simulation of a material are details of the grain structure properties of the material being simulated, and the external conditions the material experiences. Because grain structure orientation is randomly distributed through any macro sized structure, a Monte Carlo simulation is used to give a probabilistic distribution of fatigue failure outcomes over the operating life of the structure. (See, e.g., Tryon, R. G. and T. A. Cruse, "A reliability-based model to predict scatter in fatigue crack nucleation life," *Fatigue & Fracture of Engineering Materials & Structures*, (1998), incorporated herein by reference.) In the case of solder joint interconnects, this process can be applied to all joints in the system, with each joint being appropriately loaded and heated depending on its position in the system.

Figure 6:
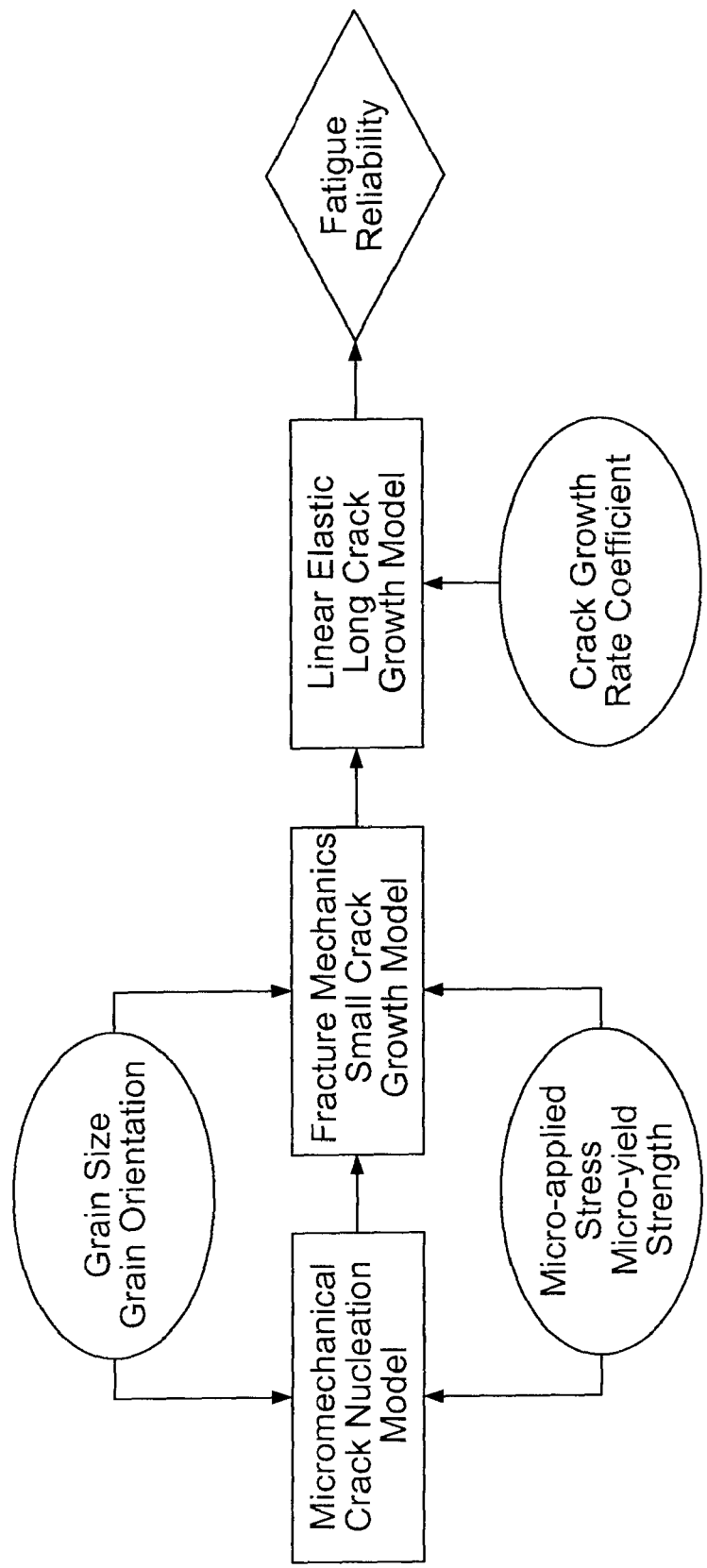
FIG. 6. Three-stage micromechanical fatigue model.

FIG. 6 shows how such a simulation proceeds through the three different levels of fatigue damage accumulation, each with its separate modeling regimes. First, a crack nucleates. Then the crack grows microscopically. At this point, the crack lies within relatively few grains. The material properties, averaged along the front of the crack, approach bulk or average material properties as the crack grows and the number of grains interrogated by the crack front increases. At this point, long crack growth accounts for the remaining crack development.

For the majority of structural materials, most of the crack life is spent in either nucleation or small crack growth regimes. The simulation modeling of this early crack behavior is important to prediction of fatigue, yet is typically not considered when considering fatigue mechanisms. VEXTEC's methodology takes specific account of these regimes by modeling the grain size, grain orientation, micro-applied stress and micro-yield strength. Crack nucleation and small crack growth models incorporate this randomness using Monte Carlo probabilistic techniques. Given that less fidelity is required for long crack growth simulation, randomness is incorporated by allowing the crack growth rate coefficient to vary. The computer simulation is set up within built-in material libraries where appropriate modeling linkages are established to predict the scatter in fatigue life.

The reliability of structural elements with complex stress distributions can be predicted by integrating a fatigue simulation model with traditional structural finite element analysis FEA (or EDA in the case of electronics). Material libraries (for, e.g., steel, nickel, titanium, lead solder) containing microstructural characterization data (comprising commonly understood quantities such as Modulus, yield strength, and others that are susceptible to routine measurement), and failure mechanism algorithms can be developed by one of ordinary skill in the art. In some instances, the data to input into the library is available from the literature and/or from a manufacturer's product data sheets, or from ASTM. However, for many specialist materials, or newly developed materials such as particular alloys, libraries of data must be independently developed, such as by performing tests on the material and making appropriate measurements. Exemplary libraries are shown in tables in connection with the Examples herein.

Preferred embodiments of the present invention use probabilistic analysis methods to address the effects of the random nature associated with material microstructure, loading, and manufacturing differences, assuming that the underlying physics of the component behavior are deterministic and that the random nature of the component response is attributed to the variability in the input to the component and the parameters defining the failure physics.

Figure 7A:
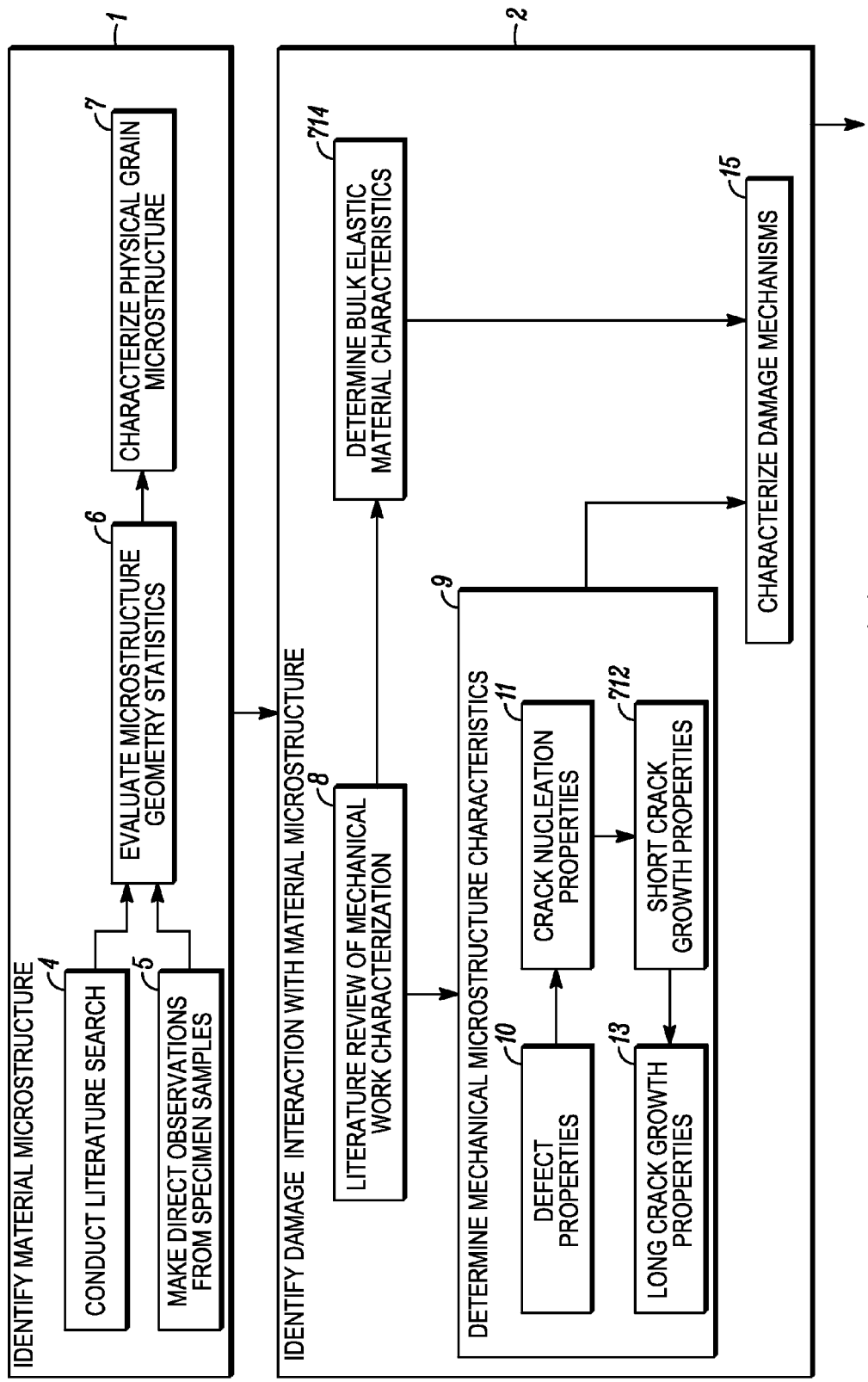
FIGS. 7(a)-7(e) depict a flowchart of a preferred embodiment of a method of the invention.
Figure 7B:
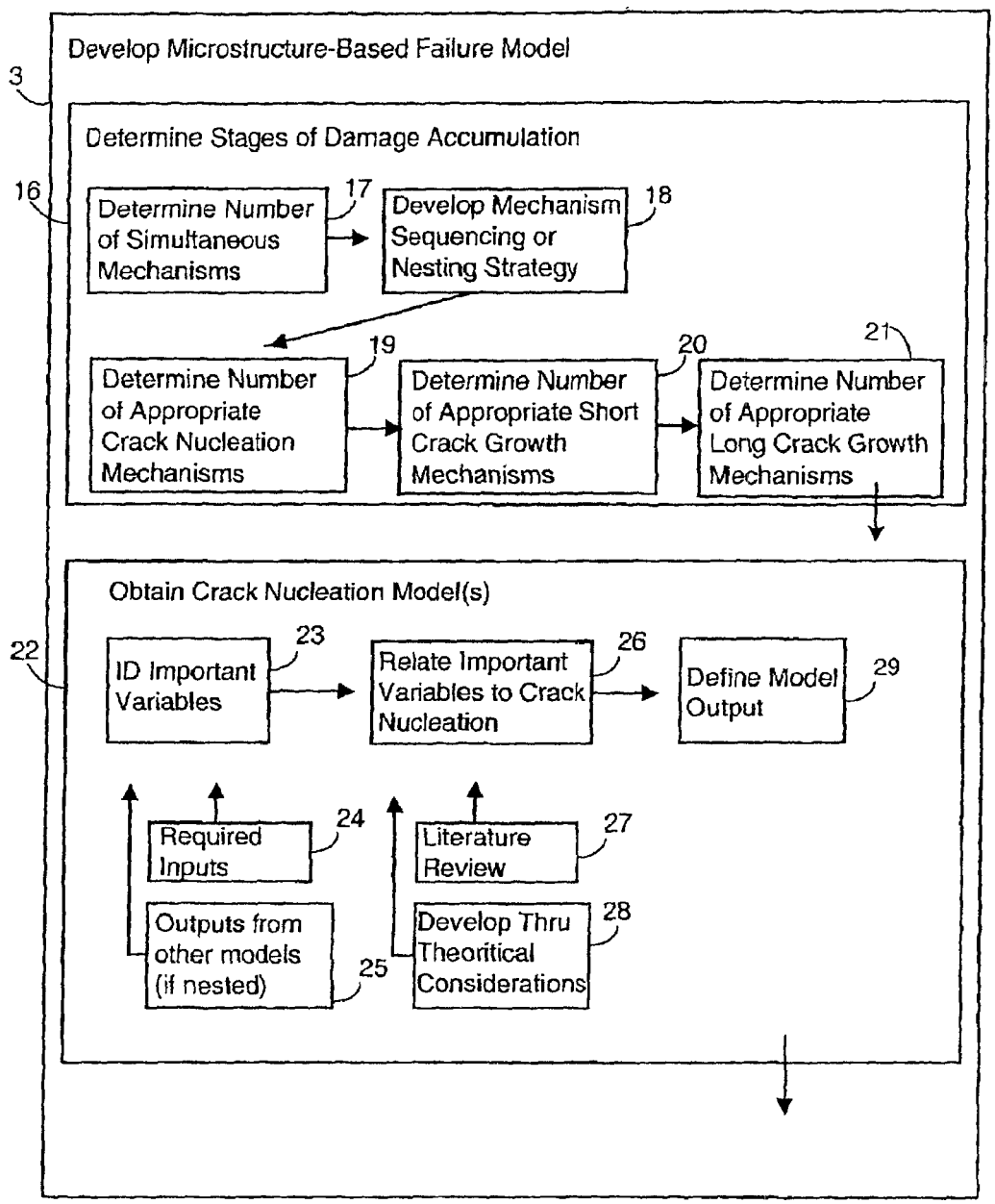
Figure 7C:
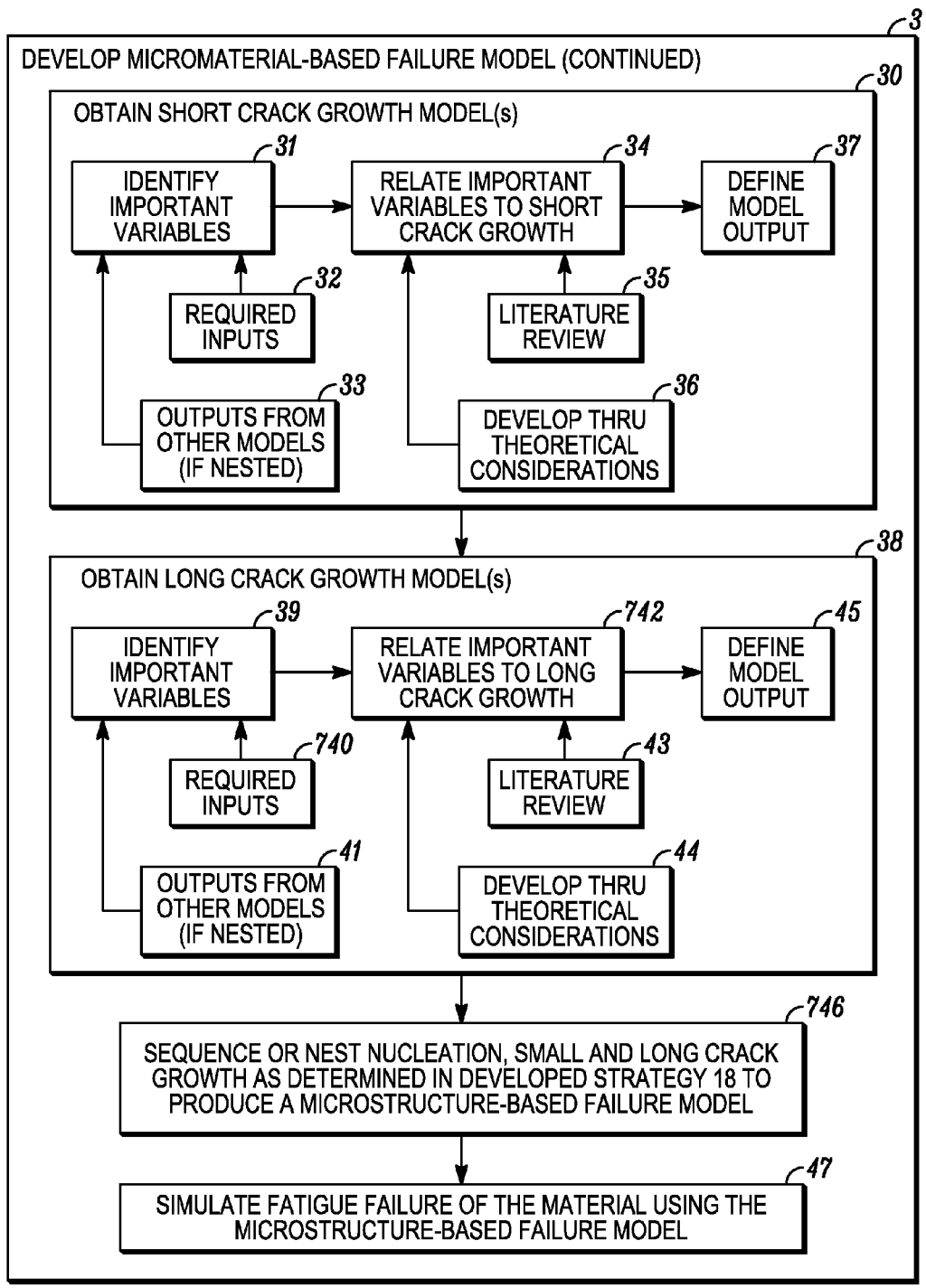

Now referring to FIGS. 7(a)-7(e), which contain a flowchart of a preferred embodiment of a method described herein, the method generally includes identifying the material microstructure 1, identifying the damage interaction with the material microstructure 2, and developing a microstructure-based failure model 3 (FIG. 7b).

Referring to FIG. 7(a), identifying the material microstructure 1 includes: conducting a literature search 4; making direct observations about a material's microstructural configuration based on specimen samples 5; and evaluating microstructure geometry statistics 6 based on the literature search and direct measurements of specimens. These statistics will vary depending on the material and microstructural arrangement but will usually include grain size, orientation, and volume fraction estimates. Identifying the material microstructure 1 culminates with characterizing the physical grain microstructure 7.

Identification of the damage interaction with the material microstructure 2 includes processes necessary to characterize active damage mechanisms 15 that become the basis of microstructure-based failure model development 3 (FIG. 7(*b*)). First, a literature review 8 is undertaken to determine if information exists about either the bulk elastic material characteristics 714 or the mechanical (i.e., loaded) microstructural characteristics 9. Defect properties assessment 10 then defines grain slip planes, pores, or inclusions and other local stress risers such as composite laminate plies and fiber which are likely to cause local plastic deformation. There are a wide variety of other potential defects within any given material. Crack nucleation properties 11 define the mechanisms that cause local plastic deformation to nucleate cracks. Short crack growth properties 712 then define the active mechanisms at the short crack tip that govern the erratic behavior of short cracks, such as grain boundary blockage, grain orientation, ply/matrix interface and the local frictional strength. Long crack growth properties 13 define elastic and plastic crack growth rate parameters, such as stress intensity factors and strain energy release rates, as well as threshold characteristics. Determining bulk elastic material characteristics 714 encompasses obtaining a number of properties including shear modulus; Poisson's ratio; and specific fracture energy, although the appropriate properties vary greatly depending upon the material and microstructural arrangement. Then, after determining bulk elastic material characteristics 714 and mechanical microstructure characteristics 9, it is possible to characterize the damage mechanisms 15.

Now referring to FIGS. 7(*b*) and 7(*c*), development of the microstructure-based failure model 3 is generally accomplished by determining the stages of damage accumulation 16 (FIG. 7(*b*)), developing crack nucleation models 22 (FIG. 7(*b*)), developing short crack growth models 30 (FIG. 7(*c*)), developing long crack growth models 38 (FIG. 7(*c*)), and linking (i.e., sequencing and/or nesting) the crack nucleation, short crack growth, and long crack growth models to produce an overall failure model 46 (FIG. 7(*c*)).

Determining the stages for damage accumulation 16 (FIG. 7(*b*)) begins by determining the number of simultaneous damage mechanisms 17 that exist (e.g., ductile nucleation in one phase occurring simultaneously with brittle nucleation in a second phase). Then a mechanism sequencing or nesting strategy 18 is developed that, in general, links these models. Linking is used to predict the fatigue response at the component level because fatigue damage can start at a very small scale and grow to final fracture. The lower level model uses the appropriate parameters to determine the initial state of the next level. The next level uses the results from the previous level along with the appropriate parameters specific to its level to determine the initial state of the next level and so on. Through the use of these "nested" modeling techniques, component reliability can be linked to the physical mechanisms at each level. Additionally, by modeling each level of the fatigue process individually, and rigorously linking the levels, various size effects are included. Next, make an evaluation of the numbers of, respectively, nucleation models 19, short crack growth models 20, and long crack growth models 21 required. Each of the mechanisms characterized 15 (FIG. 7(*a*)) will have a corresponding model. Multiple models may be needed for each level due to multiple mechanisms for each damage level, and different mechanisms may be active simultaneously 17.

Next, develop the crack nucleation models 22 determined appropriate for the mechanisms of damage accumulation 19. First, identify the important random variables 23 based on the required model inputs 24, or outputs 25 from other models (should the nucleation model be nested). Then, relate the important variables to crack nucleation 26 through literature review 27 and development through theoretical and/or experimental considerations 28. Crack life and crack cycles are similar concepts when discussed regarding fatigue failures. Finally, define model output 29 (parameters that could also serve as inputs to other models at the next level).

Now referring to FIG. 7(*c*), develop the short crack growth models 30 determined appropriate 20. The method is analogous to developing the crack nucleation models 22. Identify important random variables 31 based on required model inputs 32 or outputs from other models 33 (in the case where the short crack growth model is nested). Then relate the important variables to short crack growth 34 through literature review 35 and development through theoretical and/or experimental considerations 36. Finally, define model output 37 (parameters that could also serve as inputs to other models at the next level).

Similarly, develop the long crack growth models 38 determined appropriate 21. Identify important random variables 39 based on required model inputs 740 or outputs from other models 41 (in the case where the long crack growth model is nested). Then relate the important variables to long crack growth 742 through literature review 43 and development through theoretical and/or experimental considerations 44. Finally, define model output 45.

In obtaining the damage models 22, 30, 38, time-dependent issues such as dwell and creep fatigue must be addressed if they are determined to be important random variables 23, 31, or 39. Models are available through literature review 27, 35 or 43, or developed using theoretical and experimental considerations 28, 36, 44. After developing the appropriate models, these nucleation, short crack, and long crack growth models are sequenced or nested 46 following the strategy developed 18 (FIG. 7(*b*)) to produce the overall microstructure-based failure model.

Microstructure-based failure model 746 is limited to a single microstructure and single loading conditions. Most real-world components will have many material microstructural arrangements and, more likely than not, experience multiple loading conditions. Now referring to FIG. 7(*d*), to apply the method to a real-world component, develop or obtain a conventional Finite Element Model (FEM) 48. The FEM must consider the proper time, temperature and displacement conditions. Then analyze the FEM to obtain the stress and temperature at each node at each time (when appropriate) 750. With these stresses and temperatures, identify the significant nodes 752. Significant stresses could be those above material fatigue strength at that temperature or to a safety factor applied to fatigue strength as determined by one of ordinary skill in the art. Around these significant nodes, develop a Representative Volume Element (RVE) 754. An RVE is a finite region of the FEM that has a consistent stress and temperature. An RVE may, in fact, only be two dimensional, but it is nevertheless referred to as a volume element. The information for each RVE should include the stress and temperature on the RVE, the dimensions, and the properties and microstructure of the material within the RVE. Determine the microstructures within each RVE and apply the process of FIGS. 7(*a*)-7(*c*) to each RVE 756 to obtain an overall microstructure-based failure model 746 (FIG. 7(*c*)) for each RVE. At some point prior to beginning the first simulation of the component, identify a probability of failure (POF) convergence criterion 758 for the eventual statistics that describe the simulated component fatigue failures 780 (FIG. 7(*e*)). The necessary statistical significance will be different for different situations.

The component is simulated by using the overall microstructure-based failure model developed for each RVE 756. First establish the density of potential nucleation sites within each RVE using the probabilistic-based Monte Carlo (MC) method 762. Then establish the number of potential nucleation sites within each RVE using MC 764. The use of MC methods for establishing the number and density of potential nucleation sites is documented within the open literature.

Next determine the cycles/time to failure for each potential nucleation site 66. First use MC methods to establish values for each of the random variables 68 in the overall failure model 746 (FIG. 7(c)) for the potential nucleation site in question. The appropriate set of those values is input into the microstructure-based failure model for the potential nucleation site in question 770 to determine the cycles/time to failure for that site 772. The process is repeated for each potential nucleation site within the RVE 72 and the "life" of the RVE is established 774. The life of the RVE is the smallest number of cycles/time to failure for any of the included potential nucleation sites.

Figure 7D:
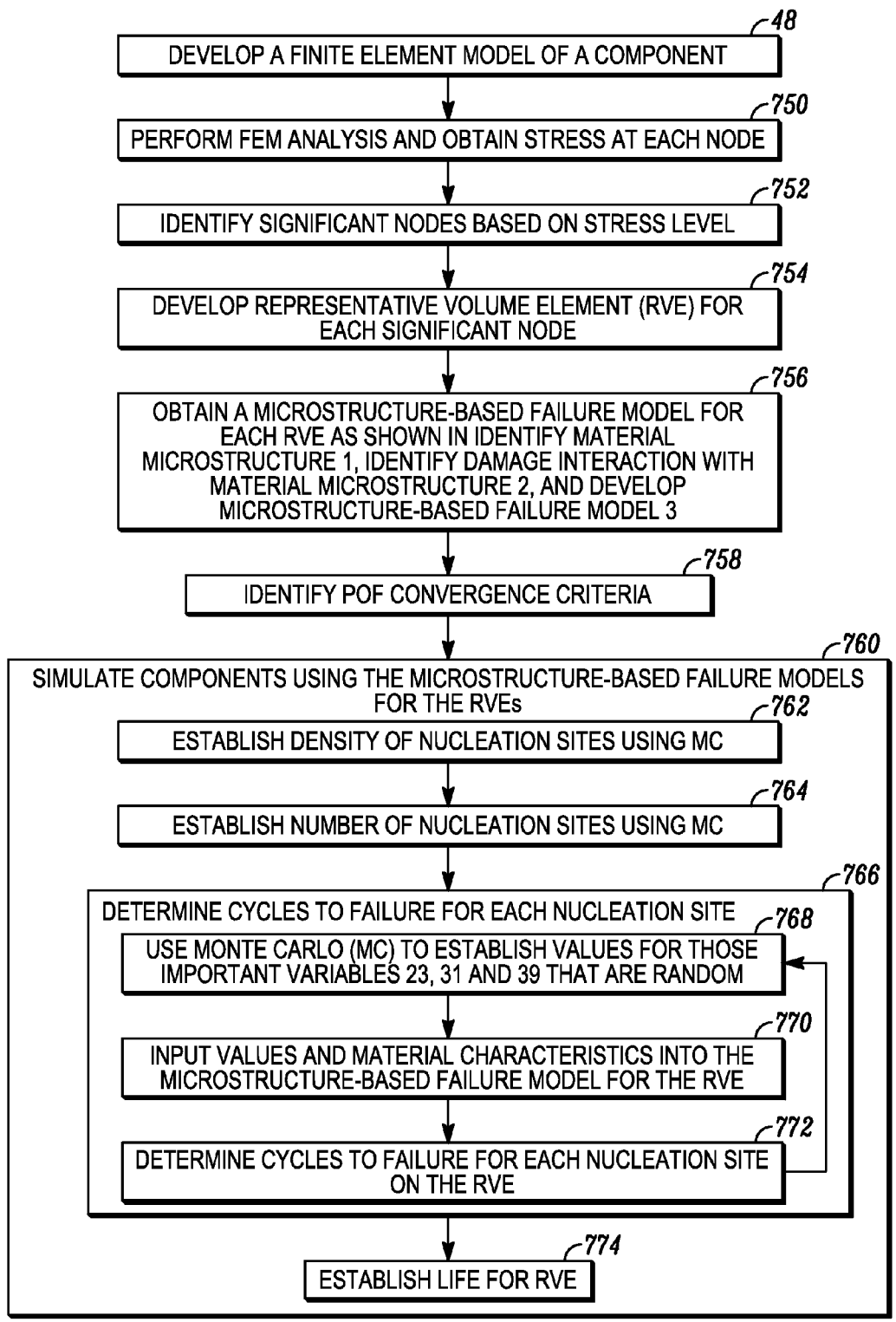
Figure 7E:
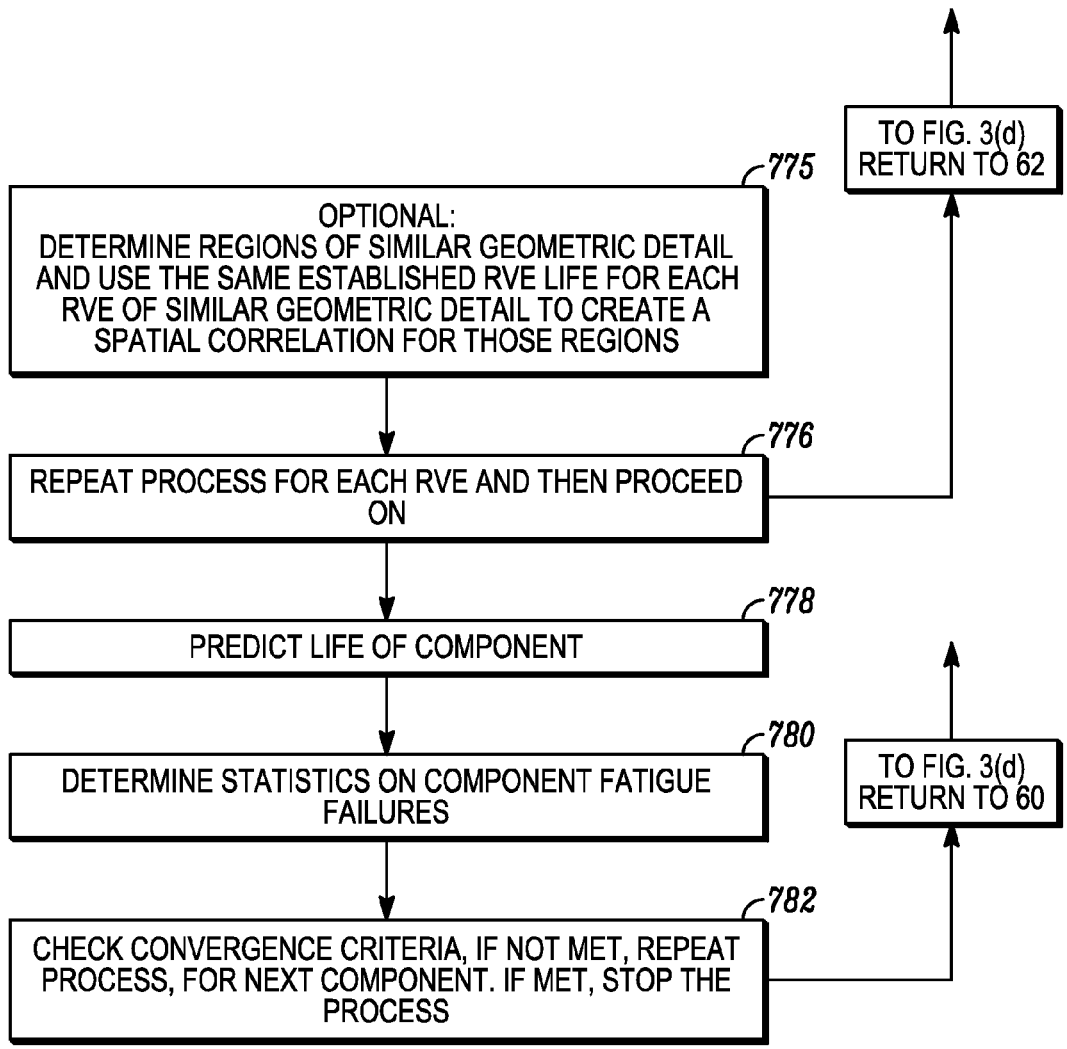

Now, referring to FIG. 7(e), repeat simulating the component 760 (FIG. 7(d)) for each RVE 776 in this simulated component. The predicted life of this component 778 is the minimum number of cycles/time to failure for any RVE. Include this result with any previous predictions and determine the statistics on these component fatigue failures 780. For example, the statistics could include a POF, a cumulative distribution function (CDF), or a probability density function (PDF) of failure characteristics. One of ordinary skill in the art will recognize that the desired component statistics will vary considerably based on the problem at hand. Next, check the statistics against the POF convergence criteria 782 and, if not met, return to simulate another component failure 760 and repeat the process.

Should the RVE be so large that computer analysis of every potential nucleation site would be cumbersome, the process may be modified. Step 766 would be changed to evaluate only a statistically significant number of potential nucleation sites, and probabilistic methods (also called system reliability methods) would be used to estimate RVE life 774, rather than directly computing the shortest life of each potential nucleation site.

Another aspect of the invention is that it can be modified to account for an FEM that accounts for variation in stress, temperature, time, and/or dimension such as voltage, current, and dwell (the time spent dwelling at a given condition). Here, step 750 is modified so the FEM analysis results in a statistical distribution of stresses rather than a single value of stress.

These statistical distributions of stresses, temperature, and time may be found experimentally or developed using any number of probabilistic methods. Then in step 768, stress, temperature, and time will be included in the random variables whose value is established using MC analysis, also a probabilistic method.

Still another modification of the invention adds a spatial correlation to the FEM. This correlation is beneficial when a component has multiple locations of similar detail. An optional step finds the fatigue life for regions of the component with similar geometric detail 775 repeats the process for each RVE 776 and then determines the component fatigue life based in part on a spatial correlation from the information gained from step 775. The spatial correlation comes from using a common established life for the RVE 774 whenever encountering an RVE that is one of the group having similar detail. This may lead to the use of the various probabilistic methods to calculate component life (based on the particular circumstances). The probabilistic methods used in determining cycle to failure for each nucleation site 66, providing values for random variables 762 (FIG. 7(d)), 764, 768, and estimating RVE fatigue life 774 include Fast Probability Methods (FPM) and Simulation Methods (ST). FPM techniques include response surface FPM and direct FPM. Direct FPM methods will always provide a solution, but when a response surface may be used its use can increase the efficiency of the prediction calculations. A response surface, however, cannot be formed when considering variables that vary with cycles/time and, thus, present discontinuities. Direct FPM are then necessary, although such variables may possibly be handled using multiple nested response surface equations, a single response surface equation will not suffice.

Other potential FPM approaches include First Order Reliability Methods (FORM), Second Order Reliability Methods (SORM), Advanced Mean Value (AMV) methods, and Mean Value (MV) methods. Potential ST approaches include Monte Carlo (MC) and importance sampling. MC methods are used in an embodiment of the invention for simulating components using the microstructure-based failure models for the RVE's 760.

Figure 8:
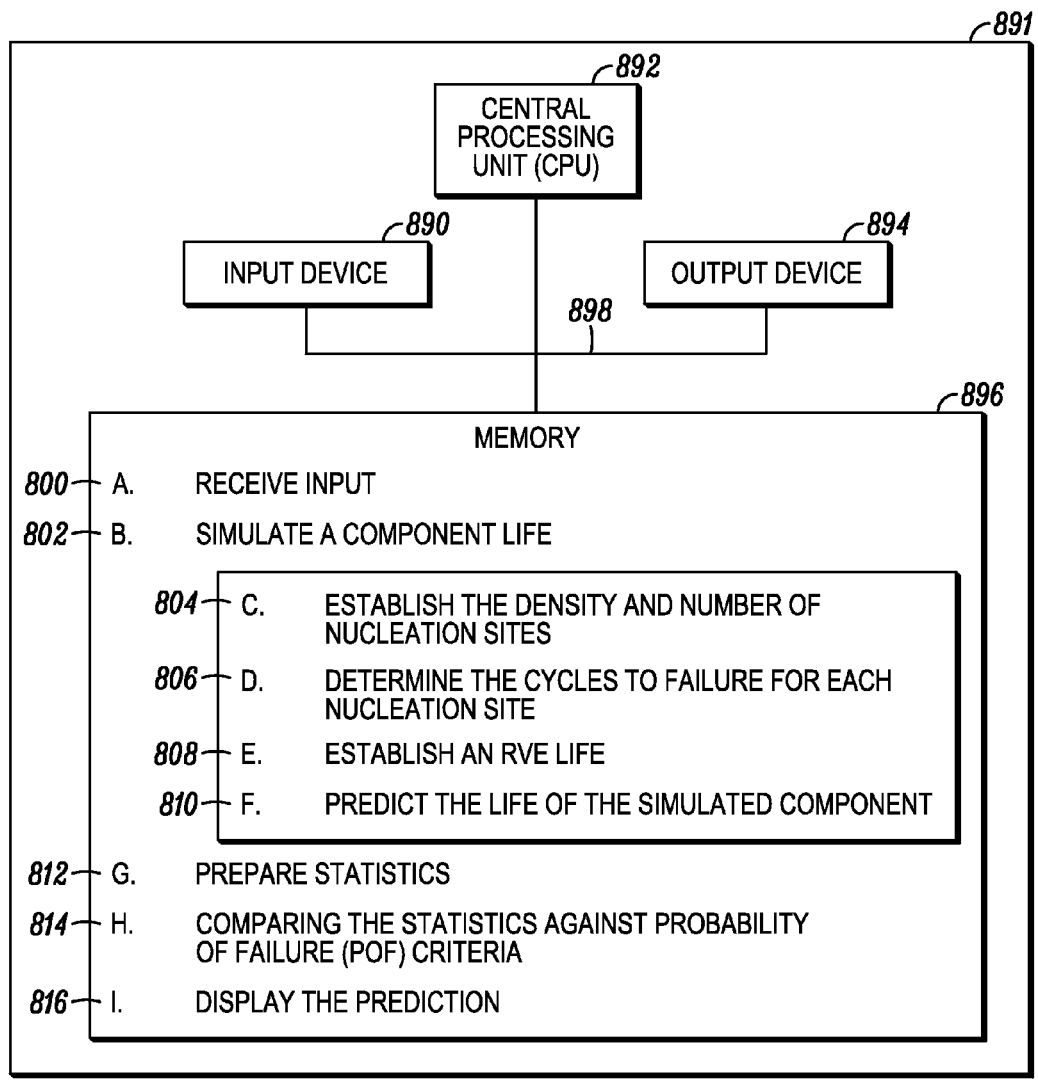
FIG. 8 is a diagram of an apparatus for predicting the failure of a component that incorporates a preferred embodiment of the present invention.

FIG. 8 shows a schematic diagram of a computer apparatus 891 for predicting the failure of a component, that incorporates a preferred embodiment of the present invention. Apparatus 891 generally includes an input device 890, a central processing unit (CPU) 892, an output device 894, and a memory 896, connected via a bus 898. Memory 896 is encoded with instructions for receiving input 800, simulating a component life 802, preparing statistics 812, and displaying the prediction 816.

Input 800 contains the component's material characteristics and values for other variables necessary to predict failure, such as the number of components to simulate, etc. Instructions for simulating a component life 802 include instructions for: using a microstructure-based failure model to simulate the life of RVE's by establishing the density and number of nucleation sites within an RVE 804; determining the cycles/time to failure for each nucleation sites within the RVE 806; establishing an RVE life 808 for each RVE based on the cycles/time to failure for each nucleation site; and predicting the life of the simulated component 810 based on the established RVE lives. Once that prediction is made for that single simulated component, that prediction is added to the group of any previous component life predictions. Instructions 812 prepare statistics to describe the group of predictions. These statistics are compared 814 to a previously input Probability of Failure (POF) criterion and, if not met, another component life is simulated 802. If the POF criteria are met then the prediction is displayed by executing instructions 816.

Simulation of Solder Fatigue in Electronic Components

The most commonly used solder fatigue models are based on Coffin-Manson plastic strain equations developed for solder interconnects. Due to the low melting temperatures, most electronic devices operate at temperatures above solder creep thresholds. Since Coffin-Manson models do not explicitly address creep strains, specific solder models have been developed to incorporate creep (see, e.g., Knecht, S., Fox, L. (1991) "Integrated matrix creep: application to accelerated testing and lifetime predictions," *Solder joint reliability theory and applications*, Van Nostrand Reinhold, New York.; Syed, (1997)). All of the fatigue models in use today assume large scale similitude, i.e., the structure (weld footprint or wire diameter) is large compared to the crack, the crack is large compared to the crack tip plastic zone and the crack tip plastic zone is large compared to the microstructure. These assumptions are fundamentally incorrect for today's small scale devices.

Figure 9:
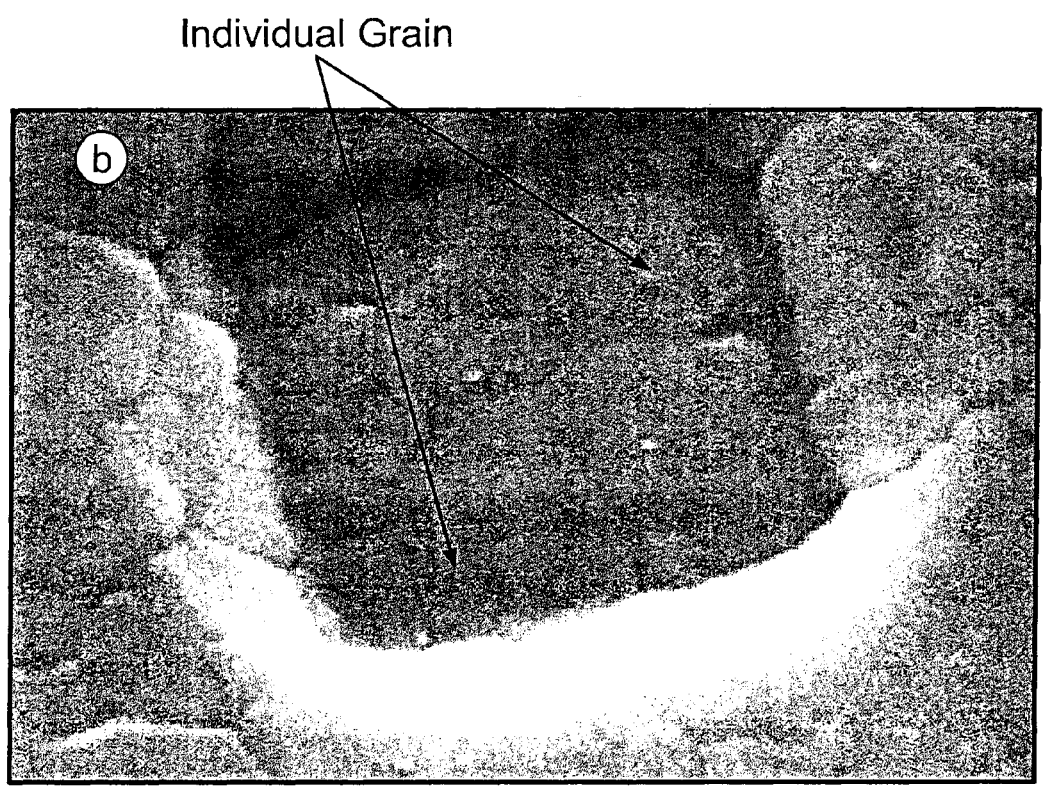
FIG. 9: This figure shows the relatively few number of grains that make up a typical solder contact area.

Energy-based solder fatigue models have been developed to account for the large crack size compared to the weld geometry (Liang, J., Gollhart, N., Lee, P. S., Heinrich, S., Schroeder, S. (1997) "An integrated fatigue life prediction methodology for optimum design and reliability assessment of solder inter-connectors," *Advances in Electronic Packaging*, Vol 2.), and Morris and Reynolds (Morris, J. W., Reynolds, H. L. (1997) "The influence of Microstructure on the mechanics of eutectic solders," *Advances in Electronic Packaging*, Vol 2.) point out the importance of the size of the material microstructure compared to the size of the damage. Emitter bond wires are usually 300 to 500 microns in diameter and the metallization layer to which they are bonded have a thickness of 3 to 5 microns. With, polycrystalline grain sizes as large as 150 microns, microstructural similitude cannot be assumed for crack initiation and growth. FIG. 9 shows the relative size of the grains compared to the overall solder contact area.

None of the previously described fatigue models addresses the large scatter in the solder weld properties. The nature of the components on circuit board and the assembly process creates large variations in the solder welds for even the strictest manufacturing tolerances. The very small size of the welds causes variation of the weld footprint from weld to weld. In addition, the microstructural development of the weld is greatly controlled by rate of cooling from the melt stage. Some of the components on the board are specifically designed with heat sinks for thermal management during operation. These heat sinks are activated during the assembly process by the heat of the welding although they may not have been specifically designed for this purpose. This heat transfer action causes uneven cooling of the welds from component to component and uneven cooling of the different emitter bonds within a single component. Other methods for electronic device reliability prediction, largely empirically derived, do not account for this real world variability. Thus, variation in the geometry and material properties of the weld must be considered in order to prognosticate reliability accurately.

Industry research indicates that thermo-mechanical fatigue damage mechanisms in Sn/Pb solder as time dependent (creep) shear stress induced cracks initiate and propagate in the solder near the intermetallic interface. The fatigue response of the solder changes due to instability (coarsening) of the microstructure. Although, both intergranular and transgranular fracture surfaces are observed, depending on loading and temperature, transgranular appears to predominate.

Electronic device operating principles require that the design parameters be accurately coupled. In order to assess the physical changes in variables at the electronic system level, appropriate system reliability modeling techniques should be applied. For example, temperature gradients are caused by the complex heat transfer characteristics within the device. In general, chips consist of material layers which serve as heat sources where other layers serve as heat sinks. Other device elements are generating or absorbing heat depending on their proximity to heat sources or sinks. Computational analysis techniques such as finite element analysis (FEA) are often used to assess the complex thermal environment during design. Such an environment can be simulated as a temporal thermal mission with start-up and shutdown transients along with steady state conditions. Electronics industry research indicates that the highest stresses imposed within the device are the result of temperature gradients created during mission transients. The stresses caused by thermal gradients can be combined with the purely mechanically induced stresses (such as vibration) within the FEA to predict the overall device stresses. The resulting stress prediction is used within VPS-MICRO™ to predict the expected cyclic life of the device.

The electronics industry has combined physics-based thermal or vibration models with empirically-based fatigue models to make a rough order of magnitude prediction of device life. However, the traditionally used semi-empirical approach lacks the required fidelity to be useful in the prognosis of thermo-mechanical fatigue for individual components. Lau and Pao (Lau, J. H. and Pao, Y. H. (1997). Solder Joint Reliability of BGA, CSP, Flip Chip and Fine Pitch SMT Assemblies, McGraw Hill, NY) point out some of the issues of using the current semi-empirical (MTTF or MTBF) approach. These issues, along with the methodology described herein for overcoming these, are as follows.

Geometry: Dimensional variation of components within electronic packages can be of several orders of magnitude, e.g., a 0.08×0.1 mm solder bump versus a 150×150 mm Printed Wiring Board (PWB). This necessitates breaking down the numerical analysis into multi-scale (local and global) analyses. Also there is a difference in the actual and simplified geometries of the component or interconnect. For example, the actual geometry of a solder joint depends on a number of parameters such as solder-paste volume, reflow temperature and flux, which can result in a wide range of different shapes. Oversimplification may eliminate geometric discontinuities or defects, which may be intimately associated with a significant part of fatigue life. To address geometry issues, the present invention comprises multi-scale finite element models to relate the global stresses and strains caused by the thermal mismatch between the electrical device and the circuit board to the local stresses and strains in the intermetallic solder layers. These methods allow for statistical variations in the complex geometry at the global, local and any intermediate level.

Meshing: Electronic packages are bi-material and tri-material bonded edges and interfaces. Stress concentrations cause interfacial damage or cracks to initiate. Capturing detailed stress-strain distributions with reasonable meshes near these concentrations is difficult. Also, many materials used in packaging are of thin layer shapes, such as thin and thick films. Thus, aspect ratio becomes a problem and a large number of elements are required to accurately model the behavior of these thin layers. The multi-scale finite element models used by VEXTEC addresses meshing issues by incorporating a representative volume element (RVE) approach in which different size scales are modeled with separate RVE's. These RVEs are properly linked using "nested models". This approach allows for small regions of highly concentrated stresses and strains to be modeled with separate RVE's and then linked to the next higher size scale.

Material Properties: Properties of internal solder layers, such as intermetallic regions between the solder and silicon substrate, are not well known. Most properties are temperature and time dependent. The mechanical behavior of a solder joint, for example, depends on strain rate, temperature, cooling rate, loading history and microstructure. Mechanical properties measured using relatively large scale and bulk specimens generally are not the same as those for actual solder interconnects. To address material property issues, VPS MICRO™, a physics-based fatigue analysis approach models the interaction of the fatigue damage with the material microstructure. The material microstructure is explicitly modeled at the crystalline level; no bulk assumptions are made.

Global Modeling

Figure 10:
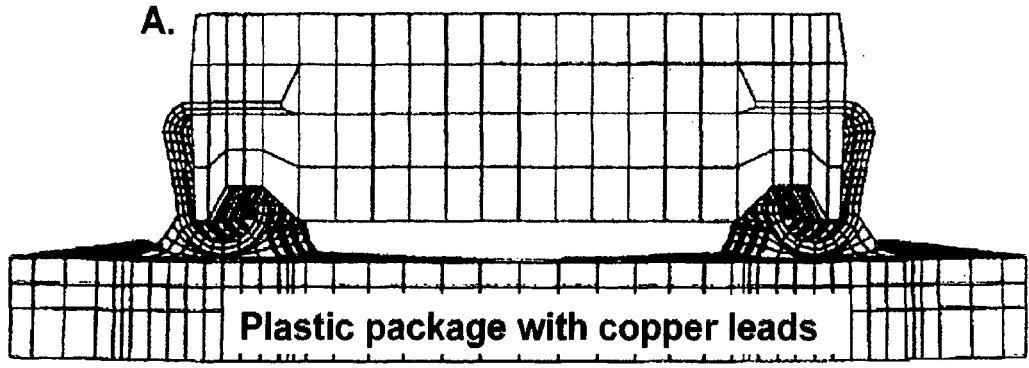
FIG. 10: A variety of lead connection configurations.
Figure 10:
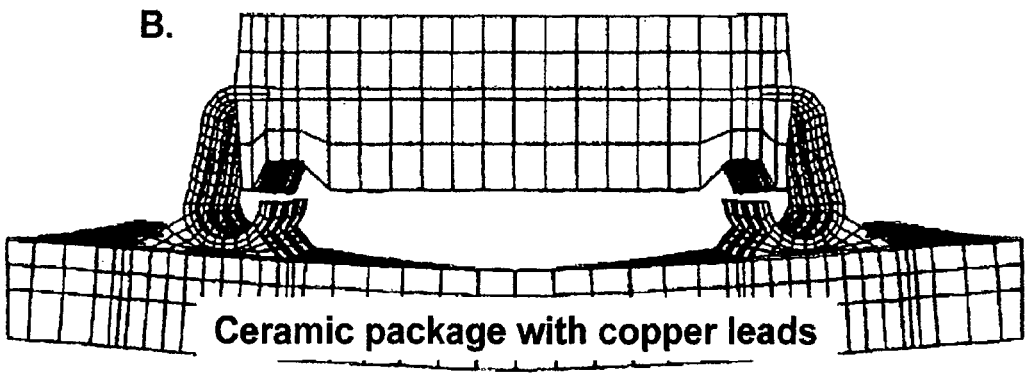
Figure 10:
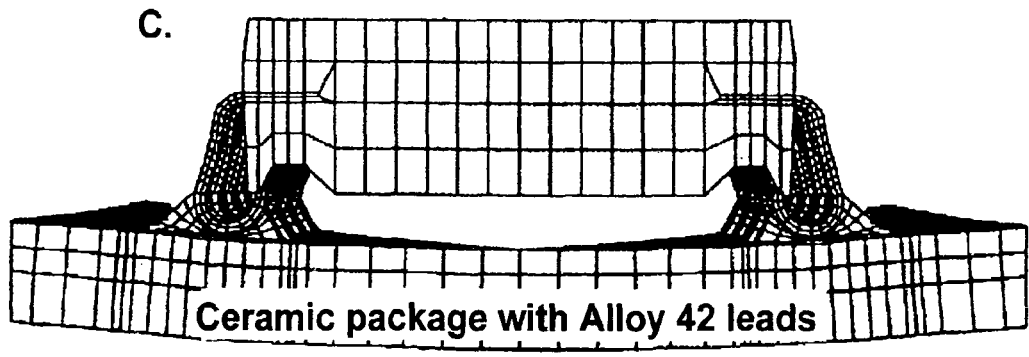
Figure 11:
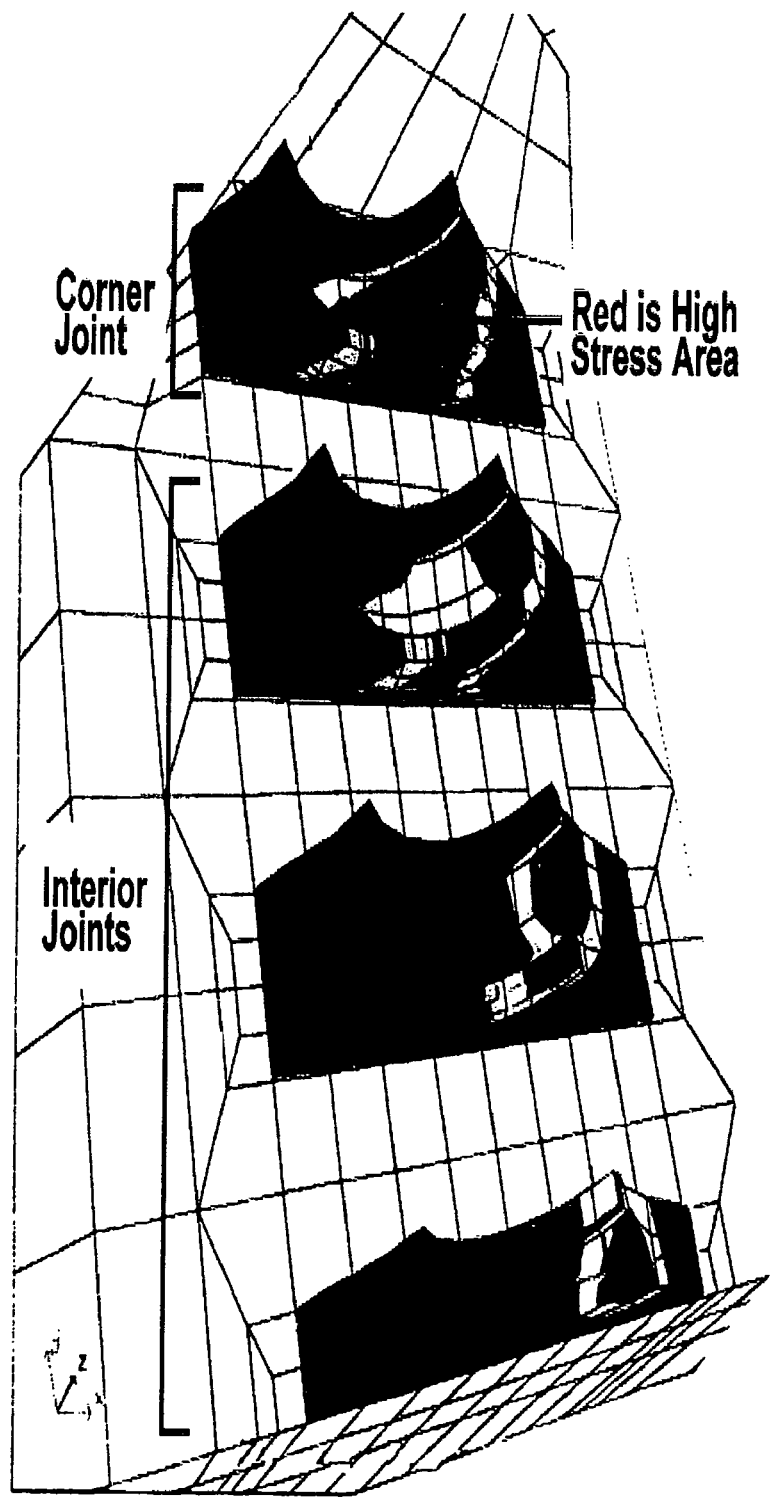
FIG. 11: Thermal induced strains vary depending on whether edge (top most) or inner device connection location.

Conventional FEA is incorporated with the analysis approach described herein. SRI performed a thermo-mechanical stress analysis for a J-leaded device for several different packages with different material layering combinations. FIG. 10 shows examples of the types of materials used in the finite element model. Under this project an Alloy 42 lead is soldered to FR-4 board with a copper metallization layer. FIG. 11 shows an example of the global strain response of the solder joints for the condition displayed in FIG. 10(b). The topmost (corner) solder joint has the highest strain and the interior joints have lower strains. For the feasibility demonstration described later in this paper, only the corner joint was simulated since it has the highest stresses and can be considered a representative example.

Local Modeling

Figure 12:
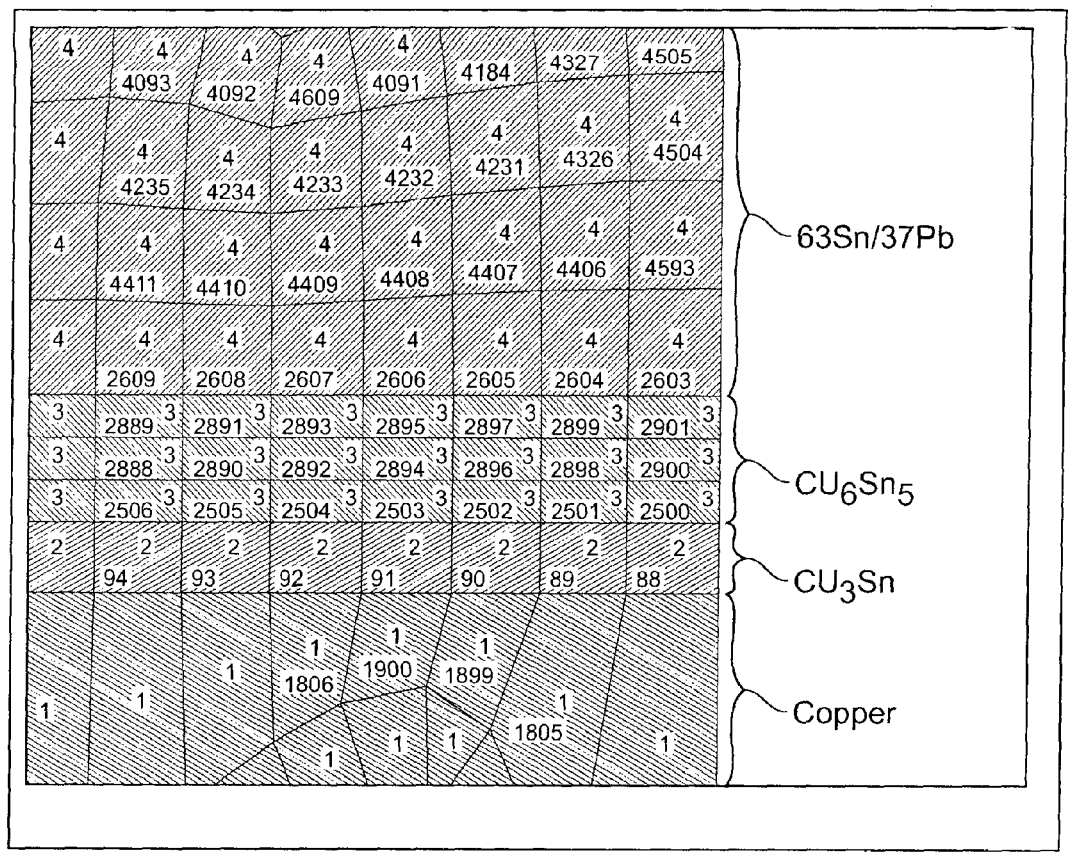
FIG. 12: FEA simulation of the material layering variability between the solder and substrate.

Fatigue failure is a localized, material-driven process. An extensive amount of research has been conducted as to how and why cracks initiate and grow within solder connections. This knowledge was adopted within the developed local simulation modeling approach. High stresses are translated from global loadings to the local material. In particular these stresses exist at the interface between the copper lead and the solder. These localities are of compounded significance due to the existence of a complex microstructure of intermetallic layers between the copper and the solder. When molten Sn—Pb solder contacts the lead, intermetallic compounds (IMC) are formed between the solder and the lead. To model the complex stress state of the microstructure at the copper/solder interface, two dimensional ANSYS finite element models were created under this project by VEXTEC for the copper/intermetallic/solder region. See FIG. 4. Because the thickness of the intermetallic layers change with time, a series of finite element models were incorporated into the modeling approach. The FEA models created for various Cu3Sn and Cu6Sn5 thicknesses to simulate this real world variability. FIG. 12 shows an example FEA model for 4 microns of Cu3Sn and 7 microns of Cu6Sn5. The bottom layer in the model in FIG. 12 is the copper. (The elements of this layer are designated with a 1 at their centers.) The next layer is Cu3Sn, designated with 2 at the element centers. The next layer is Cu6Sn5, designated with 3 at the element centers. The top layer is 63Sn/37Pb solder, designated with 4 at the element centers.

The principles of the present invention are further illustrated by the following examples. These examples describe possible preferred embodiments for illustrative purposes only, they do not limit the scope of the invention as set forth in the appended claims.

EXAMPLES

Example 1

Exemplary Software

Methods for predicting fatigue failure are available in a proprietary virtual prototyping software tool, VPS-MICRO™, available from Vextec Corporation, that allows the simulation of real material behavior.

Example 2

Automobiles

The amount of electronic content in automobiles is expected to double by the end of this decade, bringing it to about 30% of the cost of the vehicle. Electronics inside an automobile are delivered in the form of modules known as electronic control units (ECU's). These are actually boards containing chips, usually in a housing that protects the delicate electronics from the hostile environment of a car. A modern high-end car can have as many as 80 or 90 separate ECU's.

Example 3

Overall Automobile System Reliability

Integrated vehicle test simulation software for prediction of overall vehicle and fleet reliability has been tested at DaimlerChrysler. This methodology is based on conventional system-level reliability estimation techniques (e.g., Dey, A., Tryon, R., Rudy, R., and Forrest, M., "Automotive System Reliability Simulation Software," *Huntsville Simulation Conference*, September, 2000). Integration of this approach with the fatigue simulation as described herein can also be accomplished. The system-level reliability "roll-up" methodology uses existing failure data, test data or reliability estimates for the various elements that make up the system. The simulation virtually "cycles" or tests the specified number of systems.

If, as in the case of the automotive world, systems are repaired or replaced as failures occur, simulation can use data associated with that. Real world maintenance sometimes replaces a number of cooperating system elements after the failure of an individual element (e.g., a display unit such as a LED may be replaced along with a failed ECU). The simulation approach allows for replacement of related or connected groupings of system elements. Such groupings can be manually incorporated, or could be automatically incorporated based on historic knowledge about maintenance practices or warranty specifications that are built into the process.

A Monte Carlo process is used to simulate the testing or virtual driving of the user-defined number of systems. Besides reliability metrics for each system element, the Monte Carlo simulation process uses the following input: the number of systems to be simulated (relationship to simulation accuracy); and the mileage or time to which each system is to be tested (metrics for results comparisons such as 36,000 miles).

When an element within the system has a simulated failure, the incident is recorded and the system is repaired virtually until simulation proceeds to user-defined target mileage (or time, on/off cycles, etc). Thereafter, the next system is simulated and tested similarly. This process continues until the desired simulation accuracy (user defined number of systems to be simulated) is achieved.

For system elements with no historic data (new products), DaimlerChrysler reliability engineers have effectively used test data and/or reliability estimates in order to conduct a roll-up. They have even found that the simulation can be used as an effective forecaster when some of the failure predictions are questionable or sketchy. For example, the simulation can be made using min./max. estimates for elements with unknown exact reliability metrics. This effectively bounds the reliability prediction and provides at least some insight about reliability driving parameters so that focused testing oranalysis can be conducted cost effectively.

Example 4

Use of Finite Element Analysis

Figure 13:
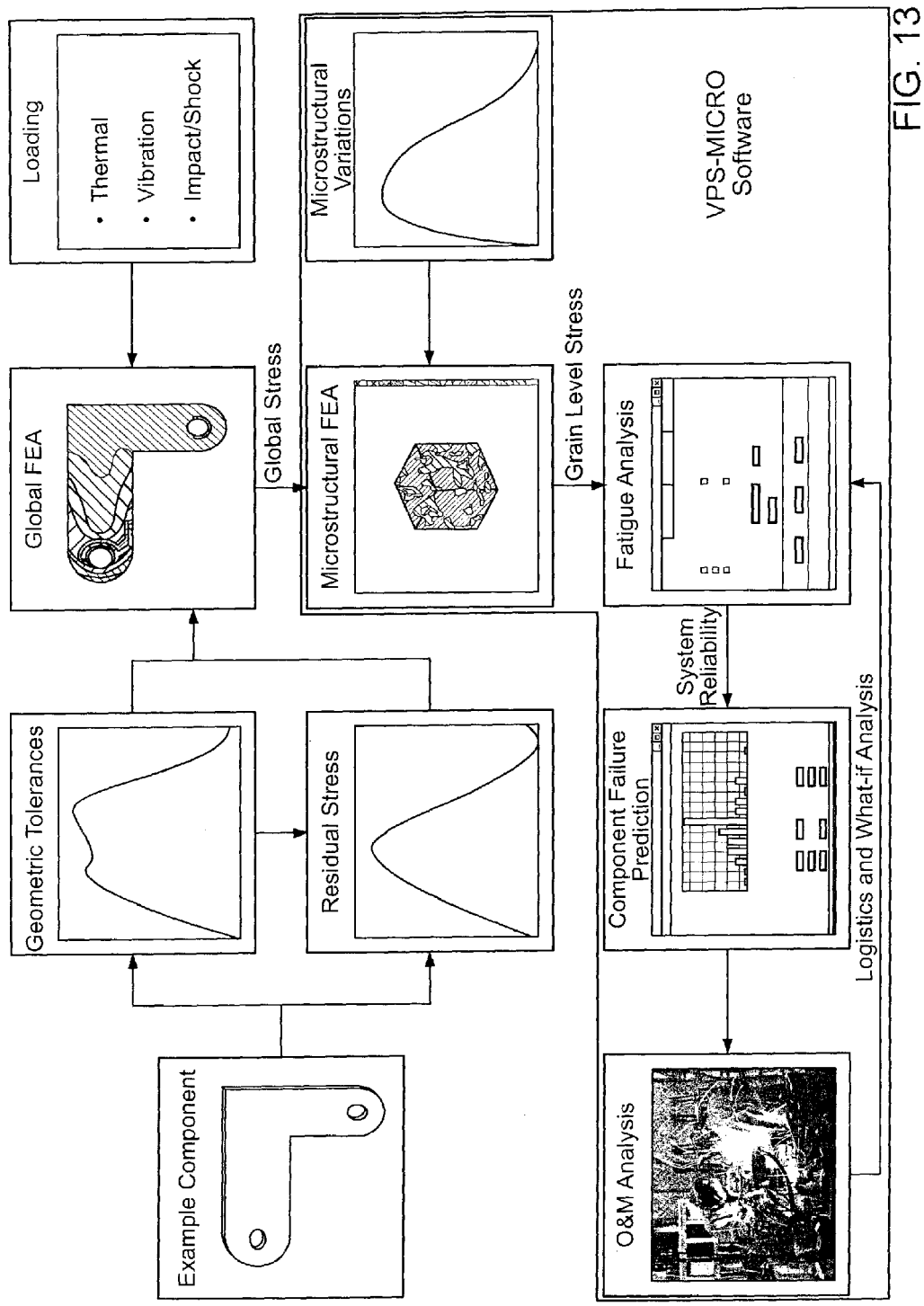
FIG. 13: Overview of proposed conceptual software operational characteristics.

As shown in FIG. 13, an OEM designer uses FEA to translate loading conditions to the applied stress state for a geometrically complex design. The software accepts the input of the geometry tolerances and residual stresses in the form of simple statistical descriptions. The global FEA stresses are superimposed on a representative volume element (RVE) 3-D microstructural model for each node of the global FEA. A reality of cost effective manufacturing is the inherent difficulty in controlling complex component microstructural variation. It is typical that the material microstructure will be different at different locations within the component.

Each location on the forging has a different microstructure and therefore a different strength. A casting with a complex cross section would be expected to have similar variations. The reliability of each RVE is determined using the appropriate probabilistic fatigue algorithms for the selected material. The analyses for all the individual RVE's are combined using standard industry system reliability modeling techniques to determine the fatigue reliability of the entire component. If the RVE are statistically independent, the system reliability is the union of the RVE reliabilities. If the RVE are statistically dependent, the system reliability can be determined using correlated Monte Carlo simulation. This results in prediction of fatigue reliability as probability of failure relative number of cycles or time or even the probability of exceeding a fatigue threshold.

Example 5

Future Electronics Design for Reliability

Reliability Roll-Up

Overall vehicle electronics are a system of individual modules. The vehicle OEM has historic warranty records, test results, or engineering reliability estimates. Taking advantage of this data, the new reliability software paradigm will serve to identify those modules which most critically define overall vehicle reliability, so that reliability specification goals can be established for Tier I contracts (i.e., those contracts between an OEM and from a source for purchase of a primary component).

Tier I electronic modules are made up of any variety of printed wiring boards (PCB's) as shown in FIG. 2, devices (e.g., monitors, controllers) and connections. When an individual board is found to be compromising overall vehicle (fleet) reliability, corrective action could be to re-engineer the board or to procure a similar board from an alternative supplier.

Figure 14:
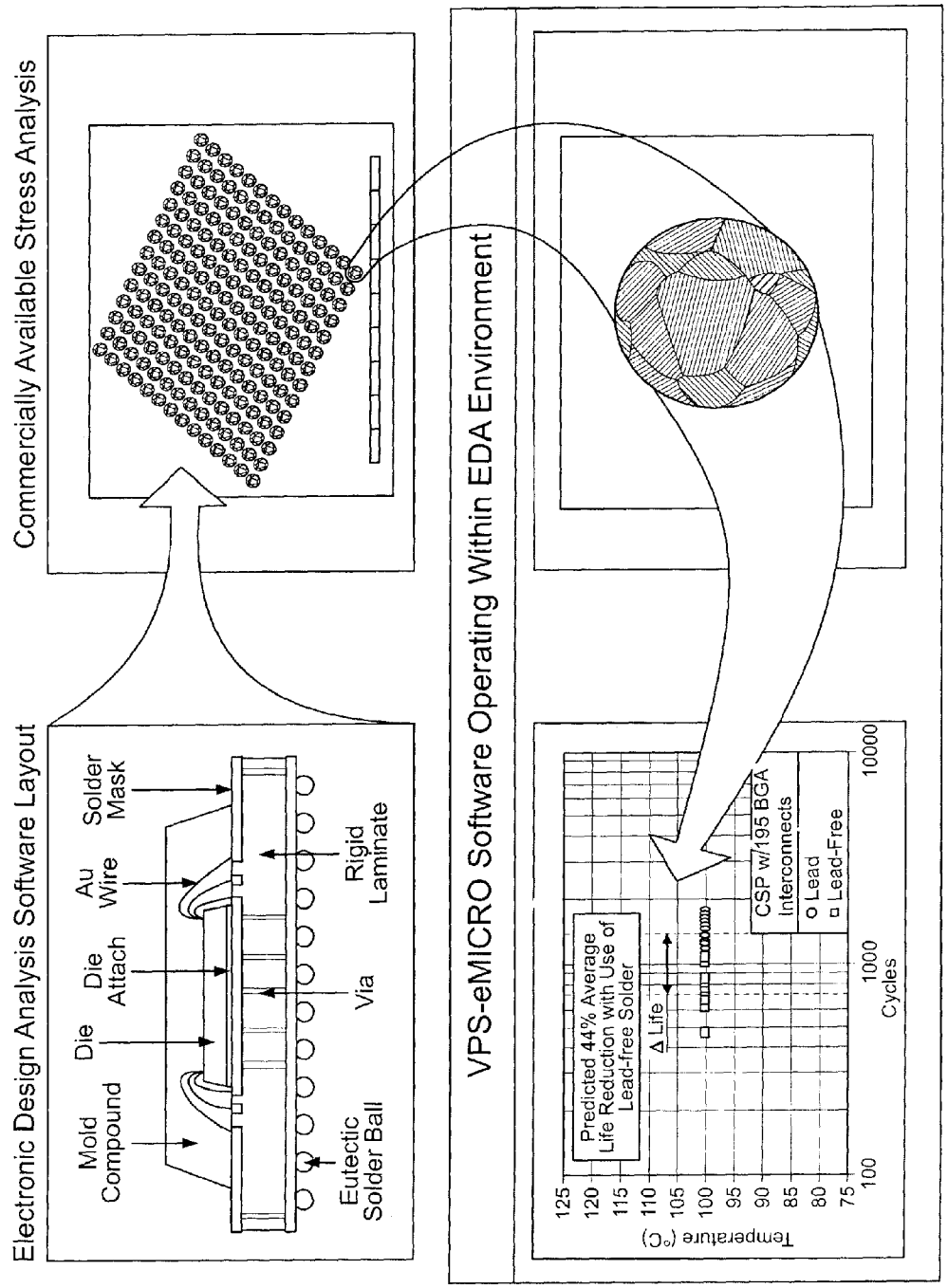
FIG. 14. Physics of failure simulation within EDA framework.

At the PCB supplier level, interconnect reliability is a primary cause of overall board failure. Interconnects are made of various materials (e.g., lead, lead-free, etc.) and material suppliers provide sources of variability that impact interconnect reliability (e.g.: variation in grain size, defect populations). Predictions from EDA and/or FEA software already used within the electronics design space establish "global" stresses. As shown in FIG. 14, global stress can be translated to the material level and material specific failure physics algorithms can be used to predict interconnect life or reliability. Given this, when a designer changes a chip scale package (CSP) within the board layout, then the stresses imposed on the CSP will change as well as the associated life prediction. Interconnect design immediately rolls up to establish PCB reliability which rolls up to establish module reliability which establishes overall vehicle electronics reliability.

Example 6

Automotive ECU's are made up of any variety of printed circuit boards (PCB's) as shown in FIG. 14, devices (e.g., monitors, controllers) and connections. When an individual board is found to be compromising overall vehicle (or fleet) reliability, corrective action could be to re-engineer a board within the ECU or to procure a similar board from an alternative supplier to achieve desired reliability.

At the PCB level, interconnect reliability is a primary cause of overall board failure. Interconnects are made of various materials (e.g., lead, or lead-free), and material suppliers provide sources of variability that impact interconnect reliability (e.g., variation in grain size, defect populations). Predictions from EDA and/or FEA software already used within the OEM design space establish "global" stresses. The global stress can be translated to the material level and material specific failure physics algorithms (discussed previously) can be used to predict interconnect life or reliability. Given this, when a designer changes a scale package (CSP) within the board layout, the stresses imposed on the CSP will change as well as the associated life prediction. Interconnect design immediately rolls up to establish PCB reliability, which rolls up to establish module reliability, which establishes overall vehicle electronics reliability.

When adopted, such methods will reduce overall engineering costs, while providing far more insight into reliability drivers than current methods. Reliability is inherently probabilistic, driven by natural randomness in the grain structures of all materials, and the necessarily random response these grain structures have to the application of stress. This randomness manifests itself as an inherent spread in point of failure, and time to failure, for any macro object or structure. The methods described herein explicitly use this fundamental property of materials as input to their computational approach and are thus able to account for failure in ways that traditional methods cannot.

Figure 15:
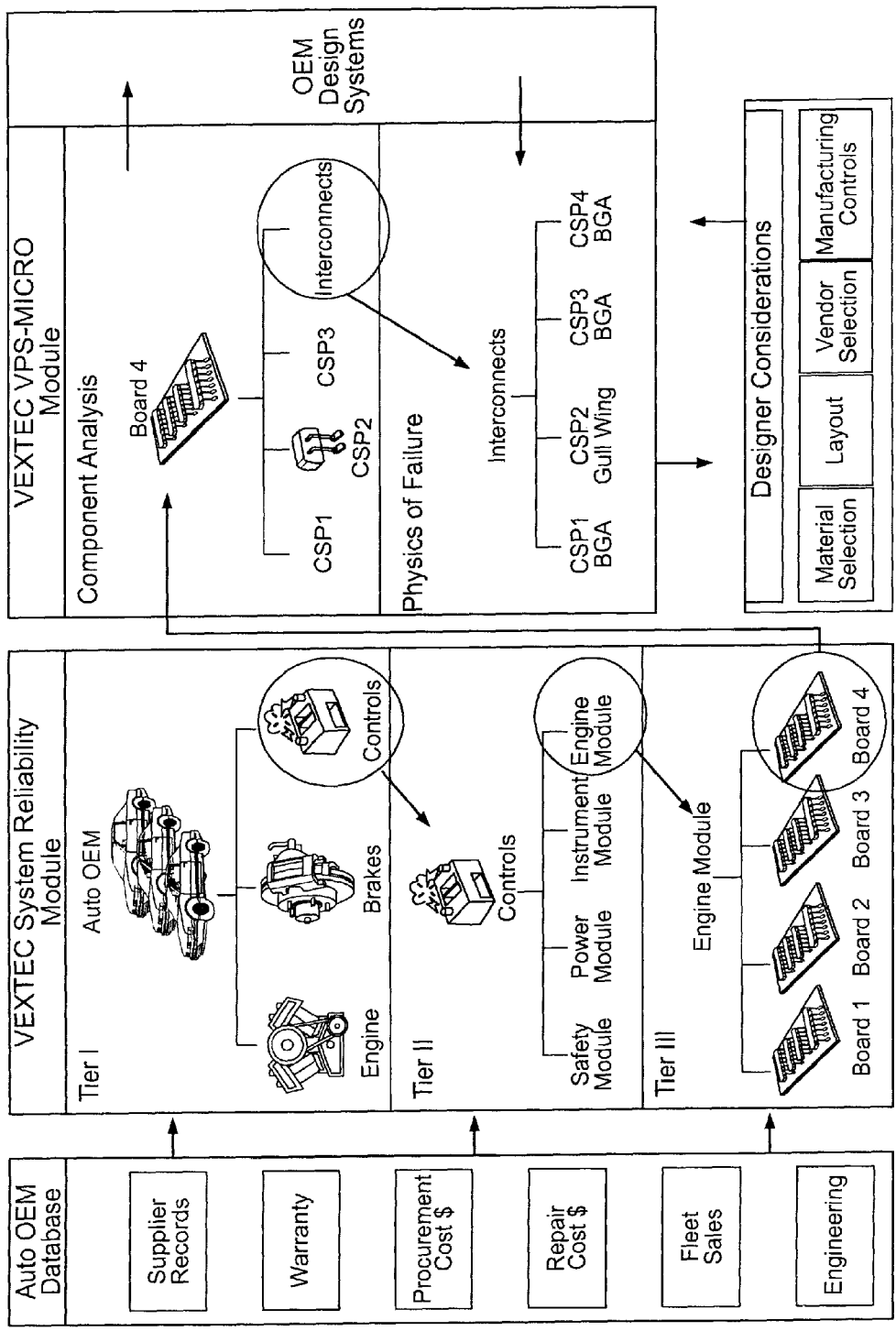
FIG. 15: Future desktop computational reliability modeling (DCRM) vision.

As shown in FIG. 15, this vision will incorporate the described system-level reliability rollup and material failure physics modeling as an integrated software approach. Simulations will be based on data stored within the OEM systems. This includes reliability, engineering, product cost, and repair cost information. The appropriate information will be rolled-down to provide the needed input for physics of failure modeling. The described material-based failure physics simulation will be conducted within the OEM design environment where rationalized engineering trade-offs can be assessed in timely fashion.

Example 7

Interconnect Fatigue Simulation

Solder joints are particularly vulnerable to fatigue failure, as discussed herein. As systems are powered up and down, these interconnect elements are subject to thermal gradient cycling, which, working in combination with vibration, impact, and shock loadings, create dynamic conditions conducive to fatigue.

In short, fatigue must be considered a primary mechanism behind electronics failure, and applying the types of modeling techniques described herein can lead to major improvements in the understanding of electronic system reliability.

Fatigue failure is a localized, material-driven process. An extensive amount of research has been conducted as to how and why cracks initiate and grow within solder connections. This knowledge was adopted within the developed local simulation modeling approach. High stresses are translated from global loadings to the local material. In particular, these stresses exist at the interface between the copper lead and the solder. These localities are of compounded significance due to the existence of a complex microstructure of intermetallic layers between the copper and the solder. When molten Sn—Pb solder contacts the lead, intermetallic compounds (IMC) are formed between the solder and the lead. To model the complex stress state of the microstructure at the copper/solder interface, finite element models have been created for the copper/intermetallic/solder region (FIG. 4). Because the thickness of the intermetallic layers change with time, a series of finite element models must be incorporated within the modeling approach.

Example 8

Integrated Approach to Reliability-Based Design of Future Electronics Systems (Physics of Failure Validation)

Interconnect Solder Material Fatigue Simulation Results

Figure 16:
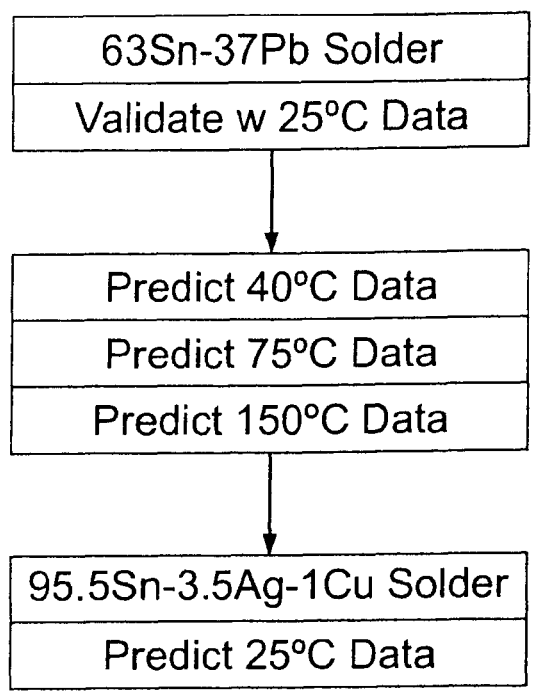
FIG. 16: Process used for predicting lead and lead-free solder fatigue.
Figure 16:
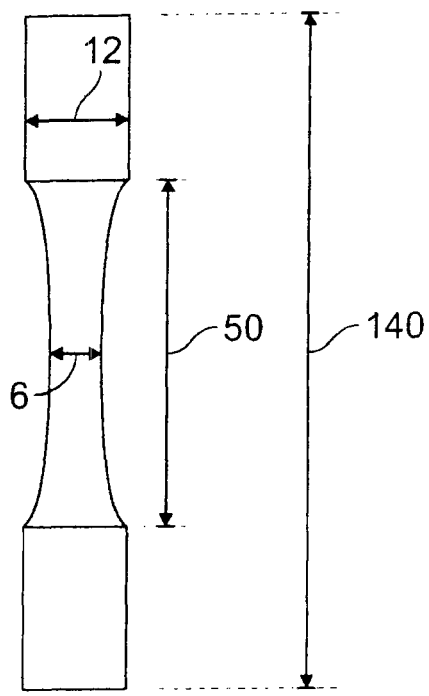

This example documents success in predicting lead solder fatigue response at high temperature based on model development with room temperature data (see, e.g., Nasser, L., Krishnan, G., Tryon, R., "Electronic Material Microstructural, Variability-Based, Total Life Fatigue Prediction Approach," *Intelligent Processing & Manufacturing of Materials Conference*, Jul. 19-23, 2005). Thereafter, as indicated in FIG. 16, it was assumed that the same failure mechanisms driving lead solder response were active in lead-free response, and fatigue predictions were made for lead-free solder material. The first step was to develop an input library for solder alloys to provide the appropriate input parameters for simulation of damage mechanisms at the microstructural scale.

Figure 17:
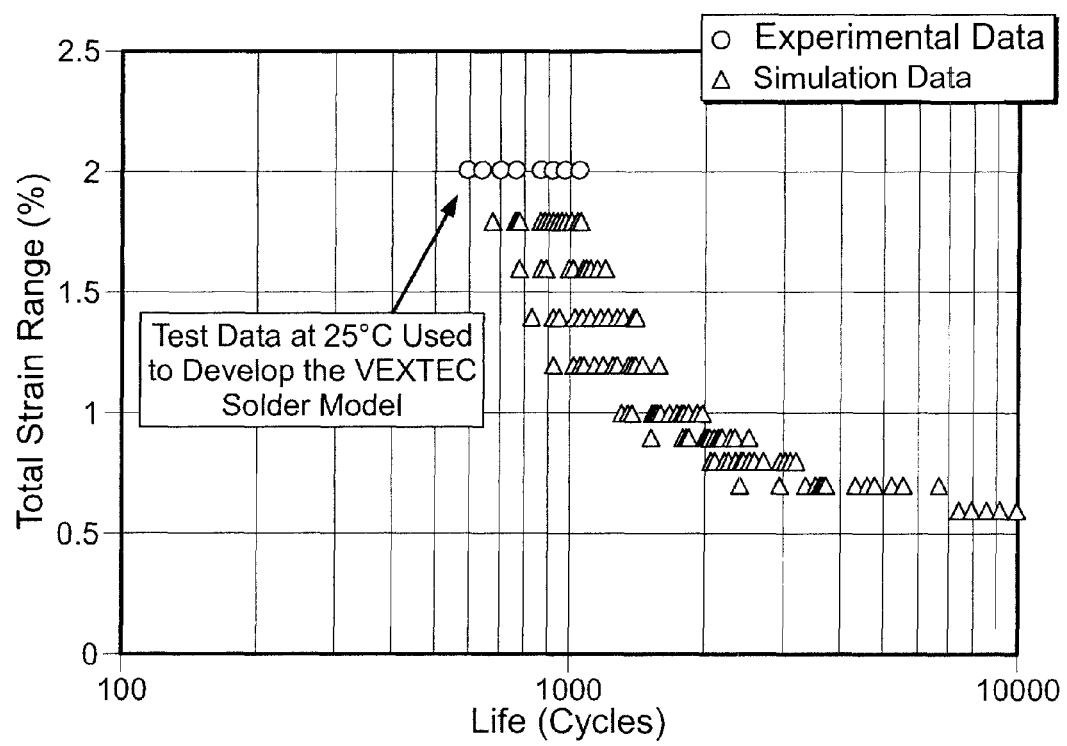
FIG. 17: Fatigue simulation for 63Sn37Pb at 25° C., 1 Hz.
Figure 17:
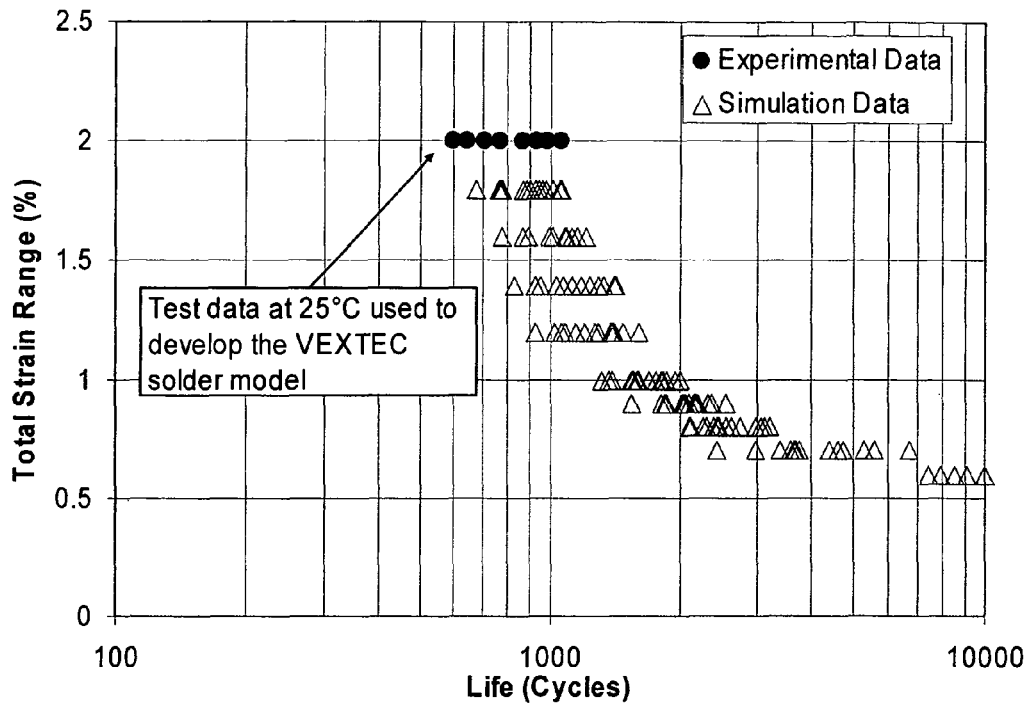

This simulation procedure accounts for variations in material parameters such as grain size, grain orientation, crack growth coefficients and inherent strength of the grains. Since 63Sn-37Pb eutectic solder alloy has been extensively studied by the electronics industry, this material seemed to be a logical starting point. Material performance data on this alloy are widely available at various temperatures and frequencies. Table 1 presents a listing of the model input parameters used for 63Sn-37Pb simulations along with the references from which these data came. As indicated in Table 1, values for some parameters could not be found in the available literature. Therefore, engineering judgment was used to estimate these parameter values, and fatigue was predicted for a strain range of 2%. Initial predictions with the methods described herein were compared to experimental data at 25° C. and 2% strain range (see J. H. L Pang, B. S. Xiong, and T. H. Low, 'Low cycle fatigue models for lead-free solders,' *Thin solid films*, Vol. 462, p. 408, (2004)). Thereafter these few parameters were further adjusted until the model successfully replicated these limited experimental data at 25° C. Upon achieving satisfactory results at 2% strain range, the complete 25° C. S-N (strain range-number of cycles to failure) curve was predicted for lower strain ranges (FIG. 17). Unfortunately no experimental data was available to compare with these predictions. As shown in FIG. 17, the method (as embodied in a program such as VPS-MICRO™) predicts the expected scatter in fatigue life. The art and science of modern day fatigue analysis can now account for the real world microstructural variability that exists in solder materials.

TABLE 1

Input parameters required for simulation of lead solder fatigue.

| Parameter | Reference |
|---|---|
| Bulk shear modulus | Siewert et al. [Ref. 15] |
| Poisson's ratio | Siewert et al. [Ref. 15] |
| Grain size and phases | Liu et al. [Ref. 6] |
| Small crack growth coefficient | Unknown |
| Long crack growth coefficients | Zhao et al. [Ref. 10] |
| Frictional strength (Yield strength of the grain) | Siewert et al. [Ref. 15] |
| Grain boundary SIF | Zhao et al. [Ref. 10] |
| Orientation factor | Assumed |
| Specific fracture energy | Unknown |

Figure 18:
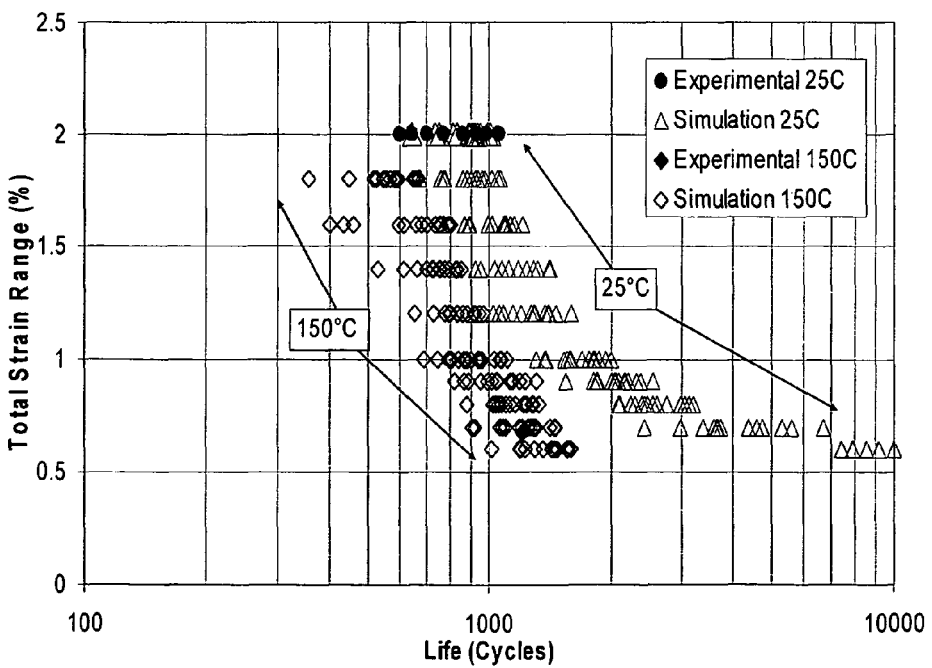
FIG. 18: Comparison of 63Sn37Pb fatigue predictions at 25° C., 1 Hz and 150° C., 1 Hz.

This model, developed based on 25° C. data, was then used to make higher temperature predictions for the same SnPb solder alloy. This was accomplished by first studying the effect of temperature on the material properties of the SnPb solder and making appropriate modifications to model input parameters. FIG. 18 shows the comparison of the predictions at 25° C. and 150° C. Through the open literature, a single 150° C. fatigue test data point was accessed for this material. As shown in FIG. 18, this data point falls within the expected scatter at approximately 0.7% strain range. This suggests that the model can successfully simulate solder temperature effects. As expected, the 150° C. fatigue lives are lower than those at 25° C. It is interesting to note that the model predicts that the effect of temperature is more pronounced at lower strain ranges than at higher ones.

Figure 19:
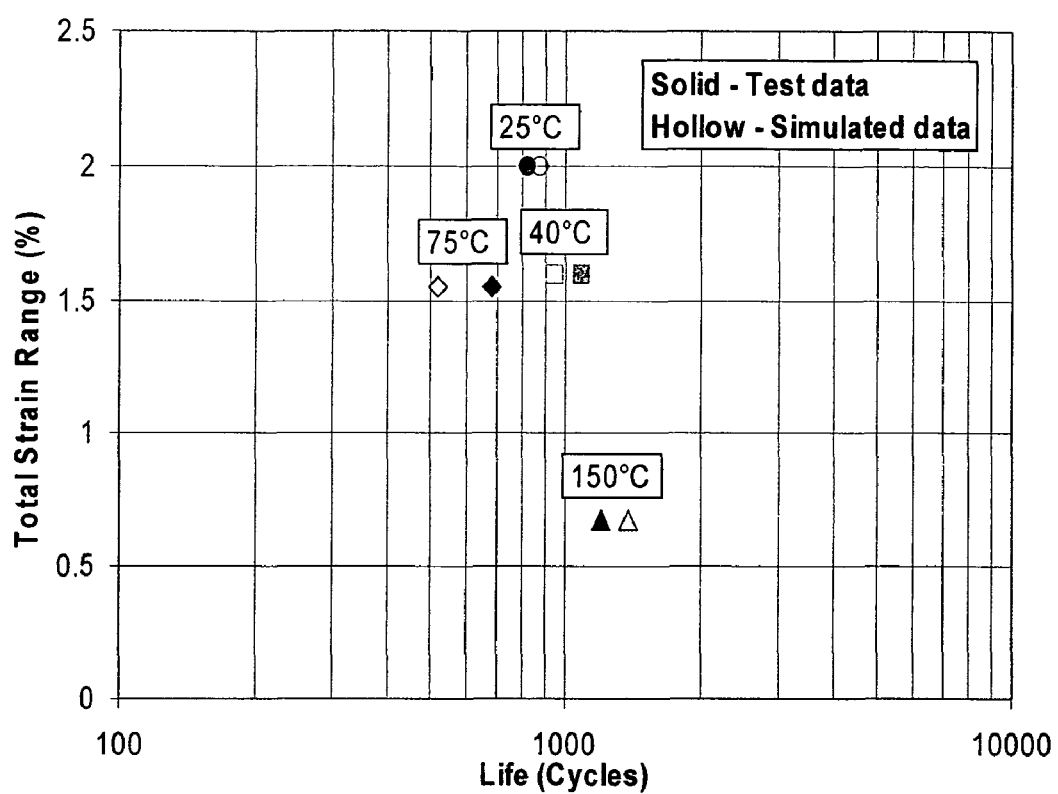
FIG. 19: Comparison of mean simulation values with test data at various temperatures.

Simulations were also made at 40° C., 1 Hz and 75° C., 1 Hz since a single test data point was obtained for each of these temperatures. Again, the actual fatigue test point was within the predicted scatter for the appropriate strain range; therefore, the method, as embodied in software such as VP S-MICRO™, appears to be successfully predicting temperature effects on solder fatigue life. FIG. 19 presents a comparison of the mean predicted life with experimental data at the appropriate strain range.

Prediction of Lead-Free Solder

As stated previously, it was assumed that the same failure mechanisms driving lead solder response were active in lead-free response. Therefore the inputs were only modified to account for collected information about microstructural properties (e.g., grain size) and bulk material properties. Thereafter fatigue predictions for lead-free solder material were made, e.g., using a program such as VPS-MICRO™. Since the national electronics manufacturing initiative (NEMI) has suggested that 95.5Ag-3.5Sn-1.0Cu solder has promising characteristics for widespread electronics industry use, that material was selected for evaluation. The properties the input parameters used are listed in Table 2 (see also Nasser, L, R Tryon and G. Krishnan, "Electronic material, variability-based, total life fatigue prediction approach," Intelligent Processing and Manufacturing of Materials Conference, (2005)).

Some parameters did not change from those used for lead material predictions. This was either purposeful or just due to lack of reliable information about what they should be.

TABLE 2

Input parameters required for simulation of lead-free solder fatigue.

| Parameter | Reference |
|---|---|
| Bulk shear modulus | Modified based on data in Siewert et al. (Ref. 15) |
| Poisson's ratio | Modified based on data in Siewert et al. (Ref. 15) |

TABLE 2-continued

Input parameters required for simulation of lead-free solder fatigue.

| Parameter | Reference |
| --- | --- |
| Grain size and phases | Modified based on data in Amagai et al. (Ref. 12) |
| Small crack growth coefficient | Unchanged |
| Long crack growth coefficients | Changed based on data in Zhao et al. (Ref. 10) |
| Yield strength of the grain | Unchanged |
| Grain boundary SIF | Modified based on Zhao et al. (Ref. 10) |
| Orientation factor | Assumed |
| Specific fracture energy | Unchanged |

Figure 20:
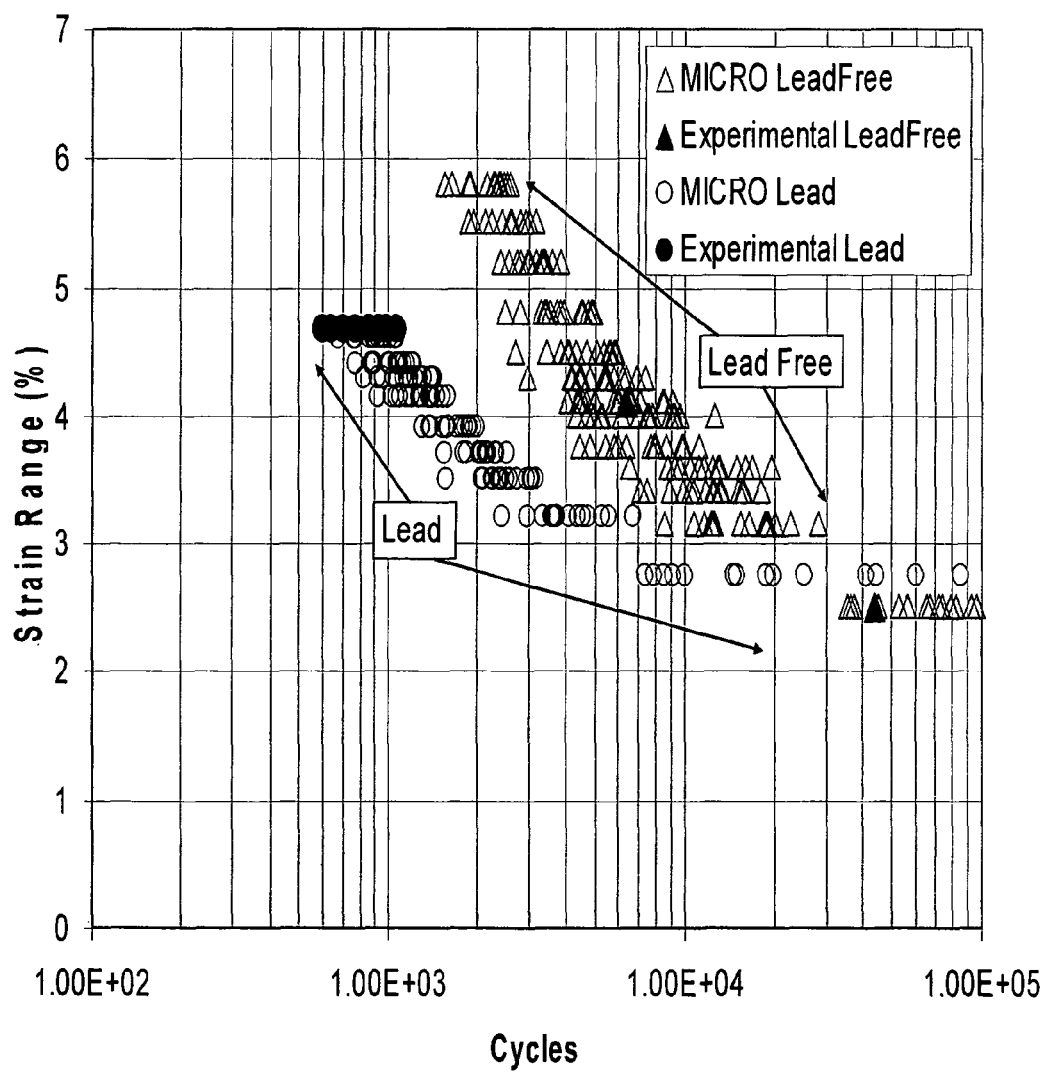
FIG. 20: Comparison of lead and lead-free solder predictions at 25° C., 1 Hz.

Fatigue predictions at 25° C., 1 Hz were made and compared with limited experimental data available in Pang, et al. As shown in FIG. 20, predictions accurately capture the two experimental data points presented in Pang, et al. Along with the lead-free predictions, the earlier presented lead solder predictions of total strain at 25° C. are shown in FIG. 20. The simulations show a very interesting feature, the lead and lead-free fatigue lives cross over. This suggests that lead solder actually performs better than lead-free solder at lower strain ranges. One possible reason for this could be the strain hardening effect that occurs when the lead-free solder material is at room temperature. This strain hardening nature was observed in one hysteresis loop assumed to be the cycle at half life. Further data on cyclic hardening is needed to verify the strain hardening phenomenon. Further it should be noted that the results shown here are for a laboratory material specimen and not for an actual solder joint geometry. For an actual solder joint, other issues such as thermal residual stresses, and inter-metallics (interface layers between alternating layers of metals, shown as different colored layers in FIG. 4), play a role influencing fatigue life.

Figure 21:
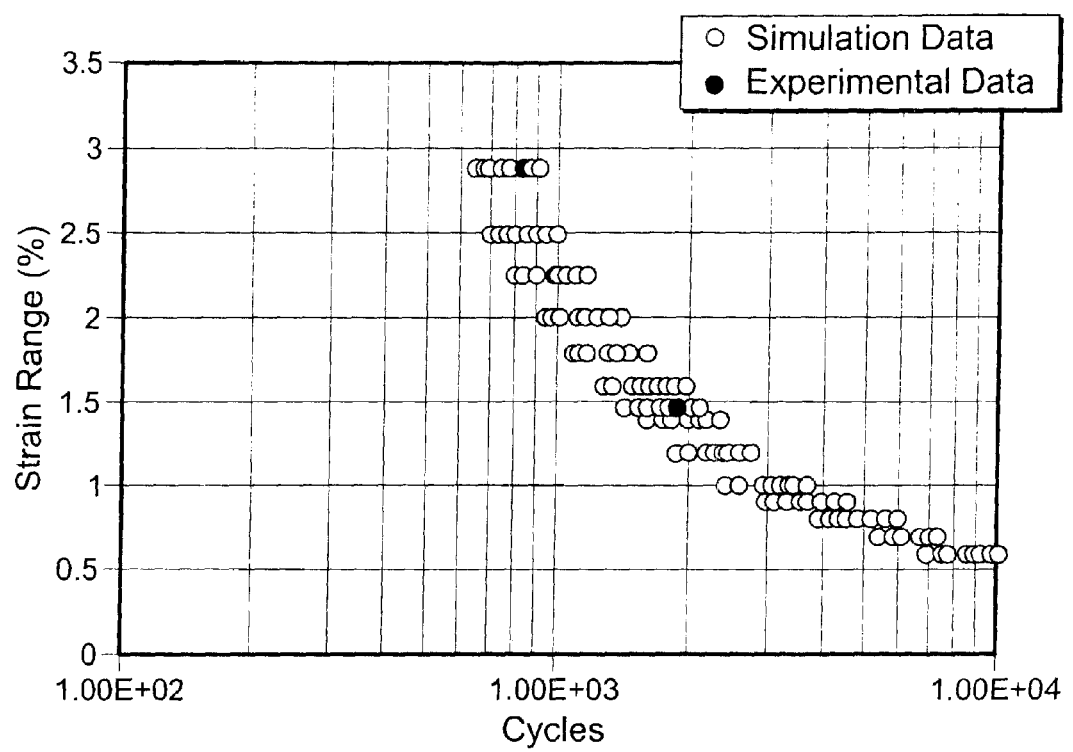
FIG. 21: Lead-free solder predictions at 125° C., 0.001 Hz.

The final step in this process was to verify that the methods could successfully predict the effects of temperature on lead-free solder fatigue. Fatigue predictions at 125° C., 0.001 Hz lead-free solder are presented in FIG. 21. Within VPS-MICRO, only the material properties were modified to account for the temperature and frequency change effects. As shown, these predictions compare well with single experimental result obtained from Pang, et al.

Example 9

Solder Simulation

There are many sources of stress to be considered when modeling solder joints. For example, movement of a vehicle or sudden acceleration of a component will affect stresses on every solder joint within it. Vibration caused by acoustic noise, wind buffeting, or machinery will also place stresses on solder joints. A mismatch of thermal coefficient of expansion during heating and cooling cycles induces a primary stress. As components mounted to an electronic circuit board with solder rise in temperature, they expand at a different rate than the board or even the solder itself. Over time, all of these stresses induce fatigue and failure of the solder joints.

Damage to the solder joints does not cause loss of function initially, but as cracks form and propagate through the joint, electrical disconnect can occur. In the modeling and testing for this example, through cracks were expected to cause a significant change in the resistance or capacitance of the components on a circuit board. In most cases, through cracks eventually result in a complete loss of electrical connectivity between components. The process of modeling includes the following steps:

(1) Identify a low reliability solder joint for analysis
(2) Develop a finite element model of the solder joint
(3) Apply loads to the model that are representative of environment and obtain one or more stress models.
(4) Transfer the stress models to a fatigue analysis software tool
(5) Compare the calculated fatigue results with testing and refine model if needed Several test articles were constructed to explore the damage mechanisms exhibited by different surface mount components, solder types, and coatings, and to identify a low reliability solder joint for subsequent analysis. The test boards used in the analysis are made from FR4, and contained many different components at different locations, and with different coatings and orientations. The articles were thermally cycled in a test chamber over a 2 hour period from −55° C. to 95° C. Through the thermal testing, several of the resistors showed higher than average failure rates, and were selected for further analysis. These components have a statistically significant number of failures which will be useful in corroborating the failures predicted by the methods described herein.

In developing finite element models of the solder joint and resistors, several solutions were developed to address material shape and structure. In particular, the contours of the solder are typically very complex and therefore may require specialized modeling. Additionally, conformal coatings significantly change stress fields with the device because a conformal coat "hangs on" to all the components and limits the amount of deformation caused by rise in temperature. This hanging on thereby reduces stress. These issues were overcome to produce an accurate FEA model of the components, as further described herein.

One of the primary challenges with modeling electrical components such as interconnects is to establish the contours of the solder. Solder cools from a liquid to solid state during the manufacturing process, so the shape is driven by surface tension and adhesion to the metal surfaces. Accordingly, one way of modeling the contours is to apply tools that have been developed to simulate surfaces whose shapes are dominated by surface tension forces. For example, Surface Evolver, a program developed by Dr. Kenneth Brakke at Susquehanna University provides a simulation of contours of such surfaces. This is an interactive program for studying surfaces shaped by molecular surface tension and other energies, subject to various constraints, by minimizing energy (such as surface tension and gravity). In the electronics industry, it is used for predicting reflowed solder joint shapes and hence may also be used to model the geometry resulting from the solidification of liquid solder. Surface Evolver models the solder surface as a collection of triangulated facets, thus capturing the complicated topology involved.

For integration into the finite element model of the surface mounted chip under testing, inputs and outputs from Surface Evolver were compared to those used with the finite element analysis (FEA) program, ANSYS. The geometric descriptors defined in Surface Evolver (vertex, edge, facet, and body) were verified to be analogous to the ANSYS geometry definitions (key point, line, area, and volume, respectively). ANSYS can therefore be used with geometric outputs from Surface Evolver. Since Surface Evolver only generates the geometry of the solder joint surface, the interior and interface geometries of the FEA also need to be defined.

Figure 22:
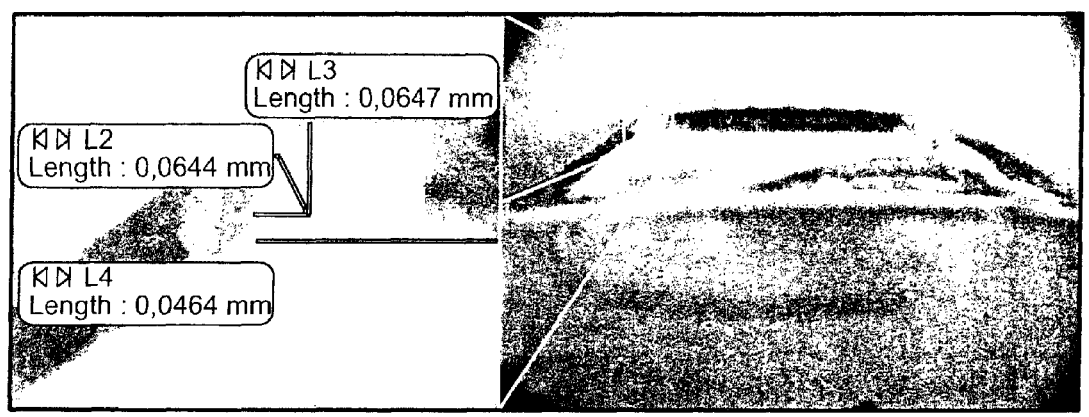
FIG. 22: Microscopic measurement of the fillet dimensions for resistor.
Figure 23:
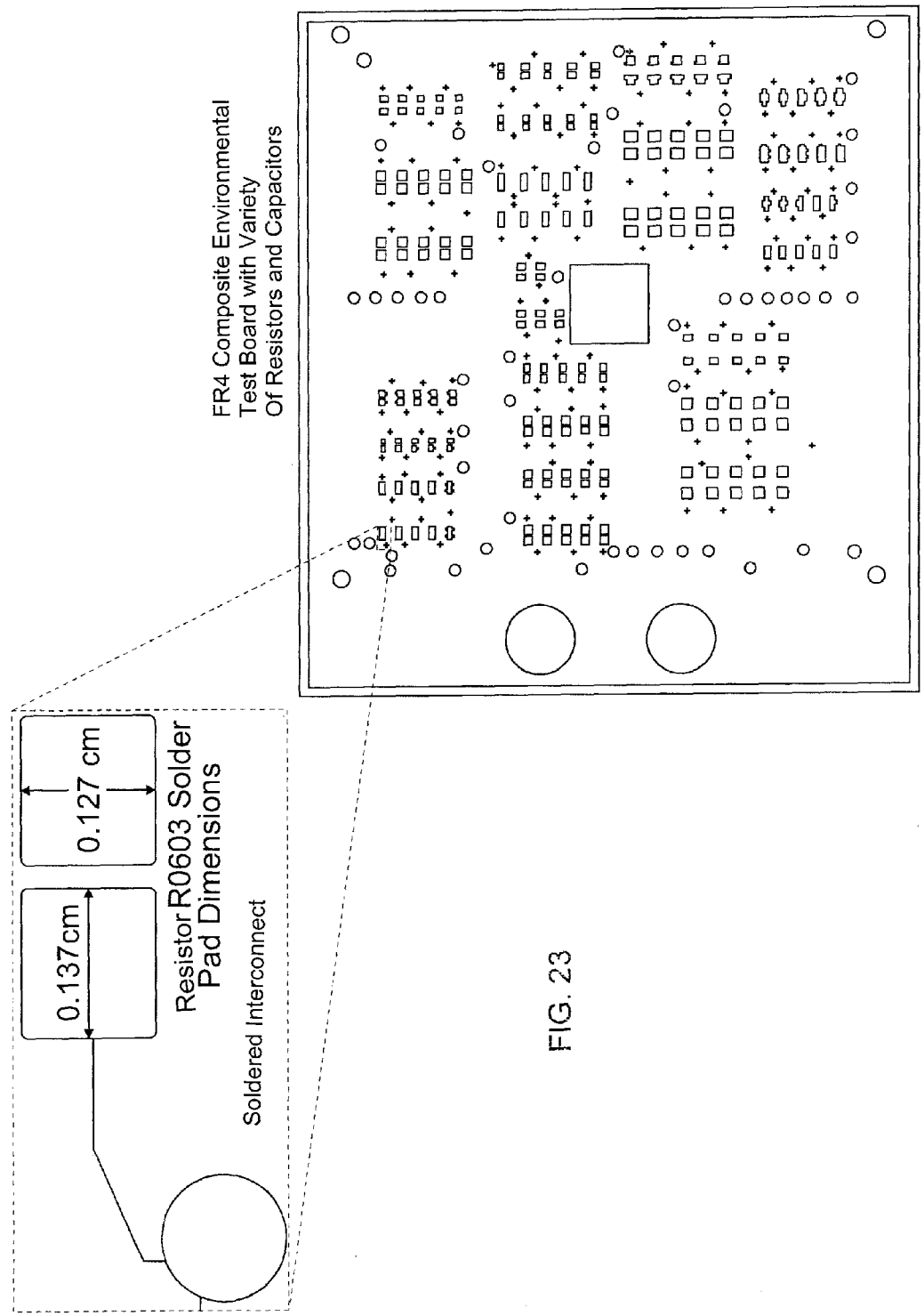
FIG. 23: Dimension measurement for solder-pad.

The dimensions of the resistor and solder pad are inputs required by Surface Evolver to generate solder shapes. The dimensions for the resistor setup under test, were obtained from microscopic measurements, see for example FIG. 22. The resistor was observed to measure 0.06"×0.03" (1.6 mm×0.8 mm). FIG. 23 illustrates the microscopically measured dimensions for the solder-pad and the chip as a portion of the entire test board setup.

TABLE 3

Variation in solder joint measurements

|  | Length (mm) | Width (mm) |
|---|---|---|
| C1 left | 2.5465 | 1.8975 |
| C3 left | 2.5256 | 1.8905 |
| C4 left | 2.4697 | 1.8696 |
| C1 right | 2.5395 | 1.9533 |
| C3 right | 2.5325 | 1.9324 |
| C4 right | 2.4767 | 1.9045 |
| average | 2.515 | 1.908 |
| COV(%) | 1.322 | 1.581 |
| R91 left | 2.2395 | 1.9393 |
| R92 left | 2.2395 | 1.7649 |
| R93 left | 2.2535 | 1.7789 |
| R91 right | 2.2395 | 1.8138 |
| R92 right | 2.1837 | 1.8138 |
| R93 right | 2.2325 | 1.7928 |
| average | 2.231 | 1.817 |
| COV(%) | 1.091 | 3.457 |

A key to the success of this approach is the consistency of solder joint measurements. This was explored using measurements from many components on the circuit board as shown in Table 3. This data revealed that there is less than 2% variation in most measurements. These dimensions are controlled by the printing methodology and the type of surface mount devices. Since the processes are very consistent, as indicated by the measurements, the stresses are likely to be very consistent between similar components on the board.

Figure 24:
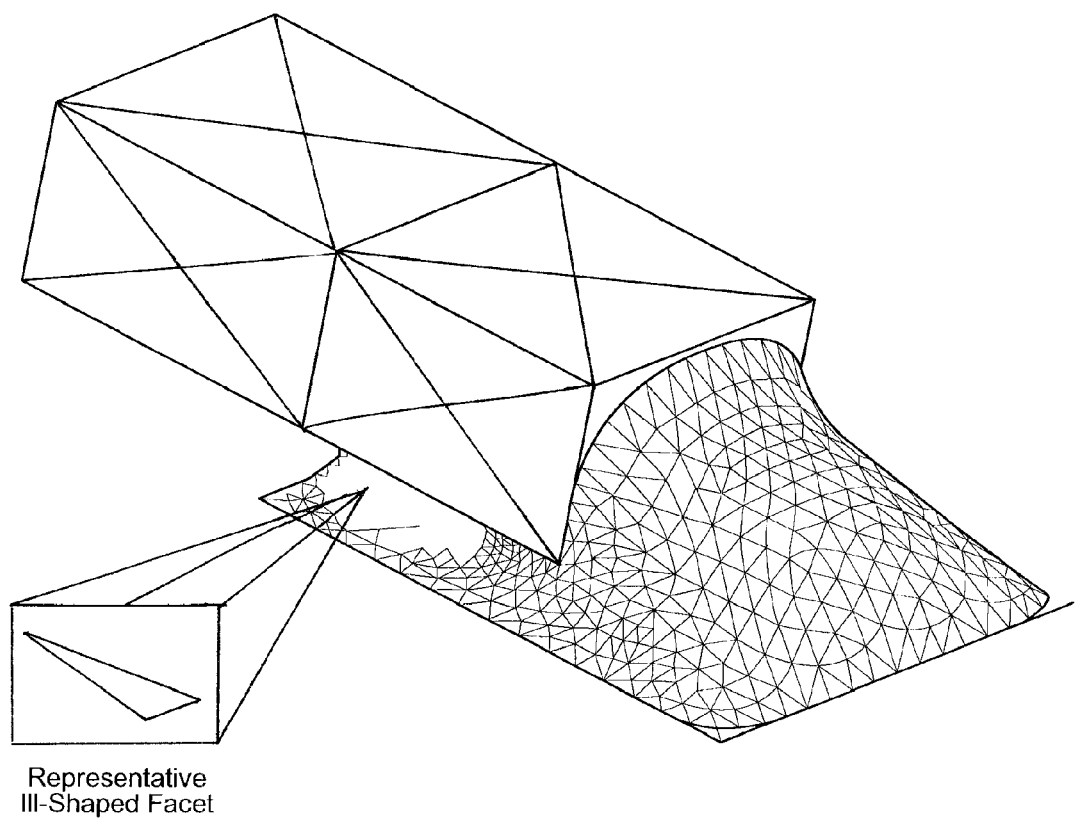
FIG. 24: Surface Evolver representation of solder.

FIG. 24 shows a resistor model generated with Surface Evolver. Microscopic observations of the test board verify that the FEA model simulates the solder joint geometry. The next step involved using the Surface Evolver command language to translate the surface geometric connectivity data generated into an equivalent full volume ANSYS readable input. Further manipulations may be necessary to convert the resulting file into a form that can be directly imported into a program such as ANSYS.

For example, highly skewed facets, an instance of which is shown in FIG. 24, were generated by Surface Evolver in several places. A successful translation of geometry output from Surface Evolver should produce a complete set of key points, lines, areas, and one volume for ANSYS. Several of the ill-shaped triangular facets could have resulted in a finite number of possible geometric discontinuities which are repaired by hand after importing the geometry into ANSYS. For example, the analyst is able to adjust the facet shapes by using an automated geometry optimizer within ANSYS, or by manually redrawing the facet shapes with an ANSYS editor.

Figure 25:
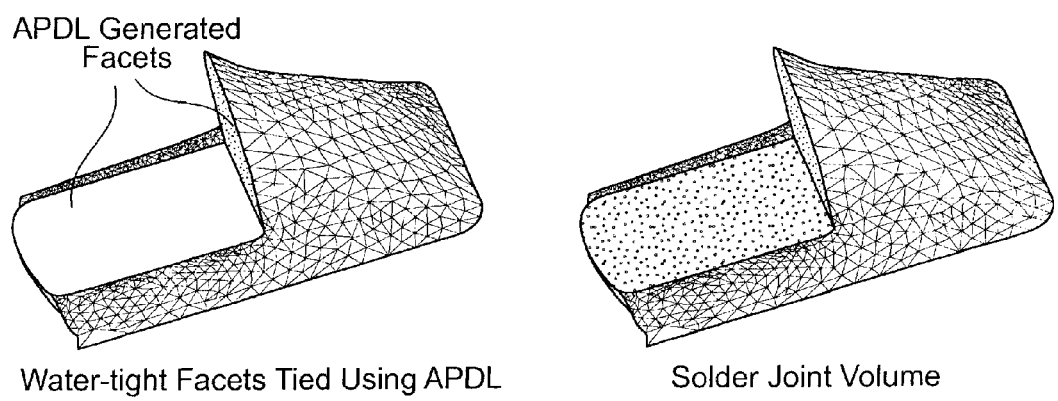
FIG. 25: Facet interfaces and solder volume generated from the output from FIG. 24.

FIG. 25 shows a zero radius fillet between the vertical and horizontal planes of the chip terminal. Because of the zero radius feature, infinite stresses will exist at this location. The finite element geometry at the solder pad-chip terminal interface was modified to a fillet having a finite radius, with the intention to capture the proper distribution of stresses along these regions. The fillet dimensions for the test resistor was verified though microscopic measurements. The curvature on the fillet at the top of the terminal pad is the same as that on the bottom of the pad.

Figure 26:
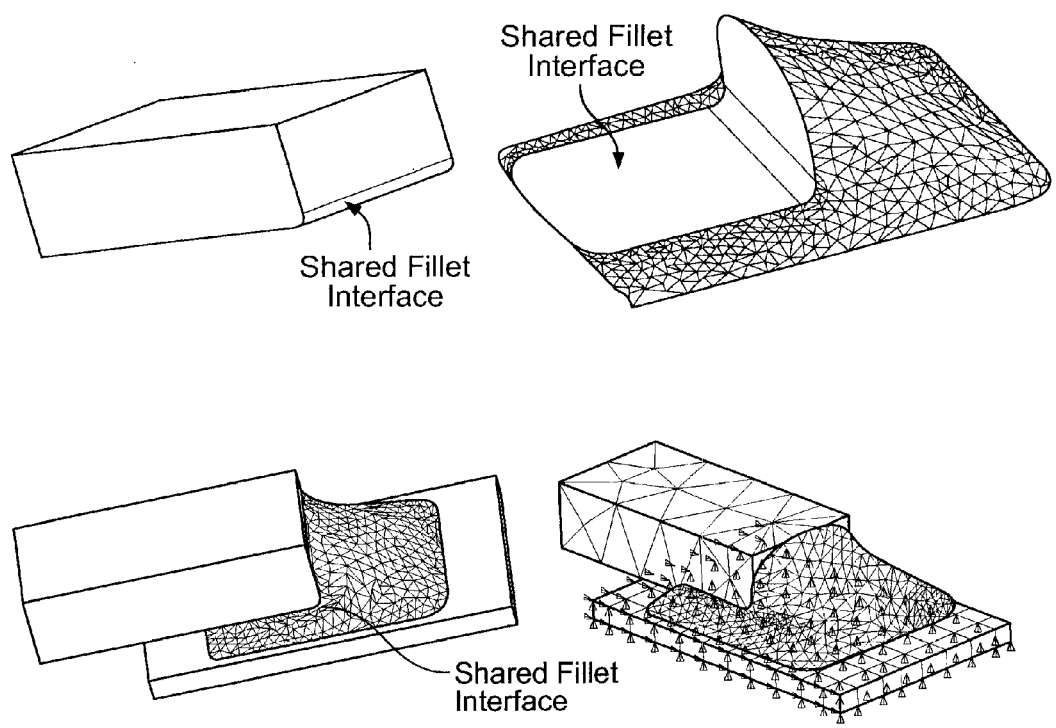
FIG. 26: The fillet incorporated in the electronic assembly analyzed for thermal fatigue.

FIG. 26 shows details of the geometry of a fillet incorporated in a soldered resistor electronic assembly which was analyzed for thermal fatigue. ANSYS Parametric Design Language was used to incorporate a fillet in both the solder joint and resistor chip.

Conformal Coatings

A conformal coating is defined as a thin polymeric layer which "conforms" to the topography of the printed circuit board and its components. The coating acts as an insulator, protecting the circuitry and components against shorts and contact with moisture and other contaminants. It also provides mechanical protection from vibration and thermal shock. The electronic assembly failure data from testing revealed that the type of conformal coating used in the resistors influenced the failure rates. The thermal properties of two types of common coating were used in the finite element analysis of the conformal coated assembly.

Figure 27:
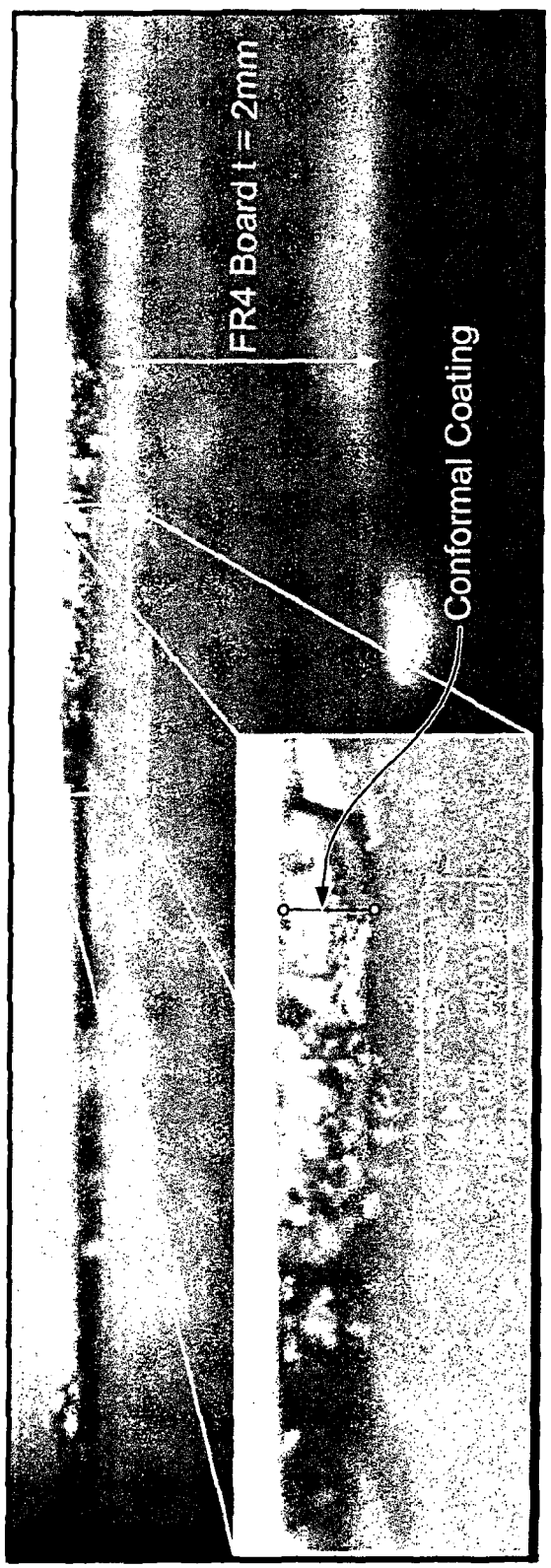
FIG. 27: Coating thickness measured by a binocular microscope.

The thickness of the conformal coating used in the R0603 printed circuit board assembly was independently verified though microscopic measurements. FIG. 27 shows the microscopically measured thickness of the coating. The coating near the resistor assembly measures nominally 220 microns.

A literature search revealed that the coefficient of thermal expansion of the Dymax 984 conformal coat was 69e-6 in./in./° C., which was approximately three times greater than that of the solder joint (26e-6 in./in./° C.). The influence of two conformal coats (Dymax 984 and Dymax 986) on the electronic assembly reliability was incorporated into the model. Preliminary FEA was performed, representative of the conformal coated printed circuit board assembly. The conformal coating greatly improved the reliability of the electronic assembly under test. The thermal fatigue endurance of the assembly coated with Dymax 986 was predicted to be higher than the electronic assembly coated with Dymax 984.

The finite element analysis evaluated the stresses incurred by thermal cycling of the component in tests. The temperature ranged from 95° C. to −45° C. For the purposes of the stress analysis, the zero stress state of the joint was taken at the eutectic solder solidification temperature of 183° C.

FIG. 26 shows the half symmetry finite element model of the resistor. Two independent volumes were generated, the solder joint and the resistor. The ANSYS model was meshed with quadratic tetrahedral elements, assigned appropriate material properties, and further analyzed to investigate the thermal stress characteristics of the component.

To perform a steady-state thermal analysis with properly defined constraints, the printed circuit board was additionally incorporated into the resistor-solder assembly. Isotropic material properties were specified for the resistor chip and the solder. Appropriate orthotropic material properties were defined for the printed circuit board (composite material). The material properties used for the three components are presented in Table 2.

TABLE 4

Material properties of the components in the finite element model

| Component | Elasticity Modulus (Pa) | Coefficient of thermal expansion (° C$^{-1}$) |
|---|---|---|
| Resistor | EX = 2.76E11 | ALPX = 6.4E−6 |
| 63Sn37Pb Solder | EX = 2.74E10 | ALPX = 2.6E−5 |
| Printed Circuit Board | EX = 1.597E10 | ALPX = 1.6E−5 |
|  | EY = 1.597E10 | ALPY = 1.6E−5 |
|  | EZ = 7.036E9 | ALPZ = 8.4E−5 |
|  | GXY = 7.205E9 |  |
|  | GYZ = 3.1421E9 |  |
|  | GXZ = 3.142E9 |  |

The net increase in coefficient of thermal expansion of the entire assembly resulted in lower magnitude of stresses at the critical region (solder pad-chip terminal interface), than without a conformal coating. At a temperature delta of 150° C., a maximum principal stress of 16 ksi was observed along the critical regions of the assembly which did not have the conformal coat. A Dymax 984 coat decreased the stress to 13 ksi. The Dymax 986 material, which had a higher coefficient of thermal expansion (128e-6 in/in/Celsius as compared to 69e-6 in/in/Celsius for Dymax 984) when used on the assembly, decreased the stress further to 12.8 ksi.

Figure 28:
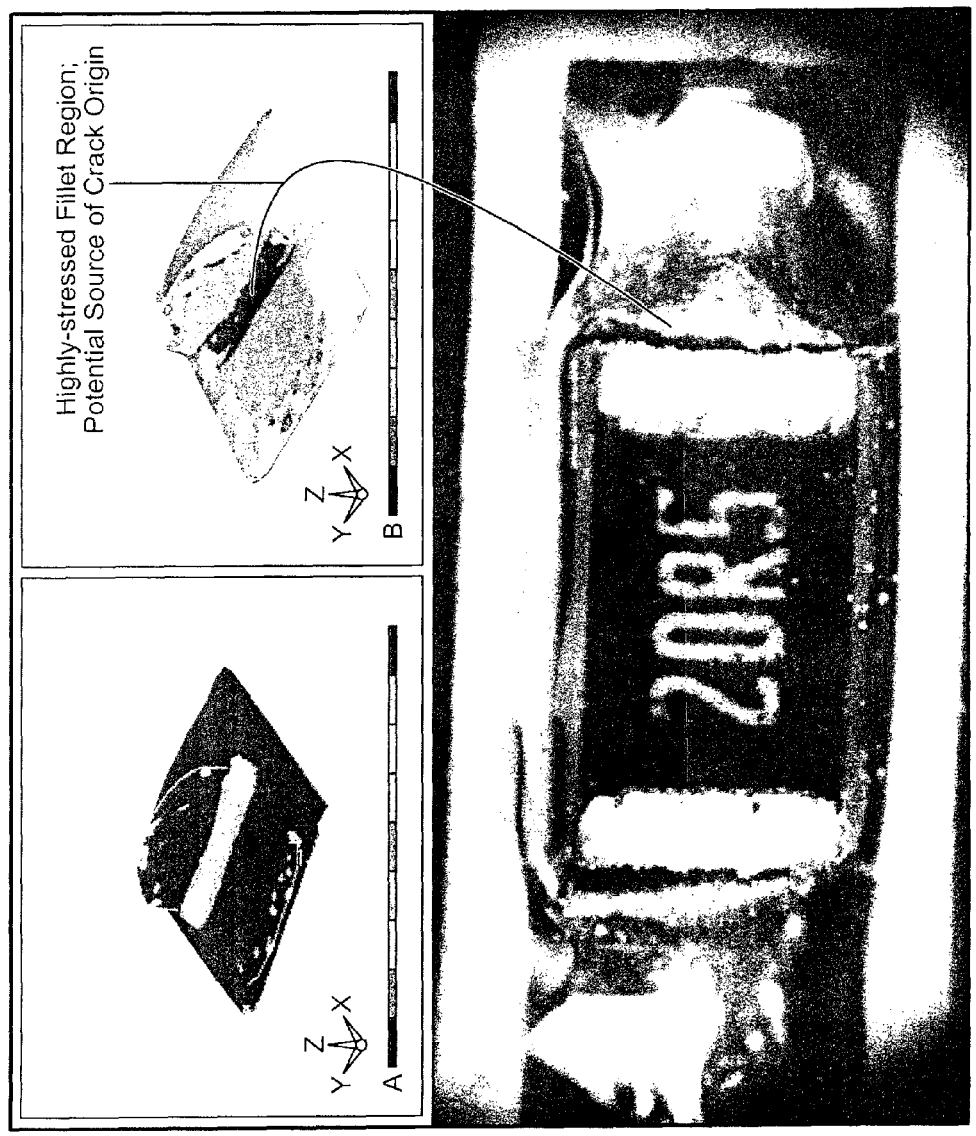
FIG. 28: Von Mises stress distribution along the Dymax 984 coated solder pad-chip terminal fillet interface.

FIG. 28 presents the distribution of the largest magnitudes of stresses along the solder pad-chip terminal filler interface. Microstructural crack mechanisms trigger in the regions of localized high stresses. The regions are shown in FIG. 28b, where the largest magnitudes of stresses were observed. These critical regions were identified as potential sources for a micro-crack to nucleate and propagate through the assembly, leading to a failure. The finite element stress model is used as an input to the fatigue analysis.

When compared to the test results, the predicted models successfully captured the physics of failure. The finite element model accurately predicted the stresses induced by thermal cycling. The probabilistic microstructural fatigue model will be used to predict the statistical variation in the test data and the relative effect of the conformal coating.

VPS-MICRO™ is a probabilistic microstructural fatigue software that predicts the mean and scatter in the number of cycles to failure for complex components with complex stress distributions. The inputs to VPS-MICRO™ are: finite element or other stress results files; the statistical distributions that describe the microstructural geometry; and other random variables. VPS-MICRO™ performs a "total life" analysis that includes crack nucleation, small crack growth, and long crack growth or any subset thereof. The crack nucleation and small crack growth routines are based on physics of failure using crystalline dislocation theory. The long crack growth routine is based on elastic plastic fracture mechanics.

The analysis uses Monte Carlo techniques to simulate many globally identical interconnect joints. Each joint has a unique microstructure and thus a unique fatigue response, allowing for the evaluation of the effects of material variability. Computations are performed on the ensemble of simulated joints to determine statistical fatigue descriptions such as average, scatter, and distribution type.

Figure 29:
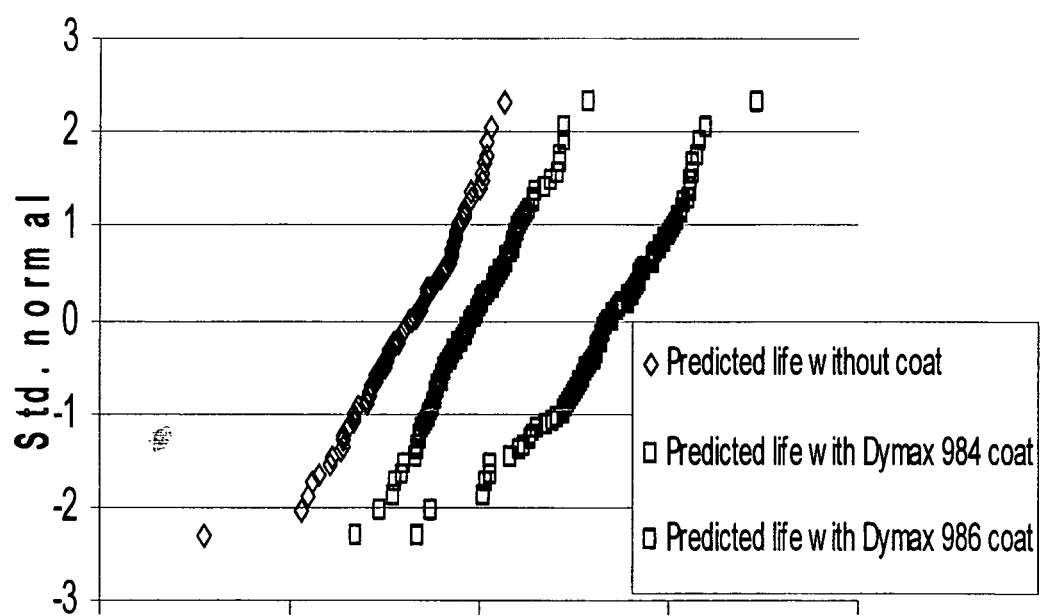
FIG. 29: Comparison of Analysis and Test (lower scale omitted).

FIG. 29 compares the statistical distribution of the VPS-MICRO™ predicted fatigue life data of the solder joint assembly subjected to different conformal coatings. At a delta temperature of 150° C., the resistor assembly without a conformal coat was used as the baseline life span. The resistor assembly with a Dymax 984 conformal coat had a predicted mean life 60% greater than the assembly with no coating. The assembly with a Dymax 986 conformal coating had a predicted mean fatigue life almost 2½ times the components with no coating. The Dymax 986 material (which had a higher coefficient of thermal expansion, 128e-6 in/in/Celsius as compared to 69e-6 in/in/Celsius for Dymax 984) when used on the assembly improved the thermal fatigue endurance of the electronic assembly significantly.

Figure 30:
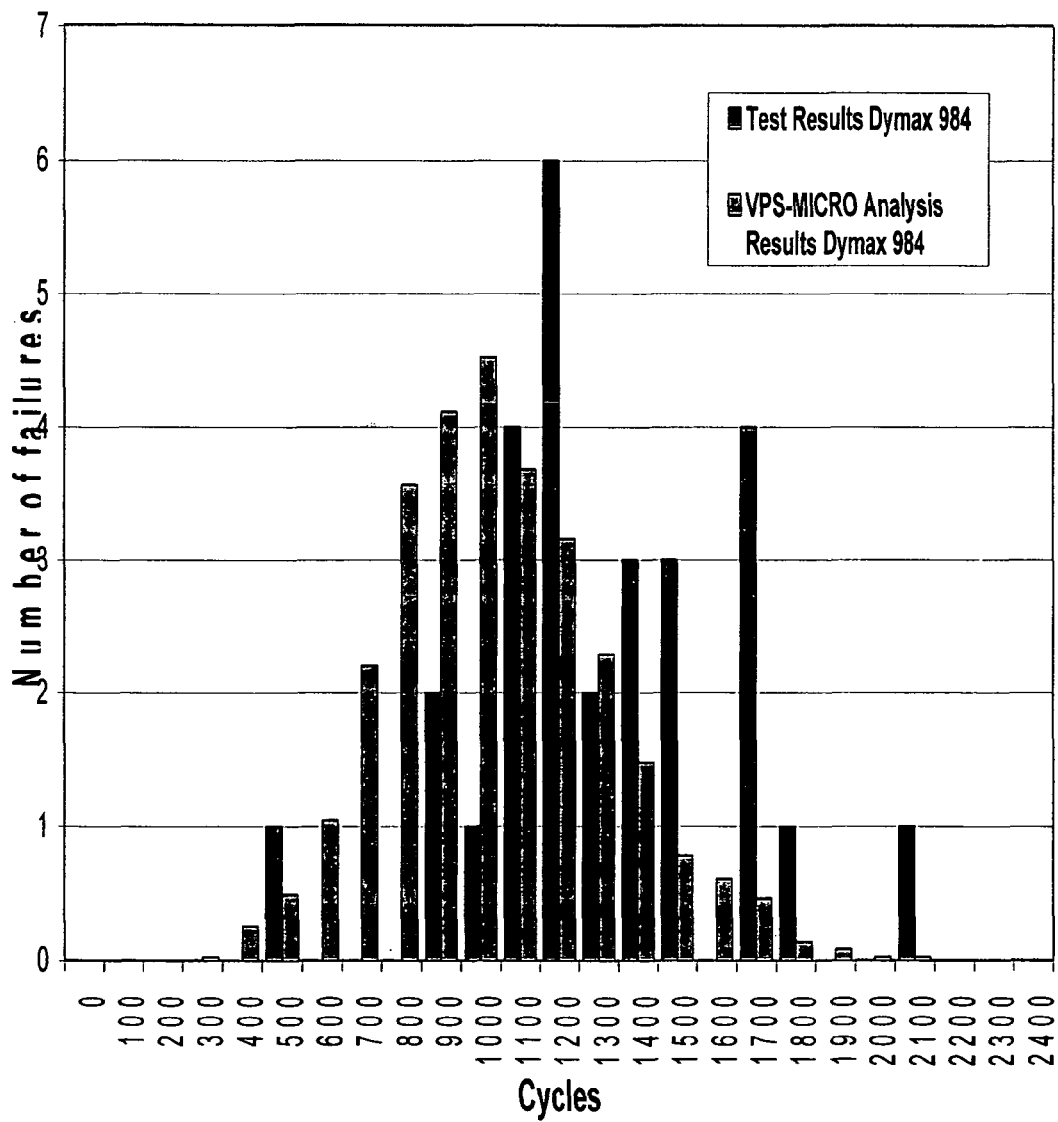
FIG. 30: Statistical distribution for the resistor assembly (with and without conformal coatings), subjected to a delta temperature of 150 Celsius.

FIG. 30 compares the actual test data and predicted fatigue life data for the Dymax 984 coated resistor assembly subjected to a delta temperature of 150° C. The Dymax 984 coated VPS-MICRO™ predicted failure data had a predicted mean life somewhat less than compared to a actual testing mean life. The finite element analysis of the component with the conformal coating gives a preliminary indication of how the coating adheres to the component and if coating egresses between the chip and the board. The current model assumes that the coat adheres to the chip and the board but does not adhere to the solder itself. It is also assumed that the coating does not egress between the chip and the board. Changes in the coating FEA will change the stresses which will affect the mean life.

The Dymax 984 coated VPS-MICRO™ predicted failure data had a predicted coefficient of variation (COV) of 28% as compared to an actual test COV of 28%. The COV of the fatigue life distribution FIG. 30 is indicative of the fatigue mechanism. Therefore it can be concluded that the model captures the mechanisms experienced by the test. This is an important finding because if the modeling captures the same mechanism as the test, the model can be used for assessing fatigue response at different loading conditions.

REFERENCES

The following publications have been referenced herein, or contain an indication of the state of the art as of the filing date of instant the application. All of these references are incorporated herein by reference in their entirety.

1. S. Knecht., L. Fox. (1991) "Integrated matrix creep: application to accelerated testing and lifetime predictions," *Solder joint reliability theory and applications*, Van Nostrand Reinhold, New York.
2. J. Liang, N. Gollhart, P. S. Lee, S. Heinrich, S. Schroeder, (1997) "An integrated fatigue life prediction methodology for optimum design and reliability assessment of solder inter-connectors," *Advances in Electronic Packaging*, Vol. 2.
3. J. W. Morris, H. L. Reynolds, (1997) "The influence of Microstructure on the mechanics of eutectic solders," *Advances in Electronic Packaging*, Vol. 2.
4. J. H. L Pang, B. S. Xiong, and T. H., Low, 'Low cycle fatigue models for lead-free solders,' *Thin solid films*, Vol. 462, pp. 408, 2004
5. A. Schubert, R. Dudek, E. Auerswald, A. Gollhardt, B. Michel, and M. H. Reichl, 'Fatigue life models for Sn—Ag—Cu and Sn—Pb solder joints evaluated by experiments and simulations,' *Electronic Components and Technology Conference*, pp. 603, (2003)
6. X. W. Liu, and W. J. Plumbridge, 'Thermomechanical fatigue of Sn-37 wt. % Pb model solder joints,' *Materials Science and Engineering*, Vol. A362, pp. 309, (2003)
7. B. A. Zahn, 'Solder joint fatigue life model methodology for 63Sn37Pb and 95.5Sn4Ag0.5Cu materials,' *Electronic Components and Technology Conference*, pp. 83, (2003)
8. X. Q. Shi, J. H. L. Panh, W. Zhou, and Z. P. Wang, 'Low cycle fatigue analysis of temperature and frequency effects in eutectic solder alloy', *International Journal of Fatigue*, Vol. 22, pp. 217, (2000)
9. X. Q. Shi, J. H. L. Panh, W. Zhou, and Z. P. Wang, 'A modified energy based low cycle fatigue model for eutectic solder alloy,' *Scripta Materialia*, Vol. 41, pp. 289, (1999)
10. J. Zhao, Y. Mutoh, Y. Miyashita, and L. Wang, 'Fatigue crack growth behavior of Sn—Pb and Sn-based lead-free solders,' *Engineering Fracture Mechanics*, Vol. 70, pp. 2187, (2003)
11. G. Lefranc, T. Licht, and G. Mitic, 'Properties of solders and their fatigue in power modules,' *Microelectronics Reliability*, Vol. 42, pp. 1641, (2002)
12. M. Amagai, M. Watanabe, M. Omiya, K. Kishimoto, and T. Shibuya, 'Mechanical characterization of Sn—Ag based lead free solders,' *Microelectronics Reliability*, Vol. 42, pp. 951, (2002)

13. I. Shohji, T. Yoshida, T. Takahashi, and S. Hioki, 'Tensile properties of Sn—Ag based lead-free solders and strain rate sensitivity,' *Materials Science and Engineering*, Vol. A3666, pp. 50, (2004)
15. H. Tang, and C. Basaran, 'Experimental characterization of material degradation of solder joint under fatigue loading,' *Inter Society Conference on Thermal Phenomena*, pp. 896, (2002)
16. K. Stinson-Bagby, 'Microstructural evolution in thermally cycled large area lead and lead-free solder joints,' Master's thesis, Virginia Polytechnic Institute and State University, (2002)
17. T. Siewert, S. Liu, R. D. Smith, C. J. Madeni, 'Properties of lead-free solders, release 4.0,' National institute of standards and technology and Colorado school of Mines, (2002)
A. Schubert, R. Dudek, E. Auerswald, A. Gollhardt, B. Michel, and M. H. Reichl, 'Fatigue life models for Sn—Ag—Cu and Sn—Pb solder joints evaluated by experiments and simulations,' Electronic Components and Technology Conference, pp. 603, 2003
H. Tang, and C. Basaran, 'Experimental characterization of material degradation of solder joint under fatigue loading,' Inter Society Conference on Thermal Phenomena, pp. 896, 2002
Nasser, L, R Tryon and G. Krishnan, "Electronic material, variability-based, total life fatigue prediction approach," Intelligent Processing and Manufacturing of Materials Conference, 2005.

The foregoing description is intended to illustrate various aspects of the present invention. It is not intended that the examples presented herein limit the scope of the present invention. The invention now being fully described, it will be apparent to one of ordinary skill in the art that many changes and modifications can be made thereto without departing from the spirit or scope of the appended claims.

What is claimed is:

1. A computer-implemented method for using a prediction of failure of an electronic device during design of the device, the method comprising:
   receiving data associated with a metallic component in the device, the data including data indicative of a response of the component to a specific load on the component while the device is in operation; and
   calculating a prediction indicative of a potential failure of the device using a probabilistic model of failure of the component, wherein the probabilistic model is based on at least the specific load, and a microstructure-based failure model and the data, and wherein the probabilistic model utilizes at least one of fast probability methods and simulation techniques, and wherein the microstructure-based failure model represents heterogeneous microstructures in the component, and includes one or more of a crack nucleation model and a short crack growth model.

2. The method of claim 1 wherein the probabilistic model is derived by a method comprising:
   obtaining a Finite Element Model (FEM) of the component;
   analyzing the FEM to obtain stresses at nodes of the FEM;
   determining a Representative Volume Element (RVE) for at least one of the nodes;
   building a microstructure-based failure model for at least one RVE and including the microstructure-based failure model in the RVE;
   simulating a component life using at least one RVE microstructure-based failure model, the simulating producing a result related to the component life; and
   performing the simulating a plurality of times to produce results related to component life, wherein the results are used to provide a prediction of failure for the component.

3. The method of claim 1, wherein the probabilistic model utilizes a fast probability method selected from: a first order reliability method; a second order reliability method; an advanced mean value method, and a mean value method.

4. The method of claim 1, wherein the probabilistic model utilizes a simulation technique selected from: a Monte Carlo method, an importance sampling method, a Latin Hypercube method, and a stratified sampling method.

5. The method of claim 2, wherein the microstructure-based failure model further includes a long crack growth model.

6. The method of claim 2, wherein one of the results related to the component life, is a minimum number of cycles or a time to failure for any RVE.

7. The method of claim 2, wherein the simulating comprises:
   establishing a density of potential nucleation sites within each RVE;
   establishing a number of potential nucleation sites within each RVE;
   determining the number of cycles to failure for each potential nucleation site; and
   calculating the life of the RVE as the smallest number of cycles to failure for any of the potential nucleation sites.

8. A computer system, configured to use a prediction of failure of an electronic device during design of the device, the system comprising:
   a processor; and
   a memory, wherein the processor is configured to execute instructions for:
   receiving data associated with a metallic component in the device, the data including data indicative of a response of the component to a specific load on the component while the device is in operation; and
   calculating a prediction indicative of a potential failure of the device using a probabilistic model of failure of the component, wherein the probabilistic model is based on at least the specific load, and a microstructure-based failure model and the data, and wherein the probabilistic model utilizes at least one of fast probability methods and simulation techniques, and wherein the microstructure-based failure model represents heterogeneous microstructures in the component, and includes one or more of a crack nucleation model and a short crack growth model.

9. The system of claim 8 wherein the processor is further configured to execute instructions for deriving the probabilistic model, according to:
   obtaining a Finite Element Model (FEM) of the component;
   analyzing the FEM to obtain stresses at nodes of the FEM;
   determining a Representative Volume Element (RVE) for at least one of the nodes;
   building a microstructure-based failure model for at least one RVE and including the microstructure-based failure model in the RVE;
   simulating a component life using at least one RVE microstructure-based failure model, the simulating producing a result related to the component life; and performing the simulating a plurality of times to produce results related to component life, wherein the results are used to provide a prediction of failure for the component.

10. The system of claim 8, wherein the probabilistic model utilizes a fast probability method selected from: a first order reliability method; a second order reliability method; an advanced mean value method, and a mean value method.

11. The system of claim 8, wherein the probabilistic model utilizes a simulation technique selected from: a Monte Carlo method, an importance sampling method, a Latin Hypercube method, and a stratified sampling method.

12. The system of claim 9, wherein the microstructure-based failure model further includes a long crack growth model.

13. The system of claim 9, wherein one of the results related to the component life, is a minimum number of cycles or a time to failure for any RVE.

14. The system of claim 9, wherein the simulating comprises:
  establishing a density of potential nucleation sites within each RVE;
  establishing a number of potential nucleation sites within each RVE;
  determining the number of cycles to failure for each potential nucleation site; and
  calculating the life of the RVE as the smallest number of cycles to failure for any of the potential nucleation sites.

15. A computer readable non-transitory medium, configured with instructions for using a prediction of failure of an electronic device during design of the device, the instructions comprising instructions for:
  receiving data associated with a metallic component in the device, the data including data indicative of a response of the component to a specific load on the component while the device is in operation; and
  calculating a prediction indicative of a potential failure of the device using a probabilistic model of failure of the component, wherein the probabilistic model is based on at least the specific load, and a microstructure-based failure model and the data, and wherein the probabilistic model utilizes at least one of fast probability methods and simulation techniques, and wherein the microstructure-based failure model represents heterogeneous microstructures in the component, and includes one or more of a crack nucleation model and a short crack growth model.

16. The medium of claim 15, configured with further instructions for deriving the probabilistic model, the instructions comprising instructions for:
  obtaining a Finite Element Model (FEM) of the component;
  analyzing the FEM to obtain stresses at nodes of the FEM;
  determining a Representative Volume Element (RVE) for at least one of the nodes;
  building a microstructure-based failure model for at least one RVE and including the microstructure-based failure model in the RVE;
  simulating a component life using at least one RVE microstructure-based failure model, the simulating producing a result related to the component life; and
  performing the simulating a plurality of times to produce results related to component life, wherein the results are used to provide a prediction of failure for the component.

17. The medium of claim 15, wherein the probabilistic model utilizes a fast probability method selected from: a first order reliability method; a second order reliability method; an advanced mean value method, and a mean value method.

18. The medium of claim 15, wherein the probabilistic model utilizes a simulation technique selected from: a Monte Carlo method, an importance sampling method, a Latin Hypercube method, and a stratified sampling method.

19. The medium of claim 16, wherein the microstructure-based failure model further includes a long crack growth model.

20. The medium of claim 16, wherein one of the results related to the component life, is a minimum number of cycles or a time to failure for any RVE.

21. The medium of claim 16, wherein the simulating comprises:
  establishing a density of potential nucleation sites within each RVE;
  establishing a number of potential nucleation sites within each RVE;
  determining the number of cycles to failure for each potential nucleation site; and
  calculating the life of the RVE as the smallest number of cycles to failure for any of the potential nucleation sites.

* * * * *